US007454066B2

(12) United States Patent
Ikeda

(10) Patent No.: US 7,454,066 B2
(45) Date of Patent: Nov. 18, 2008

(54) EXTRACTING METHOD OF PATTERN CONTOUR, IMAGE PROCESSING METHOD, SEARCHING METHOD OF PATTERN EDGE, SCANNING METHOD OF PROBE, MANUFACTURING METHOD OF SEMICONDUCTOR DEVICE, PATTERN INSPECTION APPARATUS, AND PROGRAM

(75) Inventor: Takahiro Ikeda, Kanagawa (JP)

(73) Assignee: Kabushiki Kaisha Toshiba, Tokyo (JP)

( * ) Notice: Subject to any disclaimer, the term of this patent is extended or adjusted under 35 U.S.C. 154(b) by 0 days.

(21) Appl. No.: 11/976,231

(22) Filed: Oct. 23, 2007

(65) Prior Publication Data
US 2008/0069451 A1 Mar. 20, 2008

Related U.S. Application Data

(62) Division of application No. 10/644,001, filed on Aug. 20, 2003, now Pat. No. 7,305,116.

(30) Foreign Application Priority Data
Aug. 20, 2002 (JP) .............................. 2002-239194

(51) Int. Cl.
*G06K 9/48* (2006.01)
(52) U.S. Cl. ...................................... 382/199; 382/141
(58) Field of Classification Search ......... 382/141–149, 382/199, 266, 305, 316; 348/86, 125
See application file for complete search history.

(56) References Cited

U.S. PATENT DOCUMENTS 4,910,786 A 3/1990 Eichel

| 6,181,818 | B1 | 1/2001 | Sato et al. |
| 6,317,859 | B1 * | 11/2001 | Papadopoulou ................ 716/4 |
| 6,868,175 | B1 | 3/2005 | Yamamoto et al. |
| 2001/0055415 | A1 | 12/2001 | Nozaki |

FOREIGN PATENT DOCUMENTS

| JP | 7-27548 | 1/1995 |
| JP | 2001-91231 | 4/2001 |
| JP | 2001-148016 | 5/2001 |
| JP | 2003-16463 | 1/2003 |

OTHER PUBLICATIONS

Preparata et al., "Computational Geometry An Introduction," Springer-Verlag (1985), pp. 179-218.
Stauffer, "Introduction to Percolation Theory," Taylor & Francis (1985).

* cited by examiner

*Primary Examiner*—Daniel G Mariam
(74) *Attorney, Agent, or Firm*—Finnegan, Henderson, Farabow, Garrett & Dunner, L.L.P.

(57) ABSTRACT

An extracting method of a pattern contour, includes acquiring an image of a pattern to be inspected, calculating a schematic edge position of the pattern from the image, preparing an approximate polygon by approximating a polygon consisting of edges having predetermined direction components to a contour shape of the pattern on the basis of the calculated edge position, dividing the approximate polygon into star-shaped polygons, calculating the position of a kernel of the star-shaped polygon, and searching an edge of the-pattern in a direction connecting the kernel to an arbitrary point positioned on the edge of the approximate polygon.

9 Claims, 44 Drawing Sheets (0123)

(001223)

(011233)

(010012123233)

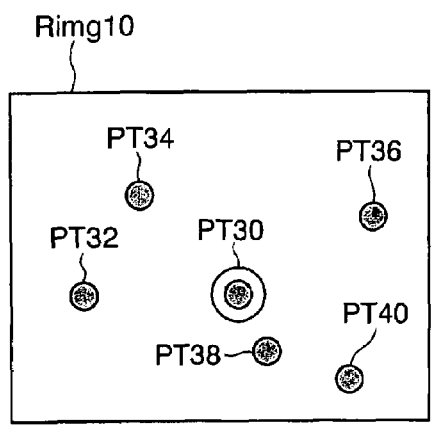
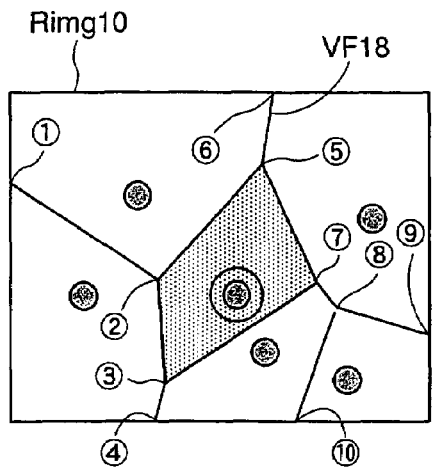
FIG.34A  FIG.34B
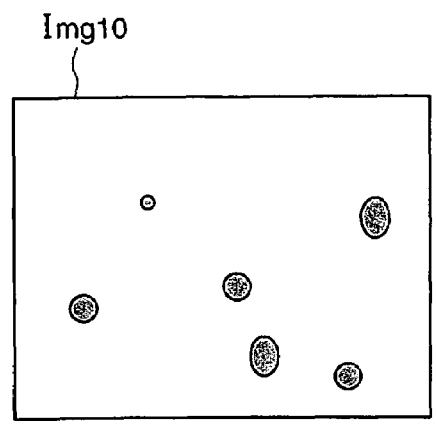
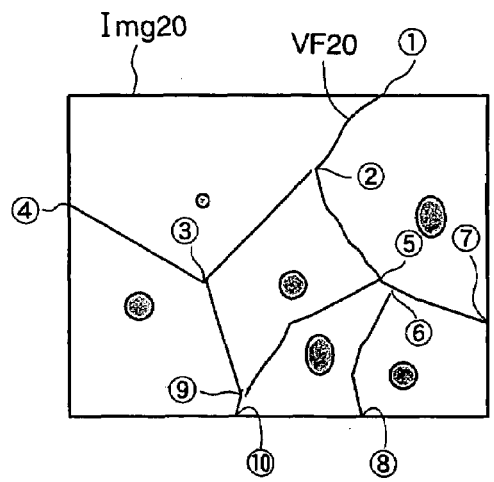
FIG.34C  FIG.34D
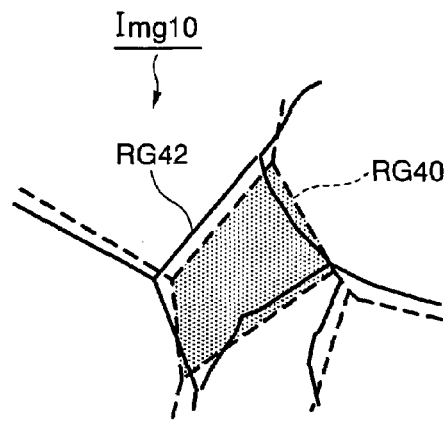
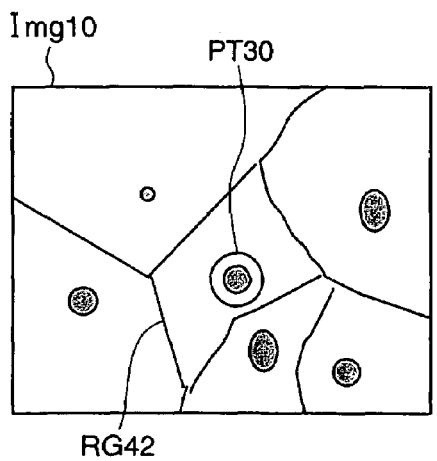
FIG.34E  FIG.34F

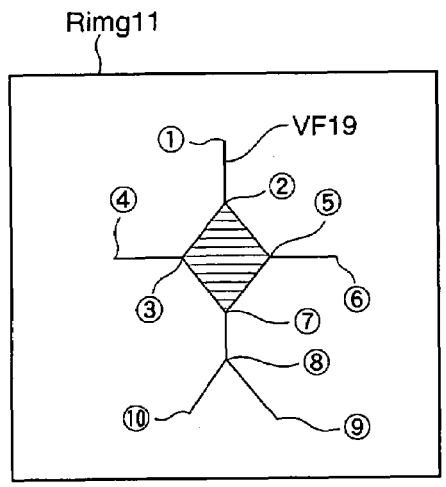
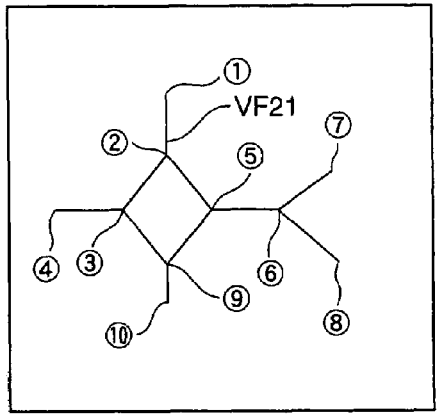
FIG. 35A          FIG. 35B
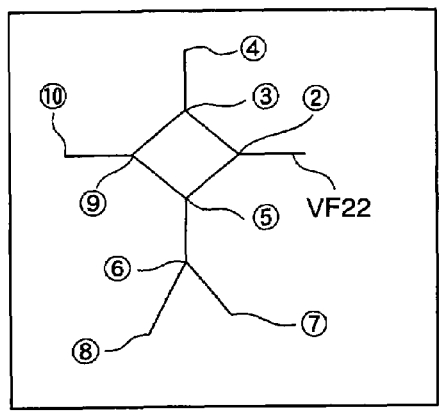
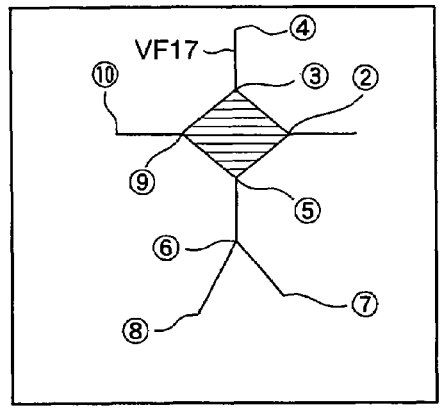
FIG.35C          FIG.35D
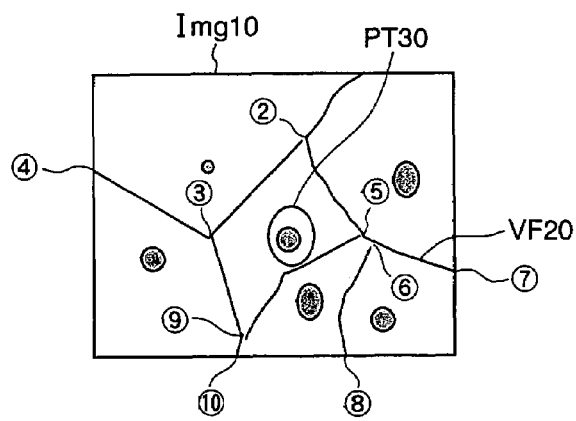
FIG.35E

EXTRACTING METHOD OF PATTERN CONTOUR, IMAGE PROCESSING METHOD, SEARCHING METHOD OF PATTERN EDGE, SCANNING METHOD OF PROBE, MANUFACTURING METHOD OF SEMICONDUCTOR DEVICE, PATTERN INSPECTION APPARATUS, AND PROGRAM

CROSS REFERENCE TO RELATED APPLICATION

This is a division of application Ser. No. 10/644,001, filed Aug. 20, 2003, (which is now U.S. Pat. No. 7,305,116) which is incorporated herein by reference.

This application claims benefit of priority under 35USC § 119 to Japanese patent application No. 2002-239194, filed on Aug. 20, 2002, the contents of which are incorporated by reference herein.

BACKGROUND OF THE INVENTION

1. Field of the Invention

The present invention relates to an extracting method of a pattern contour, an image processing method, a searching method of a pattern edge, a scanning method of a probe, a manufacturing method of a semiconductor device, a pattern inspection apparatus, and program. The present invention relates to, for example, evaluation of a fine pattern in a manufacturing process of the semiconductor device.

2. Related Background Art

In a manufacturing process of a semiconductor device, an optical microscope or a scanning electron microscope (hereinafter referred to as an SEM) is used to inspect a fine pattern.

In recent years, multifactorial inspection and control of patterns have extensively implemented with a positive use of two-dimensional configuration information of a pattern image outputted from an inspection apparatus. Basis of this technique is a technique of extracting a contour of the pattern from an inspection image thereof given by a gray scale or color distribution.

For a simply linear pattern, for example, as shown in FIG. 43, a method has heretofore frequently been used comprising: searching an edge along directions SD202 vertical to a longitudinal direction of a linear pattern PT200; and analyzing gray scale data at the time to calculate an edge position based on a threshold value method.

In addition, for a pattern having a schematically convex shape, for example, a hole pattern PT210 shown in FIG. 44, there is a method of radially searching a pattern edge as shown by searching directions SD212 in the drawing. This method is described, for example, in Japanese Patent Application Laid-Open Nos. 7-27548 and 2001-91231.

However, even with the use of the above-described method, edges of some patterns are wrongly detected, for example, as patterns shown in FIG. 45, the contour shape of which are complicated, and when the edges are simply searched in directions SD214 extending in parallel with one another. Since an image Img2 in FIG. 45 includes a plurality of patterns PT2, PT4, PT6, the detected edges have to be attributed to any of the patterns, respectively. For this, an operator needs to designate a region where the pattern exists prior to the search of the patterns. Alternatively, the method has to comprise: performing image matching with design data to automatically attribute the edge; or again grouping extracted edge point sequence data. Any arrangement requires complicated processing, inspection efficiency has thus not been satisfactory.

Furthermore, when a plurality of patterns similar to one another exist in the image, it is frequently necessary to automatically and selectively designate a specific pattern from the plurality of patterns and to inspect the pattern. In this case, the method described, for example, in Japanese Patent Application Laid-Open No. 2001-148016 can be used, but it is difficult to apply this method to cases other than a case in which the plurality of patterns are regularly arranged. Since the matching is performed by calculation of correlation among gray scale image data, a long processing time has been required.

There have been proposed a large number of methods of preferably detecting a pattern edge for patterns having complicated contours. In the searching of the pattern edge, it is desirable to set the edge searching direction to a direction substantially orthogonal to the pattern edge in order to enhance solution of the edge position.

However, even when an edge of a polygon PLG2 shown in FIG. 46 is set as a schematic pattern edge for a pattern PT44 shown in the figure, and as long as the edge is searched in a direction along a straight line, the edge is searched in a direction similar to that of the edge as shown by searching directions SD216c, SD216d. In this manner, it is sometimes difficult to search the edges in directions crossing at right angles to all the pattern edges.

BRIEF SUMMARY OF THE INVENTION

According to a first aspect of the invention, there is provided an extracting method of a pattern contour, comprising:

acquiring an image of a pattern to be inspected;

calculating a schematic edge position of the pattern from the image;

preparing an approximate polygon by approximating a polygon consisting of edges having predetermined direction components to a contour shape of the pattern on the basis of the calculated edge position;

dividing the approximate polygon into star-shaped polygons;

calculating the position of a kernel of the star-shaped polygon; and searching an edge of the pattern in a direction connecting the kernel to an arbitrary point positioned on the edge of the approximate polygon.

According to a second aspect of the invention, there is provided an extracting method of a pattern contour, comprising:

acquiring an image of a pattern to be inspected;

calculating a schematic edge position of the pattern from the image;

generating a lattice whose unit cell has a size larger than that of a pixel of the image and to whose each edge a weight coefficient is allocated on the image on the basis of the calculated edge position;

applying a lattice animal onto the lattice based on the weight coefficient; and outputting contour data of the pattern based on coordinate data of a vertex of the applied lattice animal.

According to a third aspect of the invention, there is provided a program which allows a computer to implement an extracting method of a pattern contour, comprising:

acquiring an image of a pattern to be inspected;

calculating a schematic edge position of the pattern from the image;

preparing an approximate polygon by approximating a polygon consisting of edges having predetermined direction components to a contour shape of the pattern on the basis of the calculated edge position;

dividing the approximate polygon into star-shaped polygons;

calculating the position of a kernel of the star-shaped polygon; and searching an edge of the pattern in a direction connecting the kernel to an arbitrary point positioned on the edge of the approximate polygon.

According to a fourth aspect of the invention, there is provided a program which allows a computer to implement an extracting method of a pattern contour, comprising:

acquiring an image of a pattern to be inspected;

calculating a schematic edge position of the pattern from the image;

generating a lattice whose unit cell has a size larger than that of a pixel of the image and to whose each edge a weight coefficient is allocated on the image on the basis of the calculated edge position;

applying a lattice animal onto the lattice based on the weight coefficient; and outputting contour data of the pattern based on coordinate data of a vertex of the applied lattice animal.

According to a fifth aspect of the invention, there is provided a manufacturing method of a semiconductor device, comprising an extracting method of a pattern contour, the extracting method comprising:

acquiring an image of a pattern to be inspected;

calculating a schematic edge position of the pattern from the image;

preparing an approximate polygon by approximating a polygon consisting of edges having predetermined direction components to a contour shape of the pattern on the basis of the calculated edge position;

dividing the approximate polygon into star-shaped polygons;

calculating the position of a kernel of the star-shaped polygon; and searching an edge of the pattern in a direction connecting the kernel to an arbitrary point positioned on the edge of the approximate polygon.

According to a sixth aspect of the invention, there is provided a manufacturing method of a semiconductor device, comprising an extracting method of a pattern contour, the extracting method comprising:

acquiring an image of a pattern to be inspected;

calculating a schematic edge position of the pattern from the image;

generating a lattice whose unit cell has a size larger than that of a pixel of the image and to whose each edge a weight coefficient is allocated on the image on the basis of the calculated edge position;

applying a lattice animal onto the lattice based on the weight coefficient; and outputting contour data of the pattern based on coordinate data of a vertex of the applied lattice animal.

According to a seventh aspect of the invention, there is provided an image processing method comprising:

acquiring an image of a pattern to be inspected;

extracting a part of a point sequence which belongs to a contour of the pattern;

preparing a Voronoi diagram with respect to the extracted partial point sequence;

searching a point which belongs to an edge of the pattern along an edge of the prepared Voronoi diagram to incorporate the searched point into the partial point sequence; and removing the edge of the Voronoi diagram intersecting with the contour of the pattern to define a sub-region in the image.

According to an eighth aspect of the invention, there is provided a program which allows a computer to implement an image processing method comprising:

acquiring an image of a pattern to be inspected;

extracting a part of a point sequence which belongs to a contour of the pattern;

preparing a Voronoi diagram with respect to the extracted partial point sequence;

searching a point which belongs to an edge of the pattern along an edge of the prepared Voronoi diagram to incorporate the searched point into the partial point sequence; and removing the edge of the Voronoi diagram intersecting with the contour of the pattern to define a sub-region in the image.

According to a ninth aspect of the invention, there is provided a manufacturing method of a semiconductor device, comprising an image processing method including:

acquiring an image of a pattern to be inspected;

extracting a part of a point sequence which belongs to a contour of the pattern;

preparing a Voronoi diagram with respect to the extracted partial point sequence;

searching a point which belongs to an edge of the pattern along an edge of the prepared Voronoi diagram to incorporate the searched point into the partial point sequence; and removing the edge of the Voronoi diagram intersecting with the contour of the pattern to define a sub-region in the image.

According to a tenth aspect of the invention, there is provided a searching method of a pattern edge, comprising:

acquiring an image of a pattern to be inspected and data of a line representing a schematic edge position of the pattern;

defining one arbitrary point in the image as a start point of edge searching, and defining at least one point on the line as a point in an edge searching direction; and searching the edge of the pattern from the start point of the edge searching and along at least one curve of a curve group given by either a real part or an imaginary part of a holomorphic function, a trajectory of the curve passing through the point in the edge searching direction.

According to an eleventh aspect of the invention, there is provided a program which allows a computer to implement a searching method of a pattern edge, the searching method comprising:

acquiring an image of a pattern to be inspected and data of a line representing a schematic edge position of the pattern;

defining one arbitrary point in the image as a start point of edge searching, and defining at least one point on the line as a point in an edge searching direction; and searching the edge of the pattern from the start point of the edge searching and along at least one curve of a curve group given by either a real part or an imaginary part of a holomorphic function, a trajectory of the curve passing through the point in the edge searching direction.

According to a twelfth aspect of the invention, there is provided a manufacturing method of a semiconductor device, comprising a searching method of a pattern edge, the searching method including:

acquiring an image of a pattern to be inspected and data of a line representing a schematic edge position of the pattern;

defining one arbitrary point in the image as a start point of edge searching, and defining at least one point on the line as a point in an edge searching direction; and searching the edge of the pattern from the start point of the edge searching and along at least one curve of a curve group given by either a real part or an imaginary part of a holomorphic function, a trajectory of the curve passing through the point in the edge searching direction.

According to a thirteenth aspect of the invention, there is provided a method of scanning a probe onto at least a part of an observation region including a pattern to be inspected, comprising:

defining one arbitrary point in the observation region as a start point of probe scanning, and defining at least one point on a line representing the schematic edge position of the pattern as a point in a probe scanning direction; and scanning the probe from the start point of the probe scanning and along at least one curve of a curve group given by either a real part or an imaginary part of a holomorphic function, a trajectory of the scanning passes through a point in the probe scanning direction.

According to a fourteenth aspect of the invention, there is provided a program to allow a computer to implement a method of scanning a probe onto a sample having an observation region, the computer controlling an inspection apparatus to generate the probe and to scan the probe onto at least a part of the observation region in which the pattern to be inspected is formed, the scanning method comprising:

defining one arbitrary point in the observation region as a start point of probe scanning, and defining at least one point on a line representing a schematic edge position of the pattern as a point in a probe scanning direction; and scanning the probe from the start point of the probe scanning and along at least one curve of a curve group given by either a real part or an imaginary part of a holomorphic function, a trajectory of the scanning passes through a point in the probe scanning direction.

According to a fifteenth aspect of the invention, there is provided a manufacturing method of a semiconductor device, comprising a method of scanning a probe onto at least a part of an observation region in which a pattern to be inspected is formed, the method of scanning the probe including:

defining one arbitrary point in the observation region as a start point of probe scanning, and defining at least one point on a line representing a schematic edge position of the pattern as a point in a probe scanning direction; and scanning the probe from the start point of the probe scanning and along at least one curve of a curve group given by either a real part or an imaginary part of a holomorphic function, a trajectory of the scanning passes through a point in the probe scanning direction.

According to a sixteenth aspect of the invention, there is provided a pattern inspection apparatus comprising:

a first calculator which receives data of an image of a pattern to be inspected and calculates a schematic edge position of the pattern from the image;

an image processor which approximates a polygon constituted of edges exclusively having predetermined direction components to a contour shape of the pattern based on the calculated edge position to prepare an approximate polygon and which divides the approximate polygon into star-shaped polygons;

a second calculator which calculates a position of a kernel of the star-shaped polygon; and an edge searcher which searches an edge of the pattern in a direction connecting the kernel to an arbitrary point positioned on an edge of the approximate polygon.

According to a seventeenth aspect of the invention, there is provided a pattern inspection apparatus comprising:

a calculator which receives data of an image of a pattern to be inspected and calculates a schematic edge position of the pattern from the image;

an image processor which generates a lattice on the image based on the calculated edge position, a unit cell of the lattice having a size larger than that of a pixel of the image and a weight coefficient being allocated to each edge of the lattice, the image processor applying a lattice animal onto the lattice based on the weight coefficient; and an edge searcher which outputs contour data of the pattern based on coordinate data of a vertex of the applied lattice animal.

According to an eighteenth aspect of the invention, there is provided a pattern inspection apparatus comprising:

a point sequence extractor which receives data of an image of a pattern to be inspected and which extracts a part of a point sequence belonging to a contour of the pattern;

an image processor which prepares a Voronoi diagram with respect to the extracted partial point sequence and which searches a point belonging to the edge of the pattern along an edge of the prepared Voronoi diagram to incorporate the searched point into the partial point sequence and which removes an edge of the Voronoi diagram intersecting with the contour of the pattern to define a sub-region in the image; and an edge searcher which searches the edge of the pattern for each sub-region.

According to a nineteenth aspect of the invention, there is provided a pattern inspection apparatus comprising:

a setter which receives data of an image of a pattern to be inspected and data of a line representing a schematic edge position of the pattern to set a start point of edge searching and at least one point on the line as the point in an edge searching direction in the image;

a calculator to calculate a curve group which is given by either a real part or an imaginary part of a holomorphic function and each of which passes through the point in the edge searching direction from the start point; and an edge searcher which searches an edge of the pattern along at least one cure in the curve group.

According to a twentieth aspect of the invention, there is provided a pattern inspection apparatus connectable to a probe scanning device scanning a probe onto a sample in which a pattern to be inspected is formed, the pattern inspection apparatus comprising:

a calculator which receives image data of the pattern and data of a line representing a schematic edge position of the pattern to calculate a curve group given by either a real part or an imaginary part of a holomorphic function and passing through at least one point on the line representing the schematic edge position from the start point; and a controller which generates a control signal to scan the probe along at least one curve in the curve group and which supplies the control signal to the probe scanning device.

BRIEF DESCRIPTION OF THE DRAWINGS

FIGS. 34A to 34F are explanatory views specifically showing the image processing method shown in FIG. 33;

FIGS. 35A to 35E are explanatory views showing a method of further facilitating matching of Voronoi diagrams with one another;

DETAILED DESCRIPTION OF THE INVENTION

Figure 1:
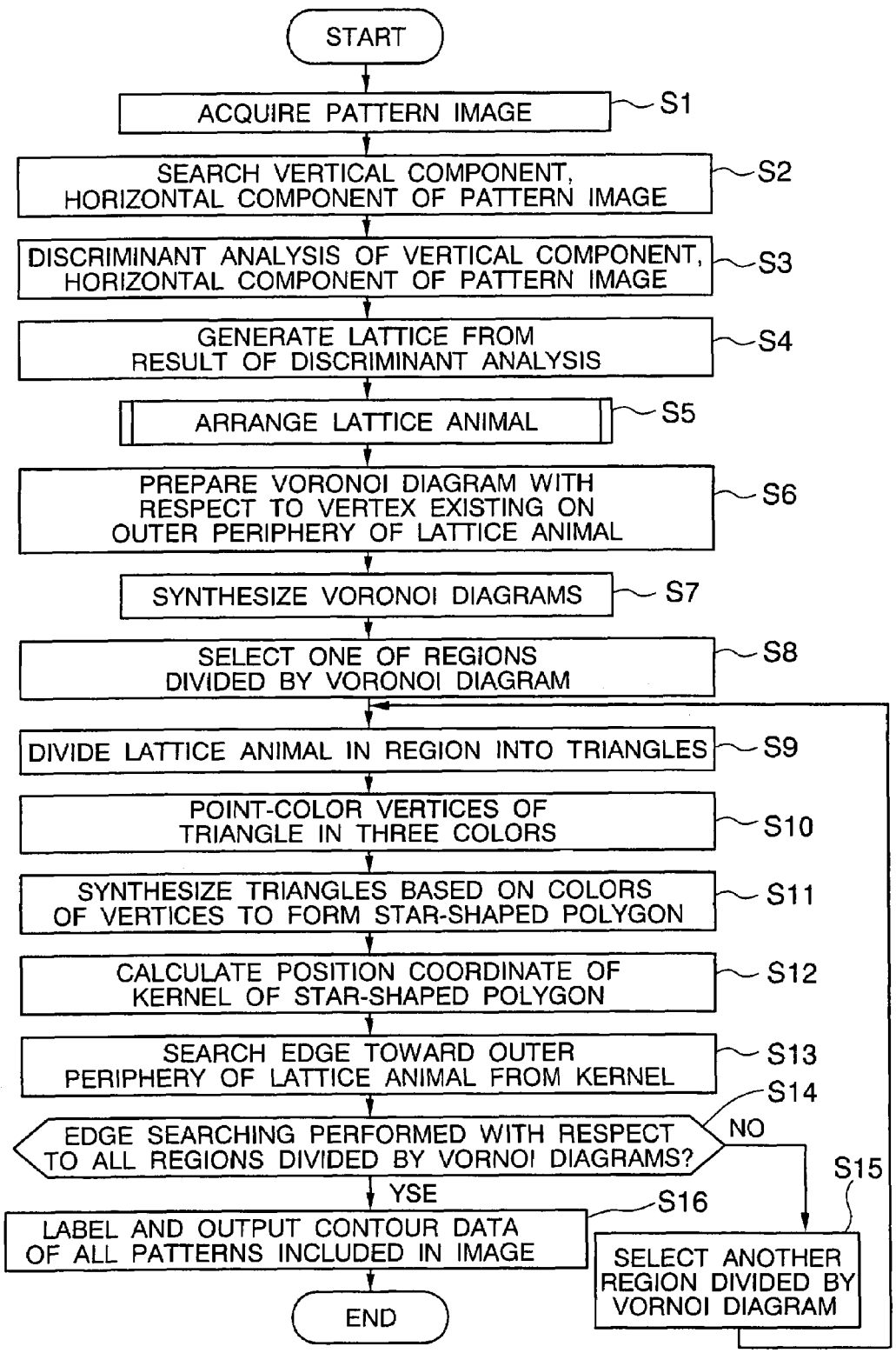
FIG. 1 is a flowchart showing a schematic procedure of an extracting method of a pattern contour according to a first embodiment of the present invention, including an image processing method according to an embodiment of the present invention.

Embodiments of the present invention will be described hereinafter with reference to the drawings.

In the following description, first to eighth embodiments relate to an extracting method of a pattern contour, including an image processing method according to the present invention, and ninth and tenth embodiments relate to a searching method of a pattern edge according to the present invention. An eleventh embodiment relates to a scanning method of a probe according to the present invention. A twelfth embodiment relates to a pattern inspection apparatus according to the present invention. A thirteenth embodiment relates to a manufacturing method of a semiconductor device according to the present invention. Furthermore, a fourteenth embodiment relates to program and computer readable recorded medium according to the present invention. It is to be noted that in the following drawings, the same elements are denoted with the same reference numerals, and detailed descriptions thereof are appropriately omitted.

(1) First Embodiment

A first embodiment of the present invention will be described with reference to FIGS. 1 to 16.

Figure 2:
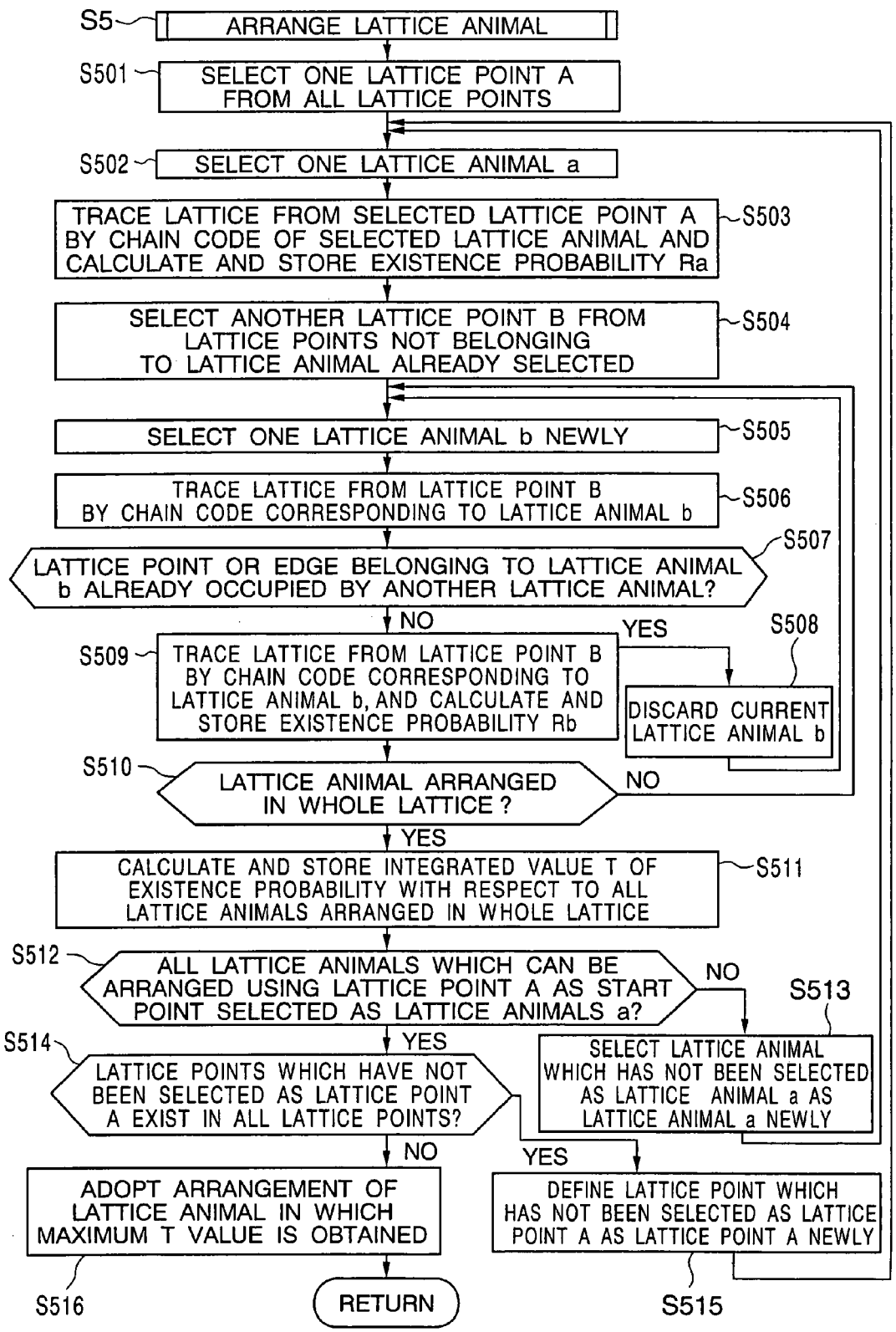
FIG. 2 is a flowchart showing procedures to arrange a lattice animal in the flowchart of FIG. 1 in more detail.

FIG. 1 is a flowchart showing a schematic procedure of the extracting method of a pattern contour according to the present embodiment, and FIG. 2 is a flowchart showing procedures to arrange a lattice animal in the flowchart of FIG. 1 in more detail.

First of all, the extracting method of the pattern contour of the present embodiment will schematically be described with reference to the following of FIG. 1.

Figure 3:
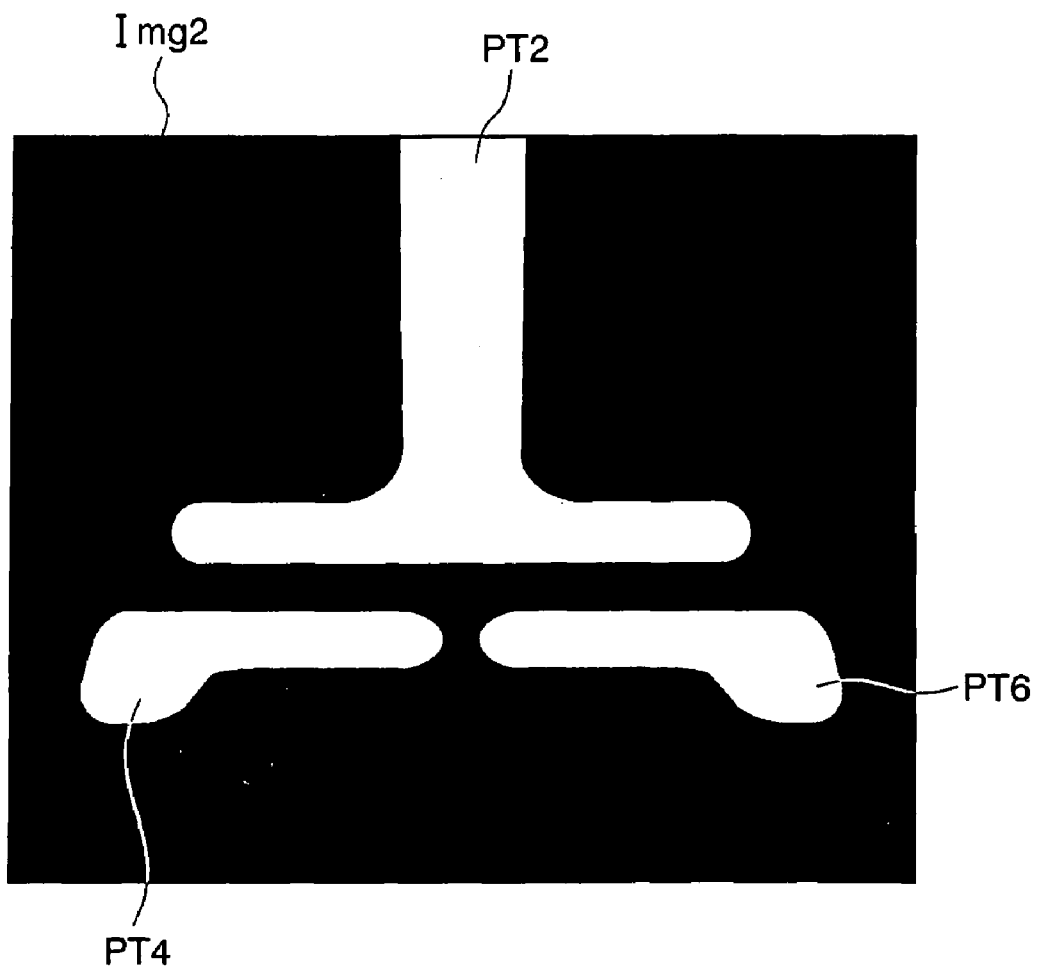
FIG. 3 is a diagram showing one example of a pattern image.
Figure 45:
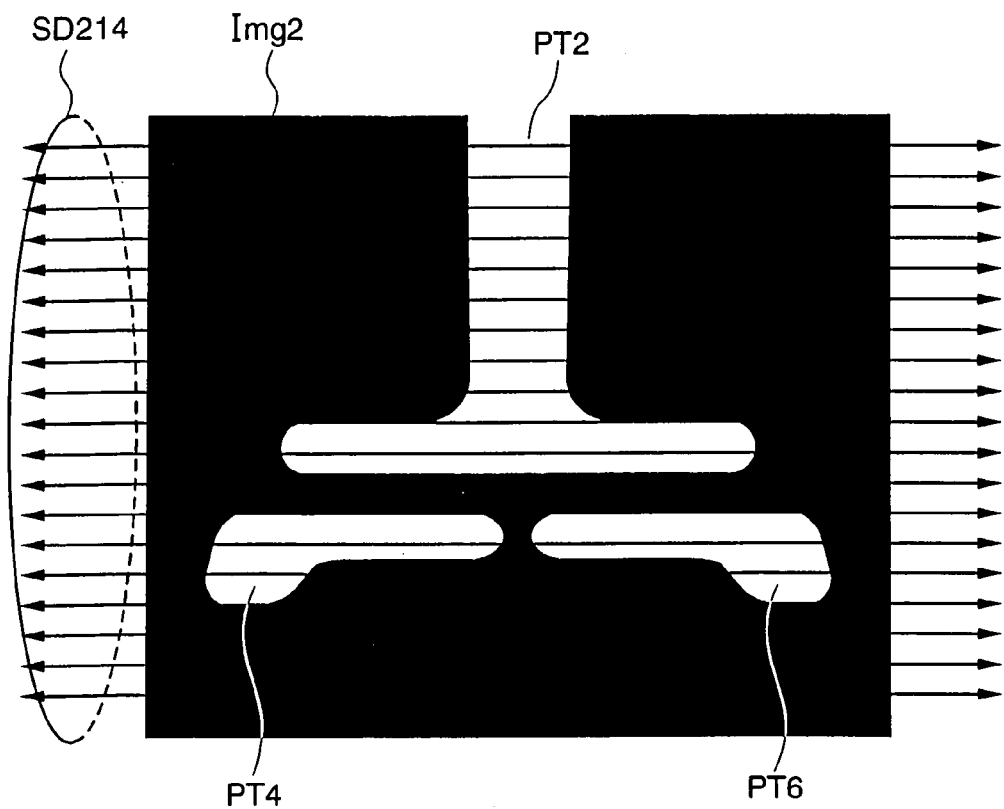
FIG. 45 is a diagram showing one example of a complicated pattern and showing a problem of the related art.

First, data of a gray scale image of a pattern to be inspected is acquired, for example, by an SEM (step S1). One example of the acquired pattern image is shown in FIG. 3. An image Img2 shown in the figure is the same as that shown in FIG. 45, and includes three patterns PT2, PT4, PT6. Of these patterns the pattern PT2 has a contour which cannot be regarded as a convex shape.

Figure 4A:
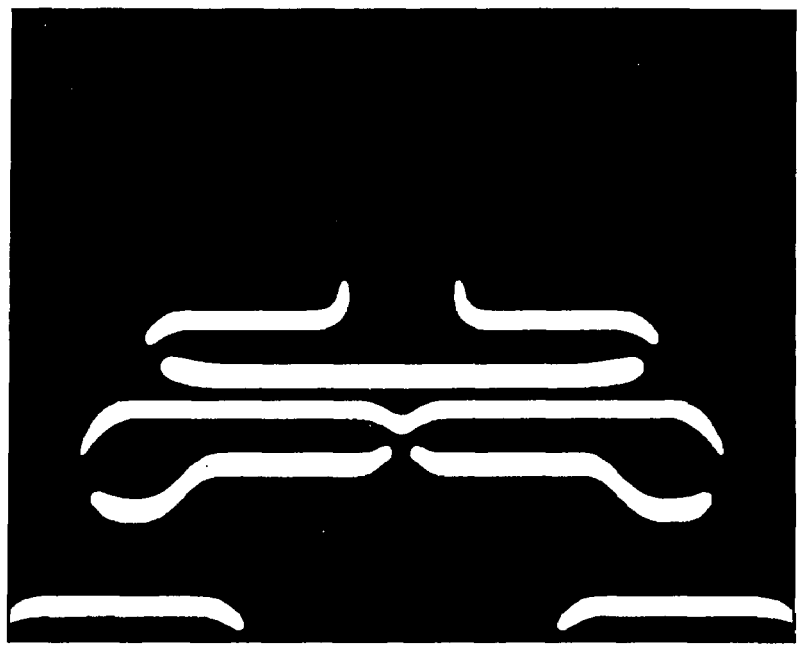
FIG. 4A schematically shows edge data of a horizontal direction in coordinate data of a pattern edge extracted from the image shown in FIG. 3, and FIG. 4B schematically shows the edge data of a vertical direction in the coordinate data of the pattern edge extracted from the image shown in FIG. 3.
Figure 4B:
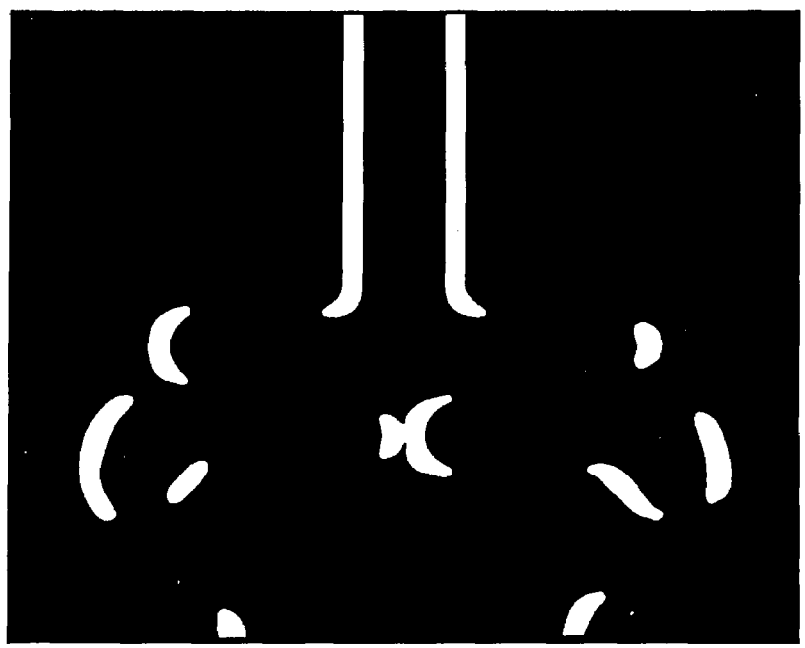

Next, vertical components and horizontal components of the pattern image are searched (step S2). Specifically, a gray scale data is scanned in a vertical direction and a horizontal direction in the image Img2 to calculate coordinates of the horizontal and vertical directions of local peaks in tone thereof. FIGS. 4A and 4B are diagrams visibly showing the calculated coordinates. FIG. 4A schematically shows edge data of the horizontal direction obtained by searching the edges of the vertical direction, and FIG. 4B schematically shows the edge data of the vertical direction obtained by searching the edges of the horizontal direction. More specifically, the peaks are searched at an interval of ten pixels in the vertical and horizontal directions to obtain a smoothed differential value of the gray scale data obtained in the respective searches and to specify a position in the vicinity of a maximum value.

Next, discriminant analysis to the obtained vertical and horizontal coordinates is performed (step S3). Steps are performed comprising: regarding two positions as the same, when F value defined by the following equation (1) is not more than a predetermined value; and on the other hand, regarding the positions as independent positions, when the F value exceeds the predetermined value.

$$F = V_{inter}/V_{intra} \quad \text{Equation (1)},$$

wherein $$V_{inter} = \text{Var}(\bar{x}_1, \bar{x}_2, \bar{x}_3, \ldots, \bar{x}_N)$$

$$V_{intra} = \text{Ave}(V_1, V_2, \ldots, V_N),$$

$\bar{x}_1, \bar{x}_2, \bar{x}_3, \ldots, \bar{x}_N$ and $V_1, V_2, \ldots, V_N$ indicate an average value and variance of an x coordinate of each class, when a sequence of points is rearranged in accordance with a size of the x coordinate and thereafter the sequence is divided into N classes. This value at a time when F is maximized gives the positions of the vertical components of the pattern edge after the discriminant analysis.

It is to be noted that Var( ) means the calculation of variance of the value within ( ), and Ave( ) means the calculation of the average value within ( ).

Furthermore, the calculation is also similarly performed with respect to a y coordinate of the sequence of points.

Figure 5A:
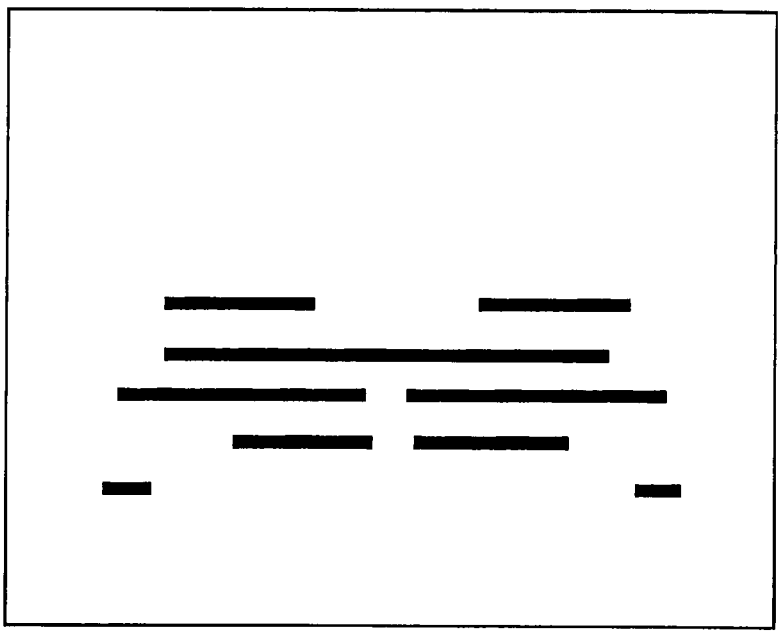
FIGS. 5A and 5B are diagrams showing results of discriminant analysis of the coordinate data shown in FIGS. 4A and 4B.
Figure 5B:
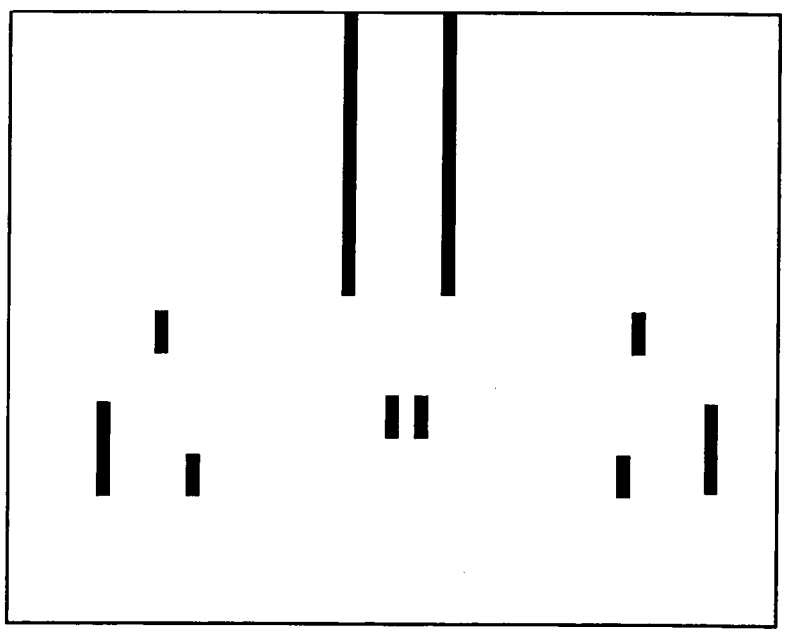
Figure 6:
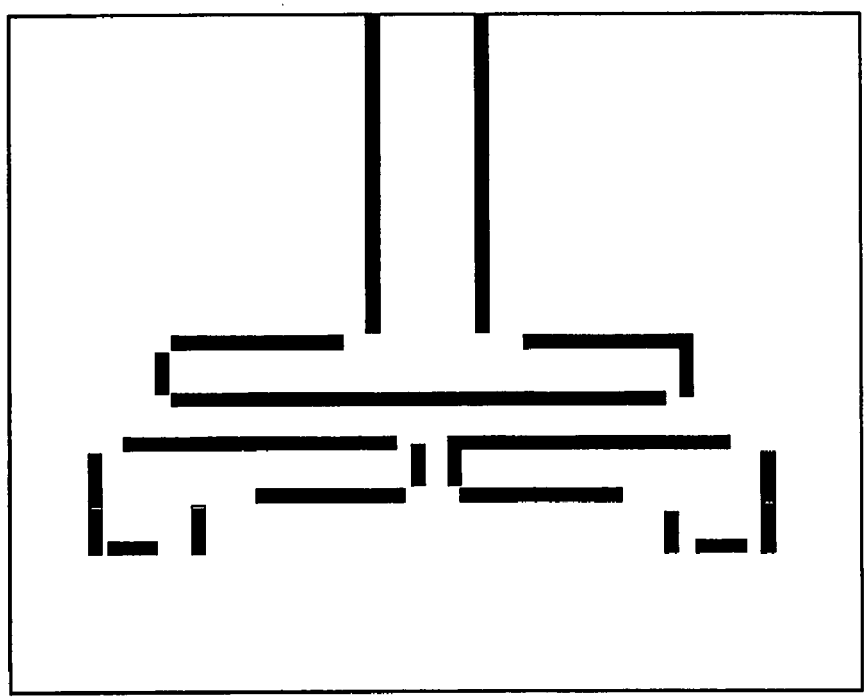
FIG. 6 is a diagram in which horizontal components and vertical components shown in FIGS. 5A and 5B are synthesized.

FIGS. 5A and 5B show discriminant analysis results of the coordinate data shown in FIGS. 4A and 4B, respectively. FIG. 5A shows the horizontal components of the pattern edge, and FIG. 5B shows the vertical components of the pattern edge. Furthermore, FIG. 6 is a diagram in which the horizontal components of FIG. 5A are synthesized with the vertical components of FIG. 5B.

Figure 7:
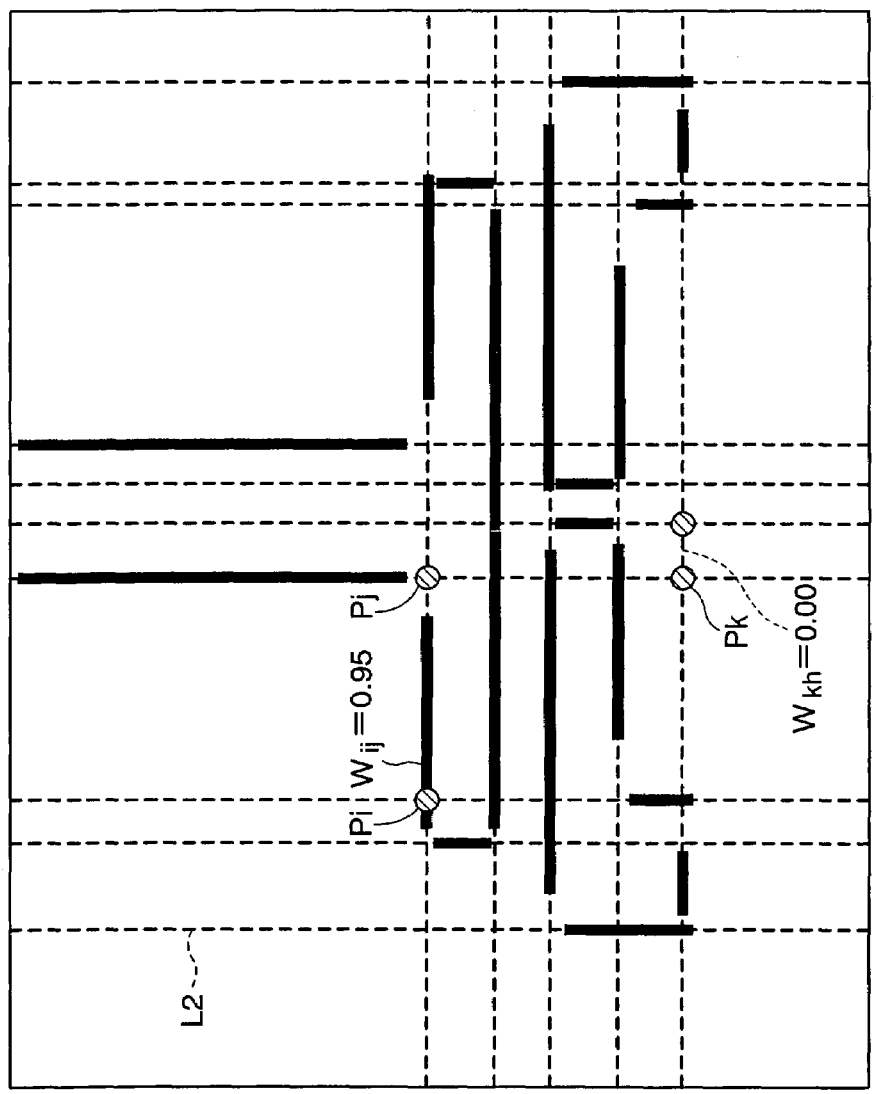
FIG. 7 is a diagram showing a lattice prepared in the image coordinate system from the judgment result shown in FIG. 6.

Next, the lattice is generated on the image using the result of the discriminant analysis (step S4). Specifically, the vertical and horizontal coordinates finally regarded as independent positions shown in FIG. 6 are used to generate a lattice L2 on the image as shown in FIG. 7. In this stage, the lattice L2 is a polygon having edges to which predetermined direction components are given. In the present embodiment all the predetermined direction components are the horizontal and vertical components. Furthermore, a length Lij and weight function wij are imparted to each edge of the lattice L2, and stored as table data in a storage device (see FIG. 42). Here, the weight function wij is a function which can be expressed in the following equation (2) with the number nij of local peaks of gray scale value data attributed to each edge of the lattice L2.

$$wij = nij/Lij \quad \text{Equation (2)}$$

It is to be noted that the predetermined direction components are not limited to the horizontal and vertical components. The direction may form an angle integer times as much as 0° to 45° with respect to a reference direction which can arbitrarily be set to an image direction.

Figure 8A:
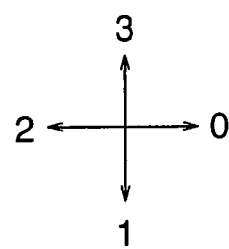
FIG. 8A shows one representation example of a chain code.
Figure 8B:
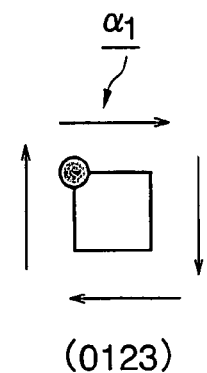
FIGS. 8B to 8E are diagrams showing some examples of the lattice animal.
Figure 8C:
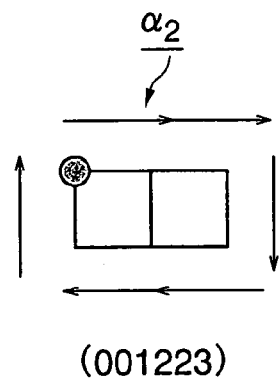
Figure 8D:
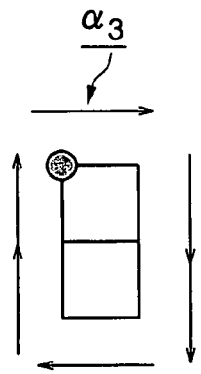
Figure 8E:
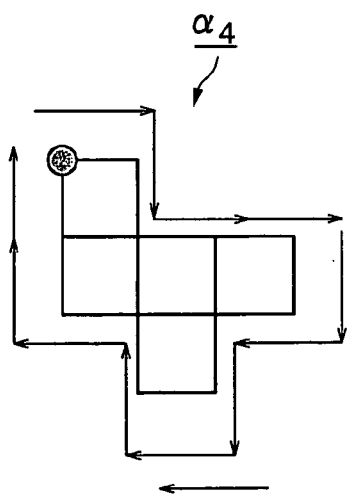

Next, a polygon referred to as "lattice animal" is combined on the lattice L2 generated on the image Img2 in this manner (step S5). Here, the "lattice animal" means a polygon prepared by disposing the edges of the arbitrary number of lattice elements adjacent to one another to synthesize the elements. A method of automatically generating the polygon is described, for example, in Discrete Mathematics 36 (1981) pp. 191 to 203 by D. H. Redelmeier, "Introduction to Percolation Theory" by D. Stauffer, Taylor & Francis, London & Philadelphia, 1985 appendix A and the like. In the present embodiment, necessary number of lattice animals is beforehand generated, and the contours of the animals are represented by chain codes described in Computing Surveys, vol. 6, No. 1, pp. 57 to 97 (1974) by H. Freeman. Then, the animals are numbered with the numbers of longitudinal and lateral edges, and beforehand stored as an "animal table" in the storage device (see FIG. 42). One representation example of this chain code is shown in FIG. 8A, and some examples α1 to α4 of the lattice animal are shown in FIGS. 8B to 8E.

Figure 9:
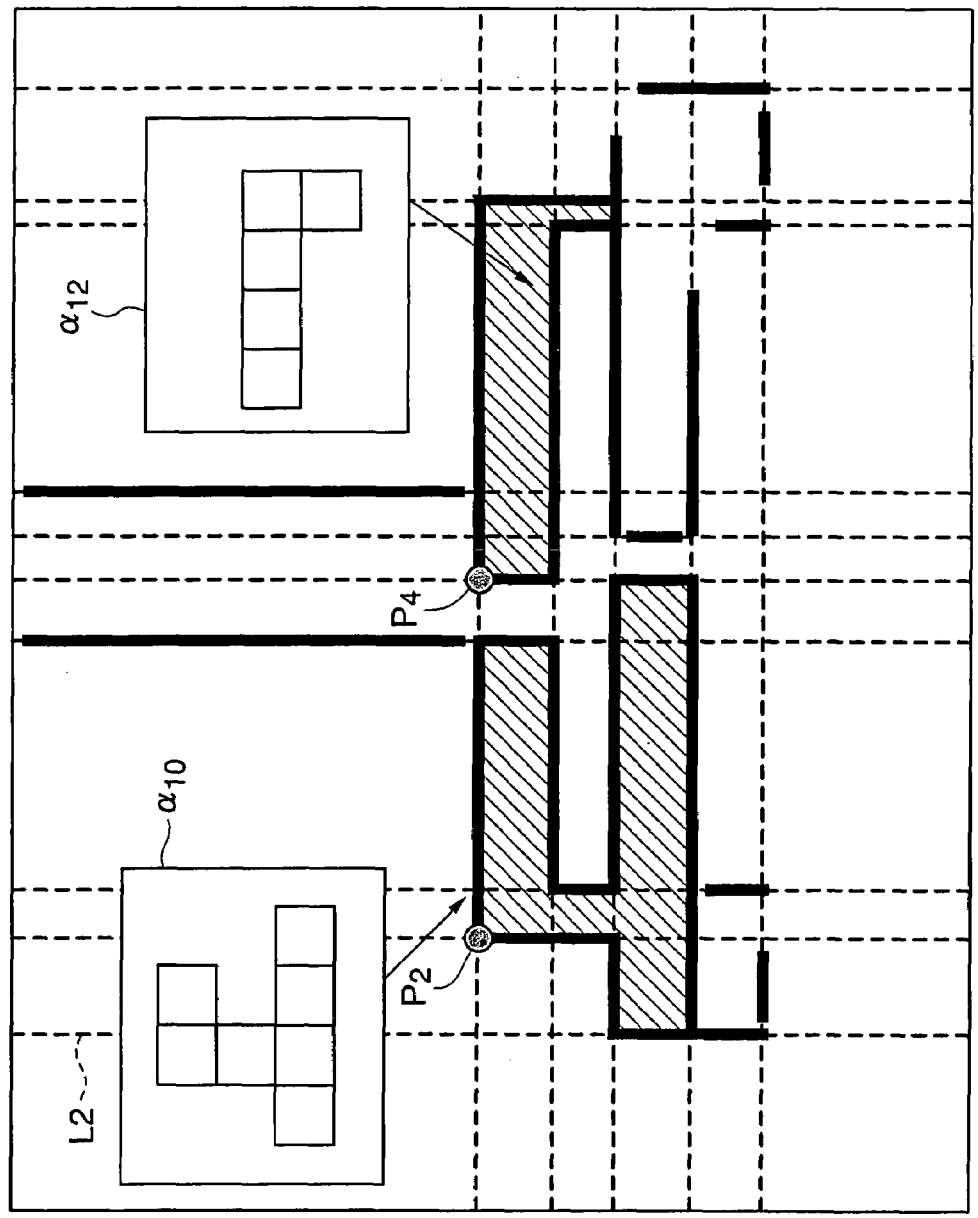
FIG. 9 is an explanatory view of the specific procedure of the method of disposing the lattice animal on the lattice shown in FIG. 7.

A specific procedure for superposing the lattice animals upon one another will be described with reference to FIGS. 2, 9, and 10. First, one arbitrary lattice point A is selected from all the lattice points (FIG. 2, step S501). Explaining the lattice L2 shown in FIG. 7 as an example, a lattice point p2, for example is selected as shown in FIG. 9. Next, an arbitrary lattice animal a is selected from the "animal table" (FIG. 2, step S502). In the example shown in FIG. 9, a lattice animal α10 is selected as the lattice animal a. Next, the lattice (lattice L2 in FIG. 9) is traced from the selected lattice point A by the chain code of the selected lattice animal. At this time, the pre-stored weights are successively added to the respective edges of the traced lattice, and the added result is defined as an existence probability Ra of the lattice animal a and then stored in the storage device (see FIG. 42) (step S503). Next, another lattice point B is selected from the lattice points which do not belong to the lattice animal which has already selected (step S504). In the example shown in FIG. 9, for example, a lattice point p4 is selected from the lattice points not belonging to the lattice animal α10 whose start point is the lattice point p2. Next, another arbitrary lattice animal is selected newly as a lattice animal b from the animal table (step S505). As an example of the lattice animal b, FIG. 9 shows a lattice animal α12. Subsequently, the lattice is traced from a lattice point B by the chain code corresponding to the lattice animal b (step S506). In the example shown in FIG. 9, the lattice point p4 is used as the start point to trace the lattice L2 by the chain code of the lattice animal α12. Additionally, at this time, when the lattice point or edge belonging to the lattice animal b (α12 in the example of FIG. 9) is already occupied by another lattice animal (e.g., the lattice animal α10 of FIG. 9) (step S507), the current lattice animal b (lattice animal α12 in FIG. 9) is discarded (step S508), and one lattice animal b is selected newly (step S505). When the lattice point or edge belonging to the existing lattice animal b is not occupied by another lattice animal yet (step S507), the lattice is traced from the lattice point B with the chain code corresponding to the lattice animal b, and an existence probability Rb is calculated and stored in the storage device (see FIG. 42) (step S509).

When the above-described procedures (steps S505 to S509) are recursively repeated for the whole lattice (step S510), the animals are disposed in the whole lattice. As a result, the calculated existence probabilities are obtained for all the lattice animals disposed in the whole lattice at this time.

Next, an integrated value of all the existence probabilities with respect to all the lattice animals calculated in this manner is calculated and defined as an integrated value T. Furthermore, lattice animal arrangement information is constituted by the number of lattice animals, the start point coordinate of each lattice animal, the numerical order of each lattice animal, and the integrated value T and provided with a label (e.g. label C1), and the information is stored in the storage device (see FIG. 42) (step S511).

Next, when the lattice animal which can be disposed using the lattice point A as the start point exists in the animals other than the lattice animal a (step S512), the lattice animal is newly selected as the lattice animal a (step S513), and the above-described steps S502 to S511 are repeated.

Furthermore, if there are lattice points which have not been selected as the lattice point A yet in all the lattice points (step S514), one of the points is newly selected as the lattice point A (step S515), and the above-described steps S502 to S513 are repeated.

By the repetition of these procedures, the integrated value T of the existence probabilities can be obtained with respect to a way of arrangement of all the lattice animals which can be arranged in the whole lattice.

Finally, the arrangement of the lattice animals in which a maximum value of T is obtained is selected from all the arrangement of the lattice animals (step S516).

Figure 10:
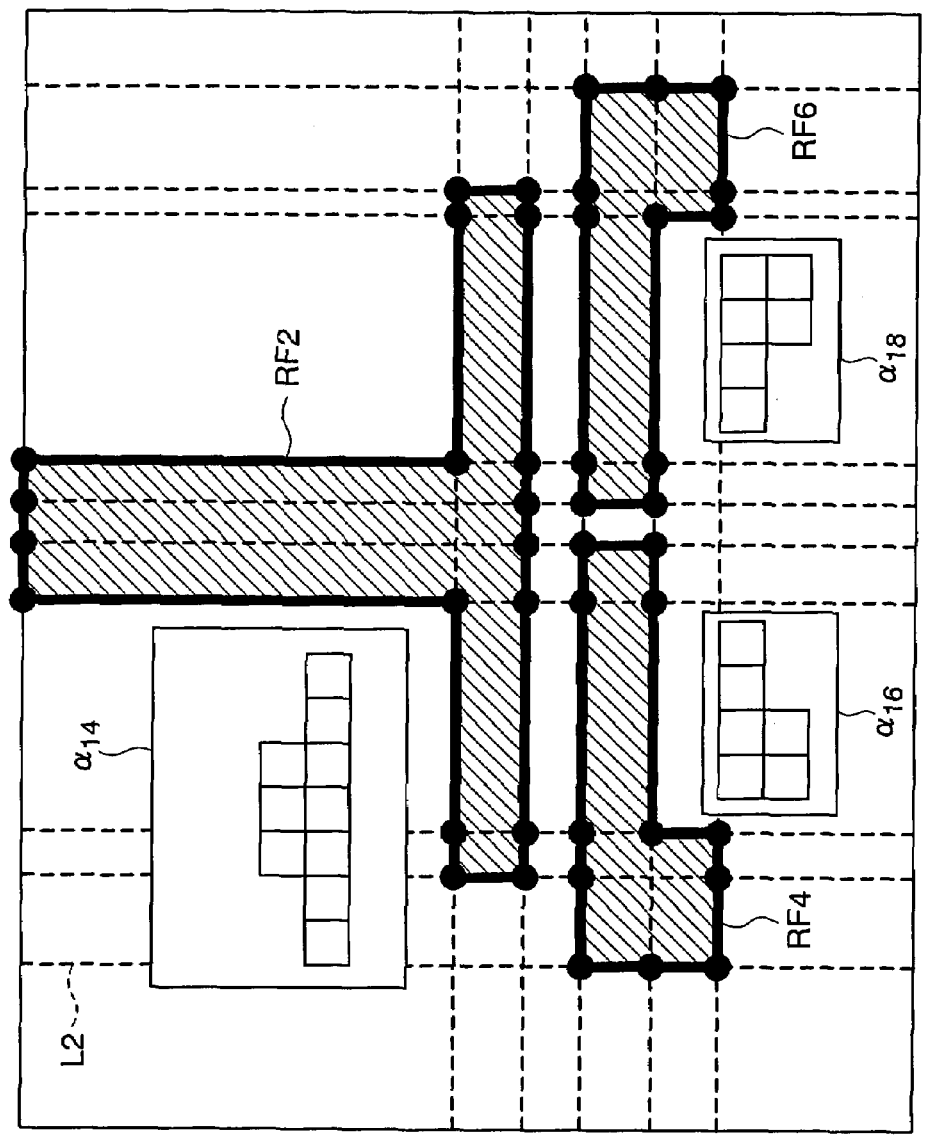
FIG. 10 is a diagram showing an optimum arrangement result of the lattice animal onto the lattice shown in FIG. 7.

One example of the animal arrangement finally selected in this manner is shown in FIG. 10. As shown in the drawing, outlines RF2, RF4, and RF6 of the contours of the patterns were calculated by a figure constituted only of the horizontal/vertical edges.

Figure 11:
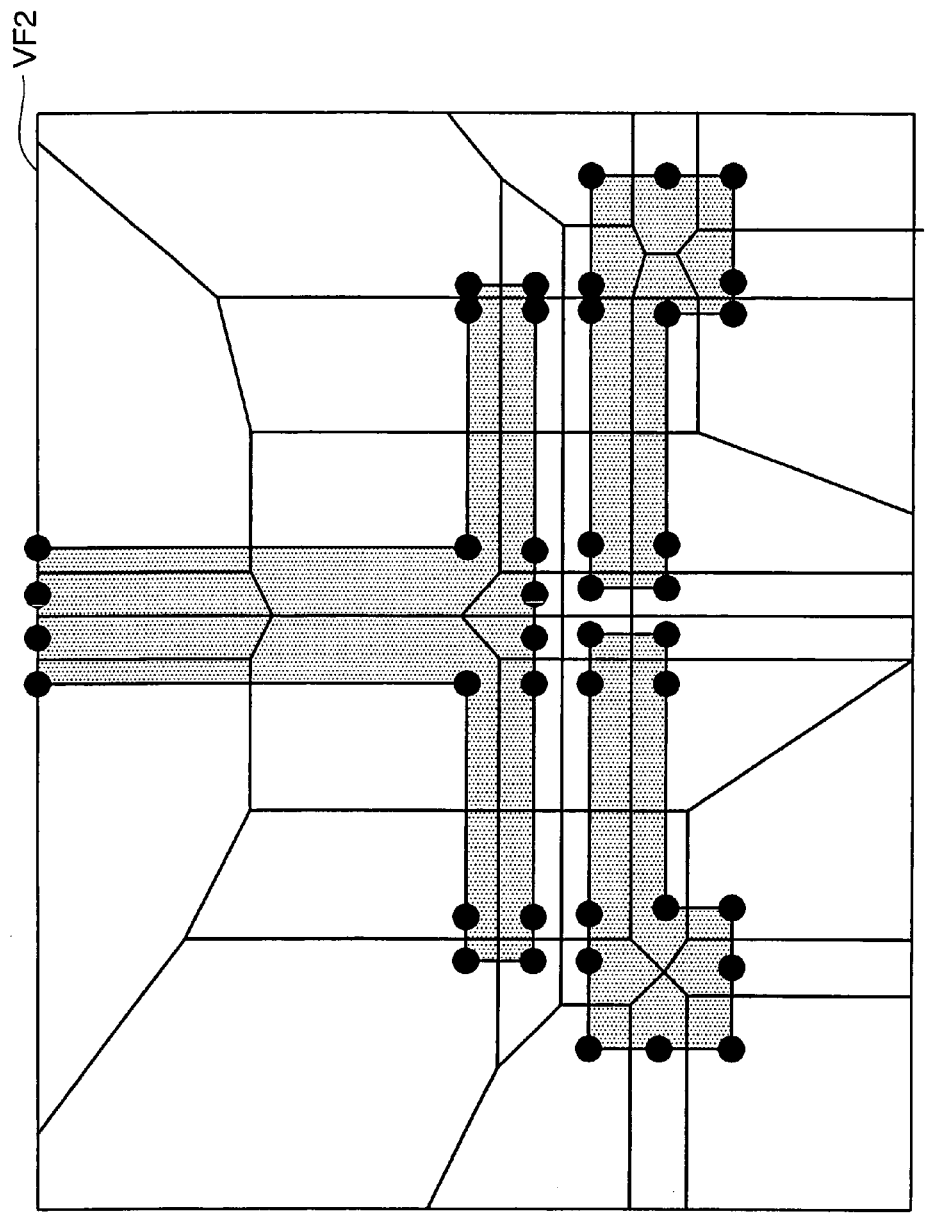
FIG. 11 shows Voronoi diagram prepared with respect to vertices of the lattice animal shown in FIG. 10.

Turning back to FIG. 1, a Voronoi diagram is prepared with respect to the vertices of each lattice animal existing on the outer periphery with respect to the outlines of the pattern contours constituted by the above-described procedure (step S6). FIG. 11 shows a Voronoi diagram VF2 prepared in this manner.

Figure 12:
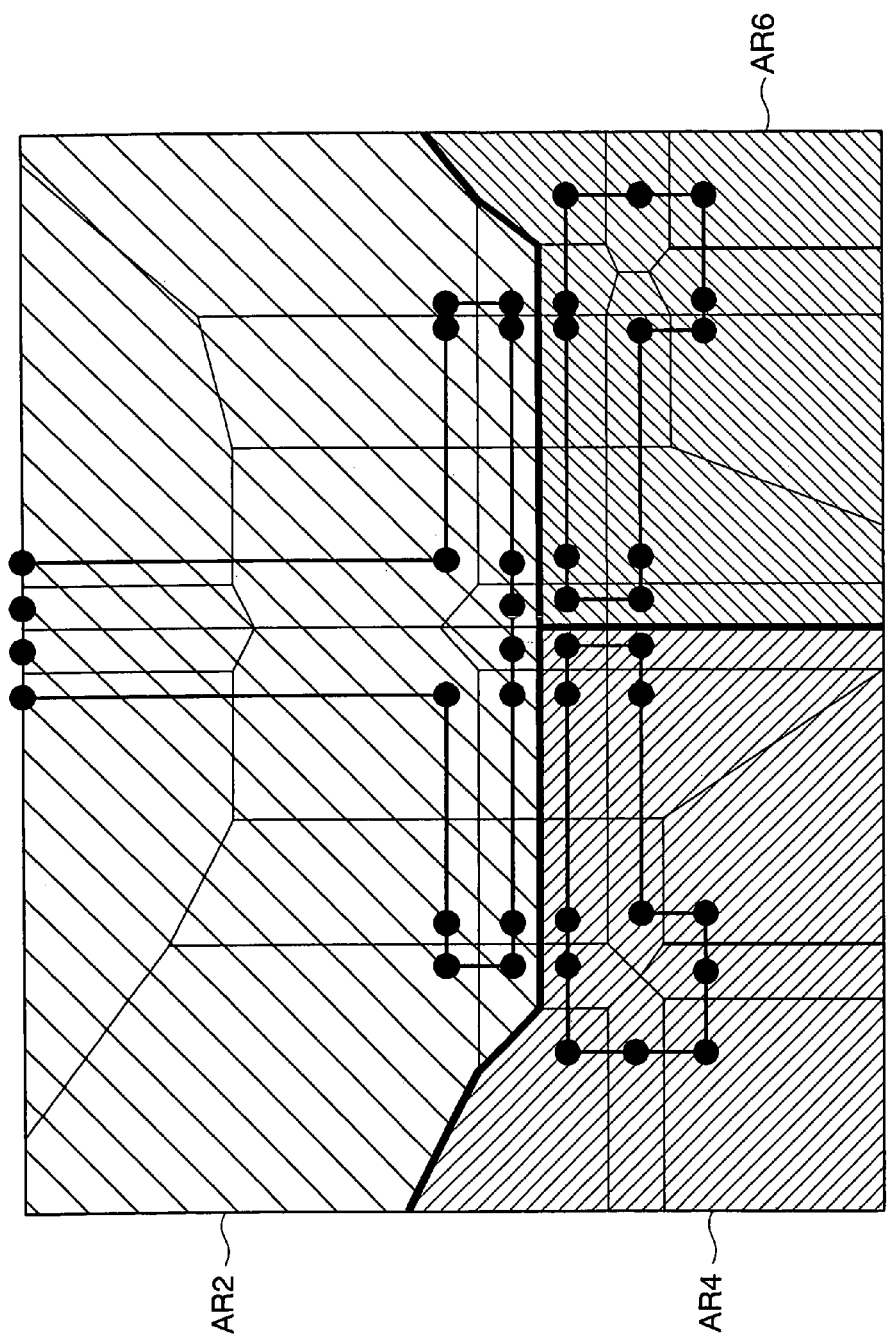
FIG. 12 is a diagram in which the Voronoi diagram shown in FIG. 11 is synthesized.

Next, as shown in FIG. 12, the Voronoi regions including the vertices attributed to the same animal are synthesized with respect to the respective Voronoi regions of the prepared Voronoi diagram VF2, and boundaries of synthesized regions AR2, AR4, AR6 are defined as the spheres of influence of the respective animals to obtain the boundaries in searching the edge as described later (step S7).

Figure 13:
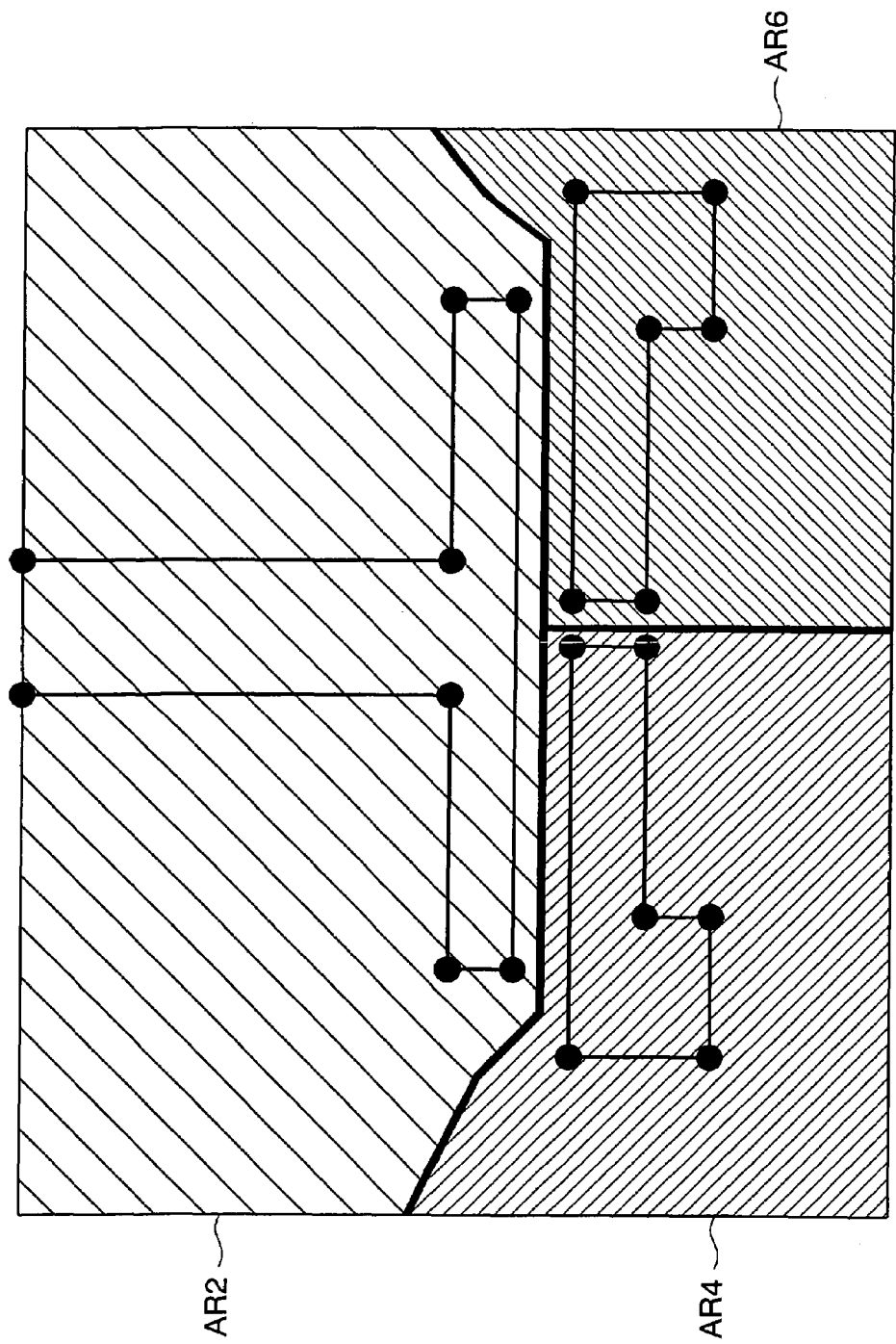
FIG. 13 is a diagram in which a part of vertex data is removed from the diagram shown in FIG. 12.

Subsequently, as shown in FIG. 13, the vertices of the lattice animal which do not exist in corners are removed.

Figure 14:
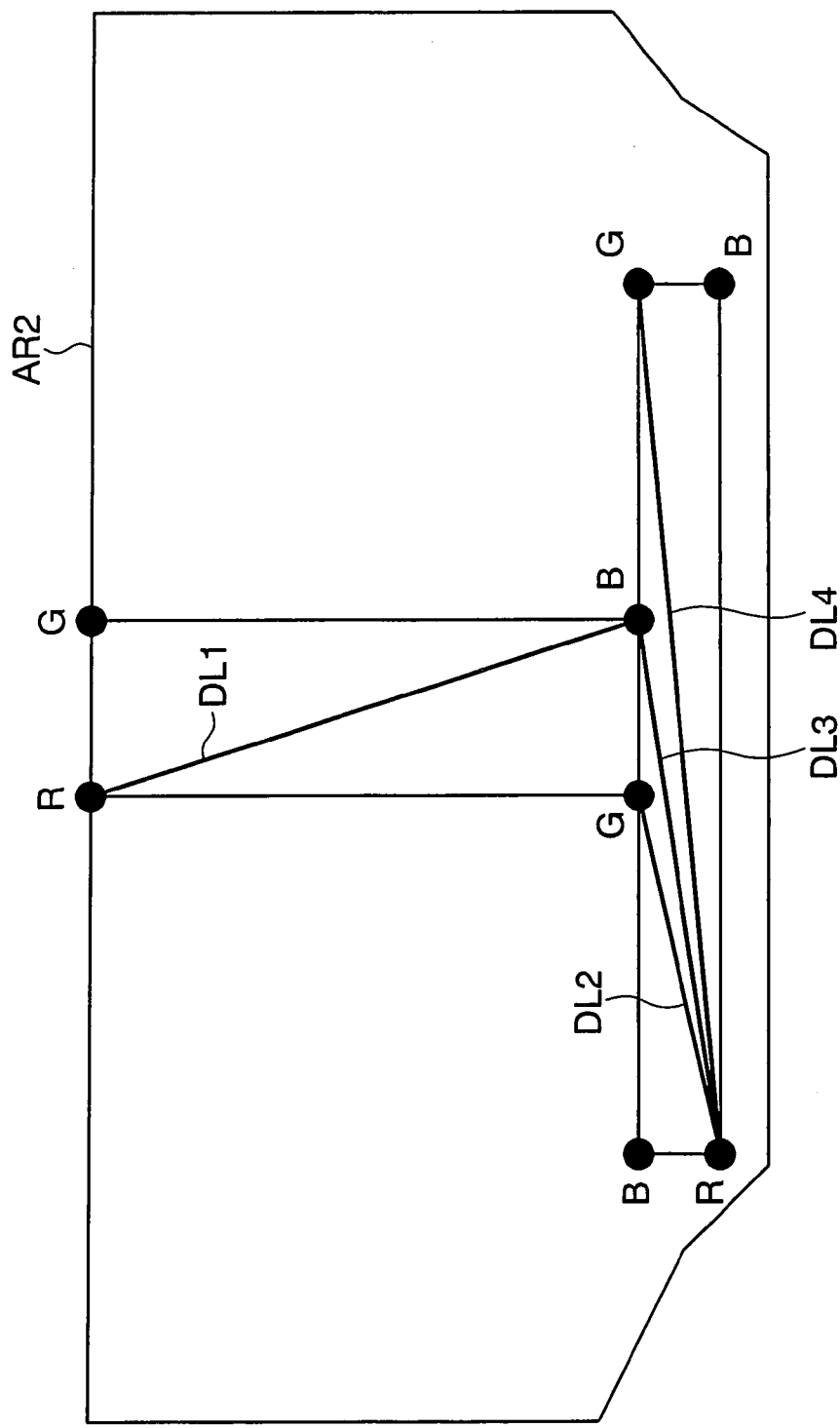
FIG. 14 is a diagram showing a result of a process of dividing an animal which exists in one sphere of influence of the diagram shown in FIG. 13 into triangles and point-coloring each vertex.

Next, one of the regions AR2, AR4, AR6 divided in this manner by the Voronoi diagram is selected (step S8), all diagonal lines which do not intersect with one another are drawn in the animal existing in the region, and the animal is divided into triangles (step S9). Furthermore, the respective vertices of the animal are point-colored in red (R), green (G), and blue (B) following a description order of the chain code (step S10). At this time, the respective vertices of the triangles are colored in such a manner that the vertices disposed adjacent to each other via one edge do not have the same color. FIG. 14 shows a result of the dividing and point-coloring of the animal in this manner with respect to the region AR of FIG. 13.

Figure 15:
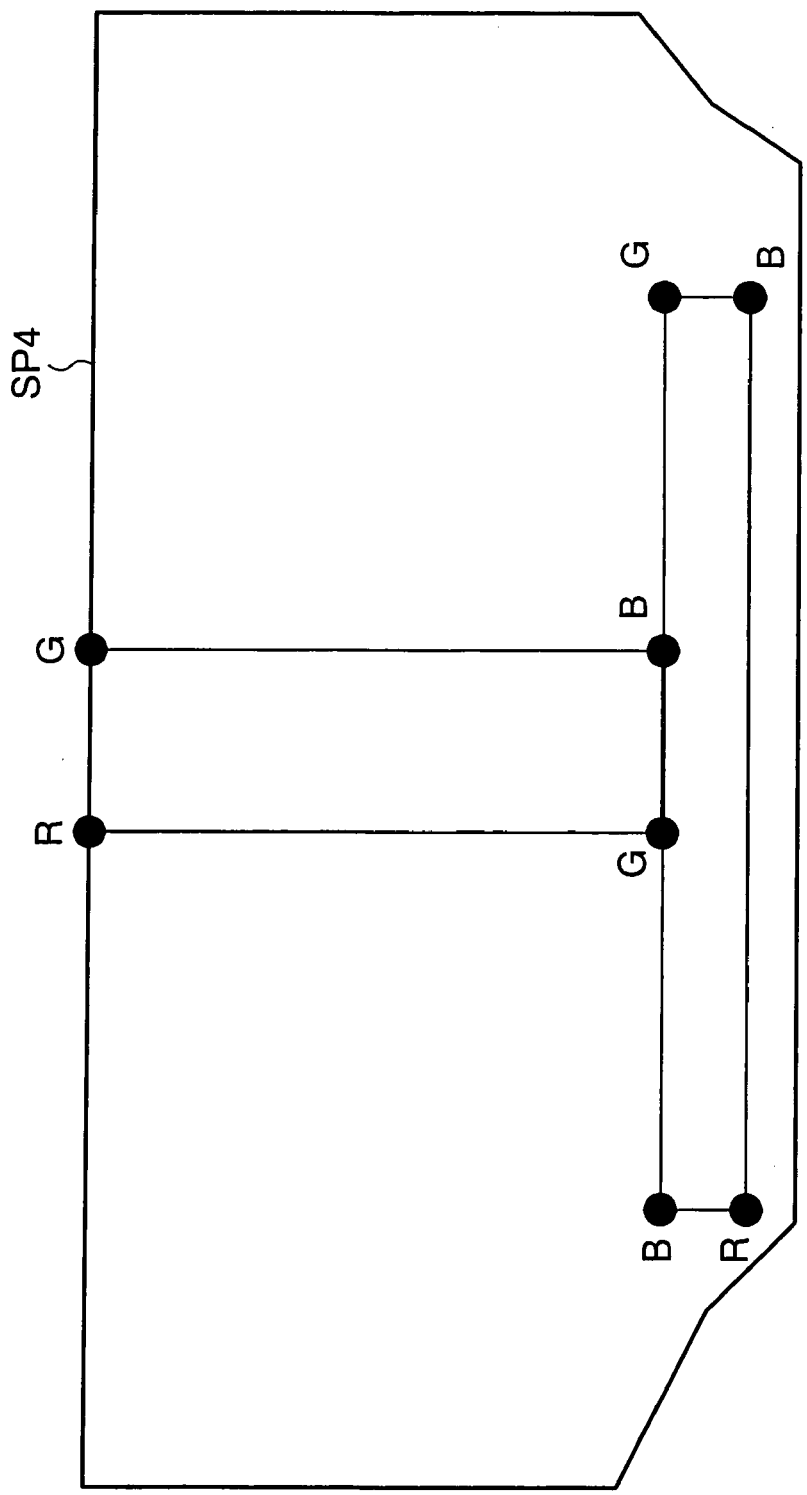
FIG. 15 is a diagram showing a result of star-shaped (convex type) polygon division of the animal arrangement obtained from the image processing result shown in FIG. 14.

Subsequently, the triangles which share the vertex colored in R are synthesized to prepare a new figure SP4 as shown in FIG. 15. The animal arrangement was thus divided into the star-shaped (convex herein) polygon (step S11).

Figure 16:
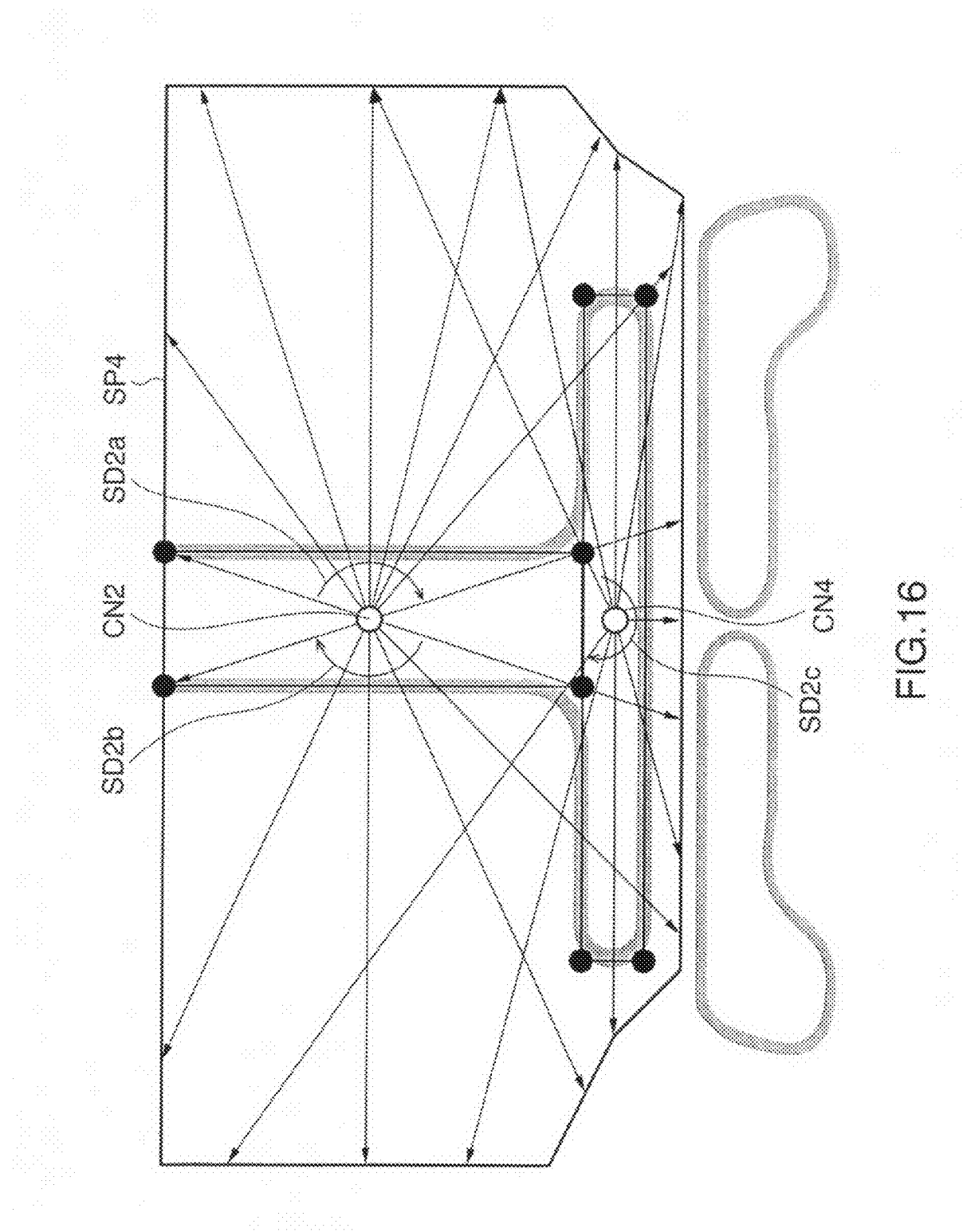
FIG. 16 is a diagram showing kernels of the star-shaped polygon shown in FIG. 15 and edge searching directions from these kernels.

Subsequently, the position coordinate of a core (kernel) is calculated by algorithm of Lee-Preparata described in Info. Proc. Lett. 7, pp. 189 to 192 (1978) with respect to each star-shaped polygon (step S12). As shown in FIG. 16, the gray scale value of an original image is successively checked from the positions of kernels CN2, CN4 toward the outer periphery of the lattice animal (searching directions SD2a to SD2c) in a chain code order of the animal (see FIG. 8A) to the boundary of the sphere of influence (SP4 in FIG. 16) of the lattice animal. The pattern edge position is calculated in accordance with the existing edge searching method, and each calculated edge position is stored in the storage device (see FIG. 42) (step S13). In this case, when a plurality of edges are detected, only one edge closest to the position of the kernel is selected. In the present embodiment, a threshold value method was used, and a threshold value was set to 50%. By this procedure, edge point sequence data remarkably close to an actual pattern edge position is calculated in the form of chain arrangement in one region. To search the edge using the respective kernels CN2, CN4 as the start points, when the embodiment of the searching method of the pattern edge according to the present invention described later is used in addition to the above-described method, the position of the edge can further precisely be calculated.

Subsequently, the steps S8 to S13 are also performed with respect to the other spheres of influence (FIG. 13, AR4, AR6) (steps S14, S15), and the contour data of all the patterns included in the image is labeled and outputted (step S16). Accordingly, for example, the threshold value method can be used to exactly calculate the contour data of all the patterns in the image to be inspected without any wrong detection.

According to the present embodiment, it is possible to output pattern edge data in the form of the chain arrangement for each independent pattern from image data including the pattern in a complicated shape without performing the intricate image matching, referring to enormous amounts of CAD data, or manually dividing the region.

There exists a high-rate algorithm of the order of O (nlogn) (n denotes the number of vertices of the figure which is the object) or less for all the procedures of the Voronoi diagram preparation, the star-shaped polygon generation, the searching of the kernel and the edge searching which are used in the present embodiment. Therefore, by the use of the algorithm, an image processing time can largely be reduced.

It is to be noted that in the present embodiment, a smoothing differential calculus was used in searching the horizontal/vertical components of the edges, the methods such as the threshold value method or a subtractive color process may also be used instead. In the present embodiment, the Voronoi diagram was prepared to generate the sphere of influence of the plurality of patterns existing in the image. However, when there is only one pattern in the image, or when the region is designated beforehand, this region division is unnecessary. Furthermore, when the contour data does not require high accuracy, the animal arrangement is accepted to obtain the calculated maximum integrated value T up to the step S5 of FIG. 1, and the vertex coordinate of the animal may also be used as the contour data of the pattern as such.

(2) Second Embodiment

Next, a second embodiment of the present invention will be described with reference to FIGS. 17 to 21.

In the present embodiment, there is provided an extracting method of the pattern contour in a case in which a plurality of patterns having the contours of schematically convex types exist on the image. In this case, since the kernel can also be set in any position in the pattern, the dividing procedure into the star-shaped polygon in the first embodiment (FIG. 1, steps S9 to S11) can be omitted.

Figure 17:
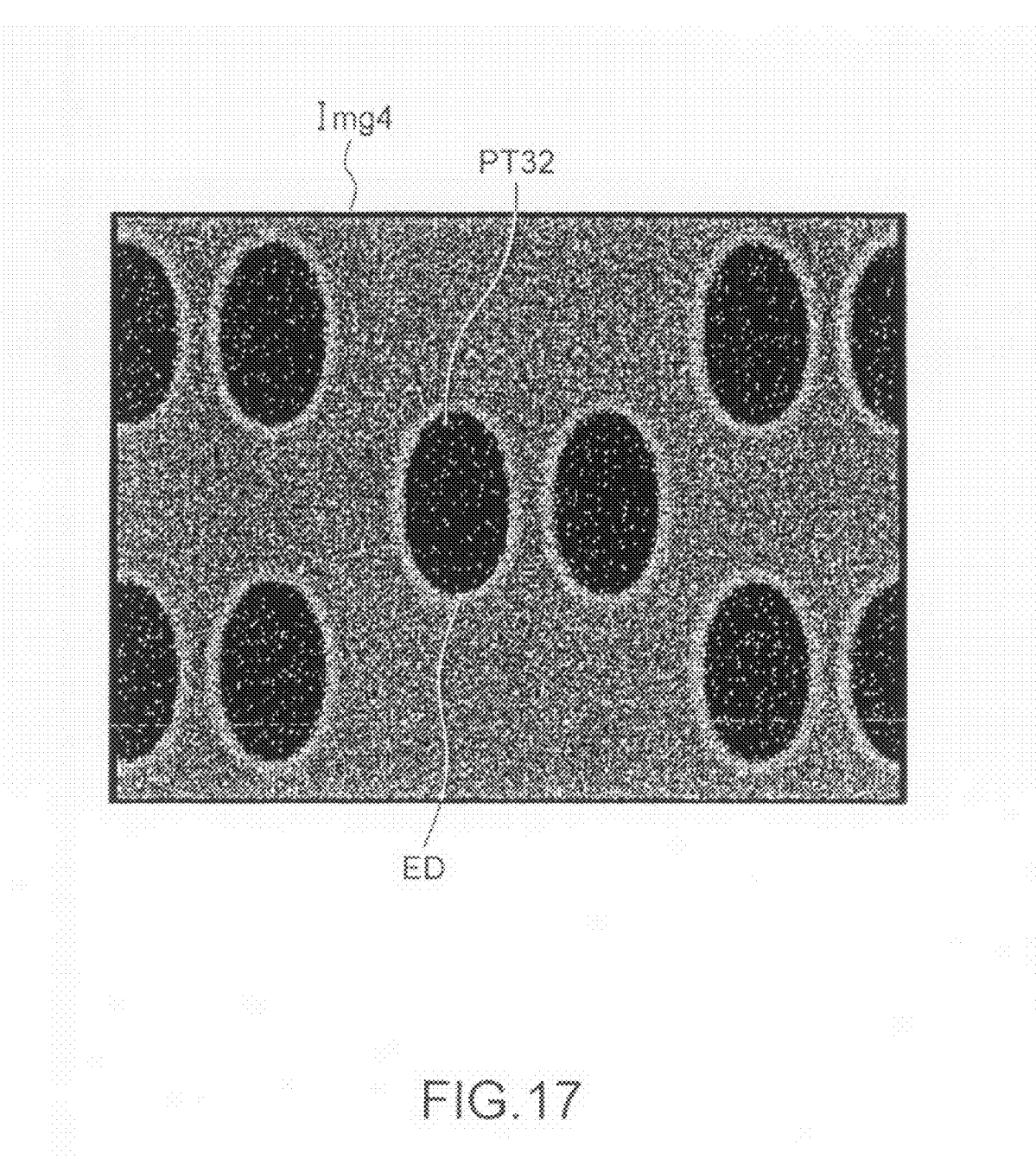
FIG. 17 is a diagram showing one example of the image including a plurality of patterns which have schematically convex contours.

FIG. 17 shows one example of the image including a plurality of patterns PT32 which have schematically convex contours ED.

Figure 18A:
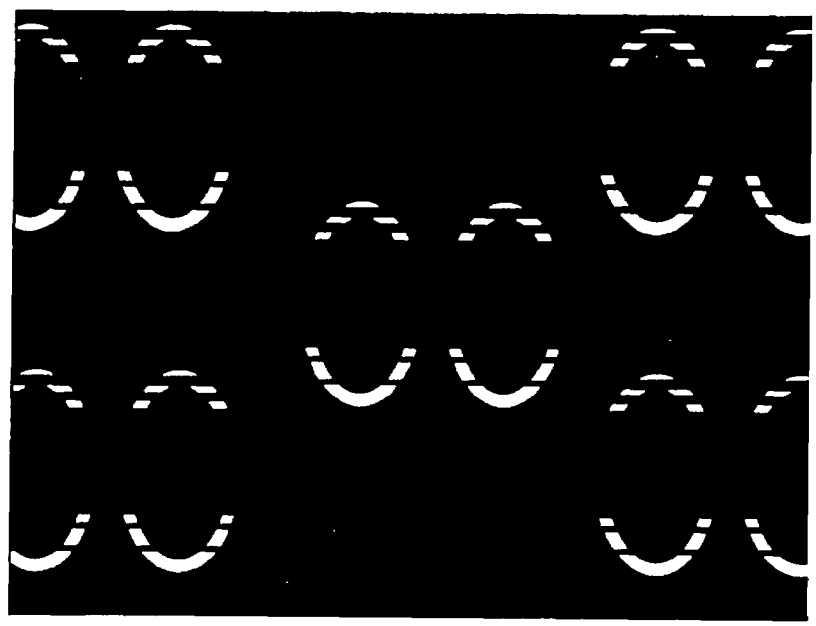
FIG. 18A shows data of edge components of a horizontal direction in the coordinate data of the pattern edge extracted from the image shown in FIG. 17.
Figure 18B:
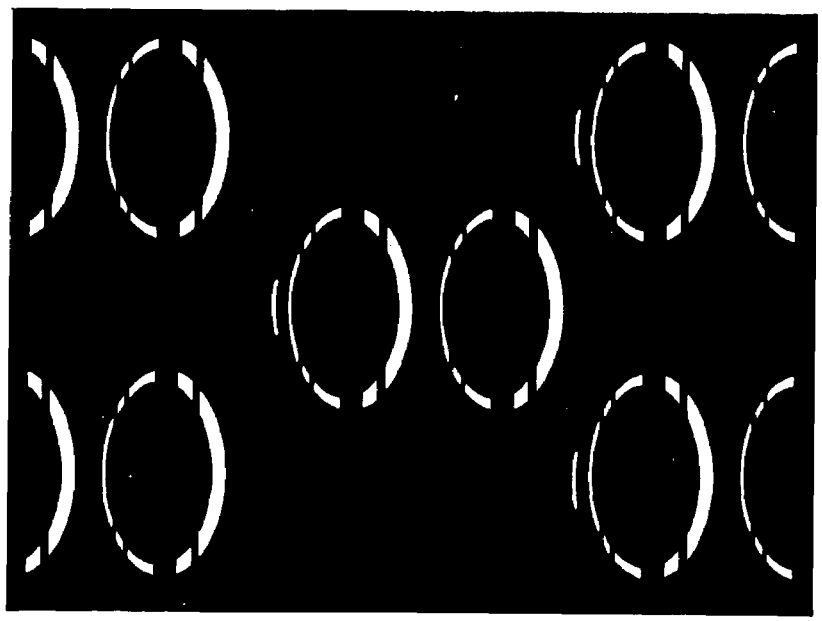
FIG. 18B shows the data of the edge components of a vertical direction in the coordinate data of the pattern edge extracted from the image shown in FIG. 17.

In the same manner as in the first embodiment, for example, an inspection object image Img4 is acquired, and the edge components in the horizontal and vertical directions of the image Img4 are extracted as shown in FIGS. 18A and 18B (FIG. 1, step S2).

Figure 19A:
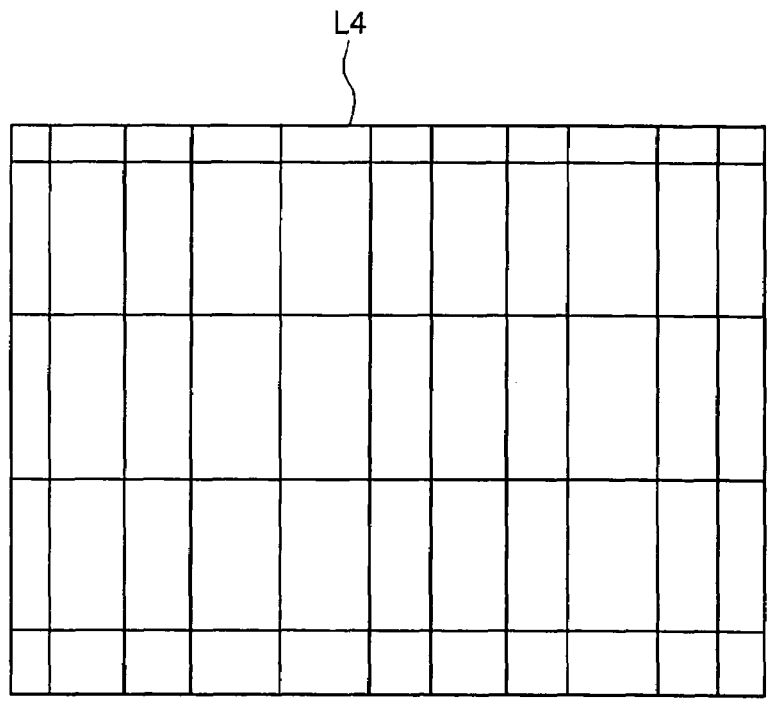
FIG. 19A shows a lattice generated by classifying the edge components shown in FIGS. 18A and 18B.
Figure 19B:
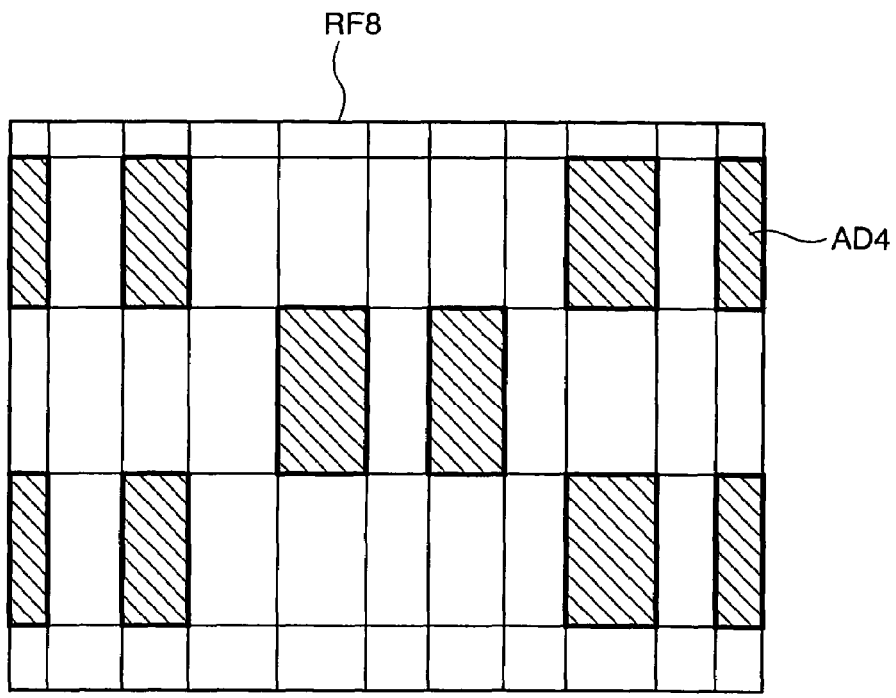
FIG. 19B shows the animal arrangement obtained by referring to an animal table.

Next, the extracted edge components are classified into four levels in the vertical direction and ten levels in the horizontal direction, a lattice L4 is generated based on a schematic edge position as shown in FIG. 19A, and further the animal table is referred to in calculating an animal arrangement (AD4) having a higher probability as shown in FIG. 19B.

Figure 20A:
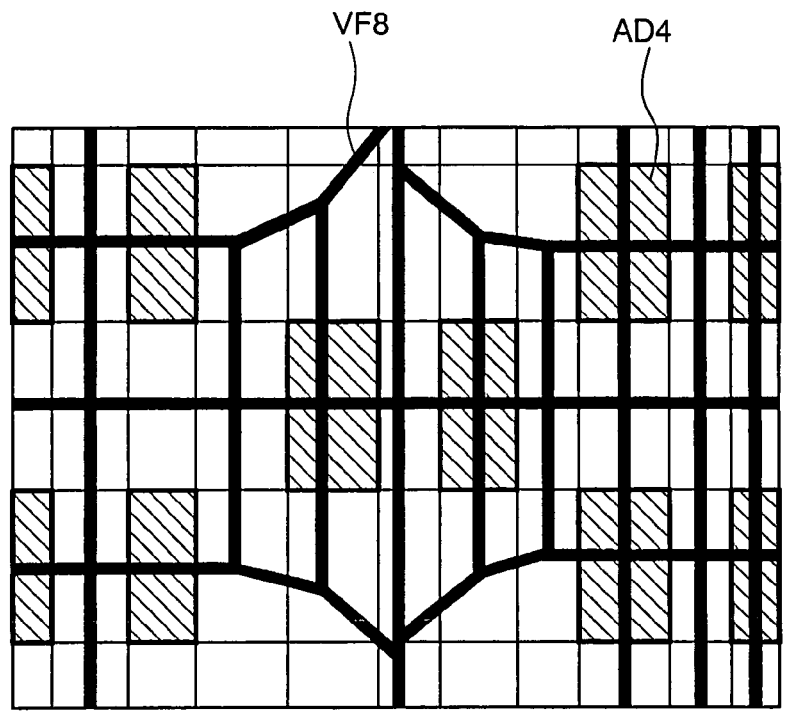
FIG. 20A shows a Voronoi diagram prepared with respect to the vertex of the animal shown in FIG. 19B.
Figure 20B:
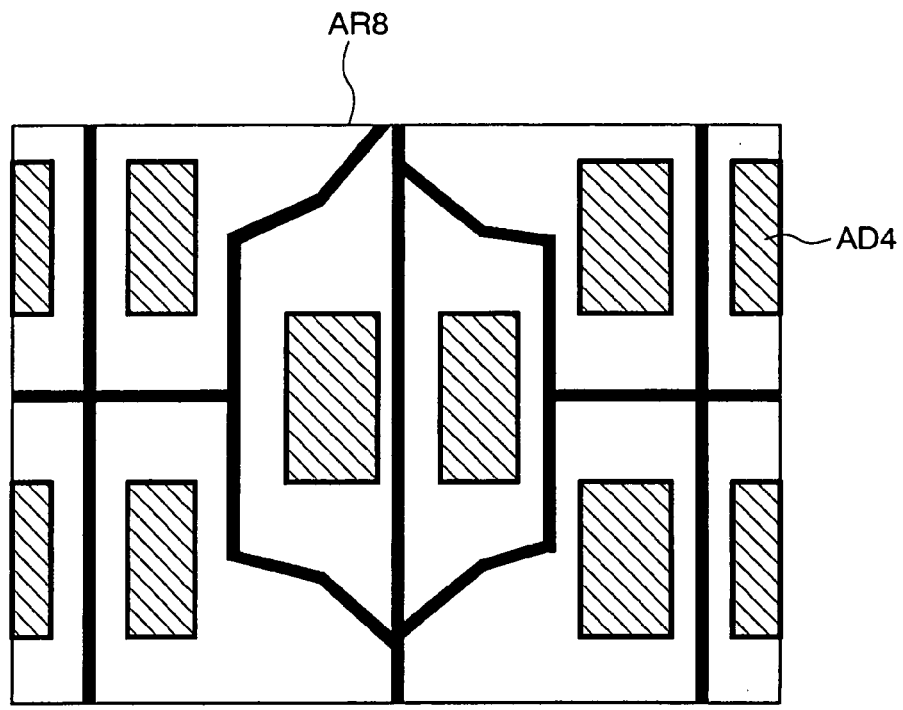
FIG. 20B shows a Voronoi diagram in which Voronoi regions of FIG. 20A are integrated.

Next, a Voronoi diagram VF8 is prepared with respect to the vertex of the animal as shown in FIG. 20A, and further the regions belonging to the same animal are unified to define a new Voronoi region AR8 as shown in FIG. 20B.

Figure 21:
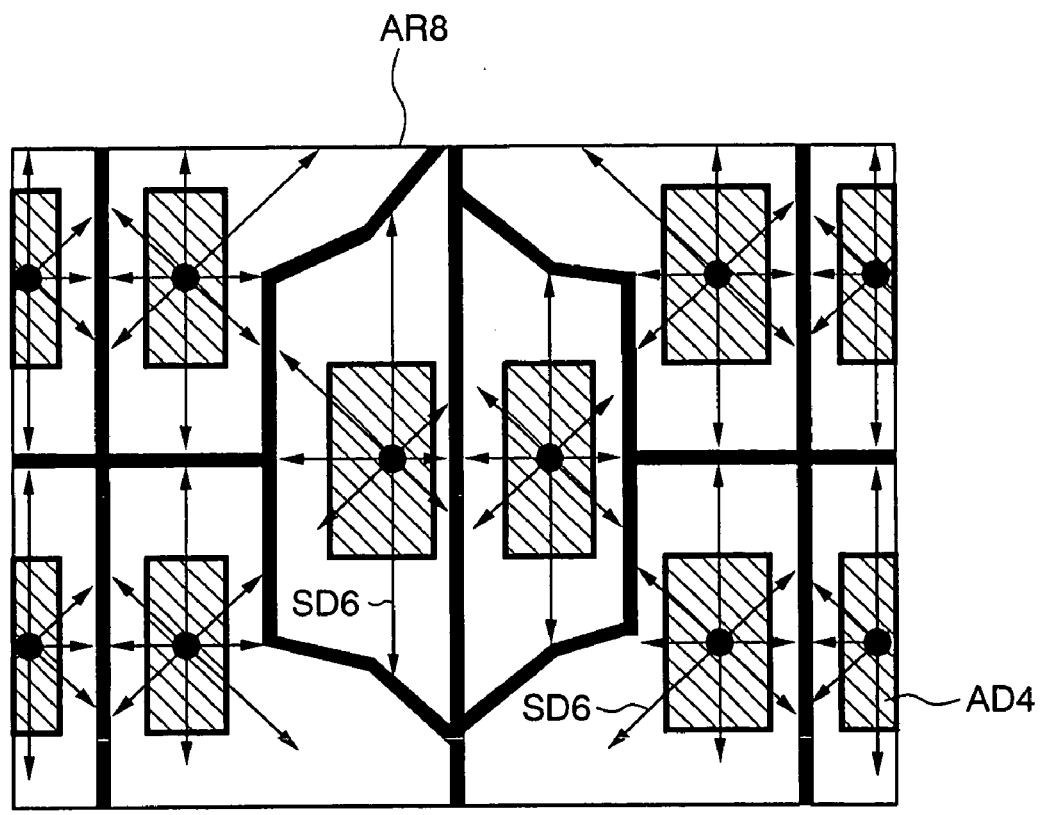
FIG. 21 is a diagram showing the edge searching directions from the kernels inside the animals in the regions shown in FIG. 20B.

Furthermore, as shown in FIG. 21, the pattern edges are searched along radial directions SD6 toward each boundary from one point (kernel) inside the animal in each region, and the contour data is extracted. With regard to search of the edge from each kernel which is the start point, the searching method of the pattern edge according to the embodiment of the present invention described later can be used in addition to the method according to the related art. In this case, the position of the edge can more precisely be calculated.

As described above, according to the present embodiment, when a plurality of patterns having the contours of the schematic convex types exist on the image, it is possible to accurately acquire the data of the pattern contour in a simpler procedure.

(3) Third Embodiment

A third embodiment of the present invention will be described with reference to FIGS. 22A to 24. In the present embodiment, there is provided an extracting method of the pattern contour, in which the acquired image includes the single pattern only but the contour of the pattern is not regarded as the convex shape.

Figure 22A:
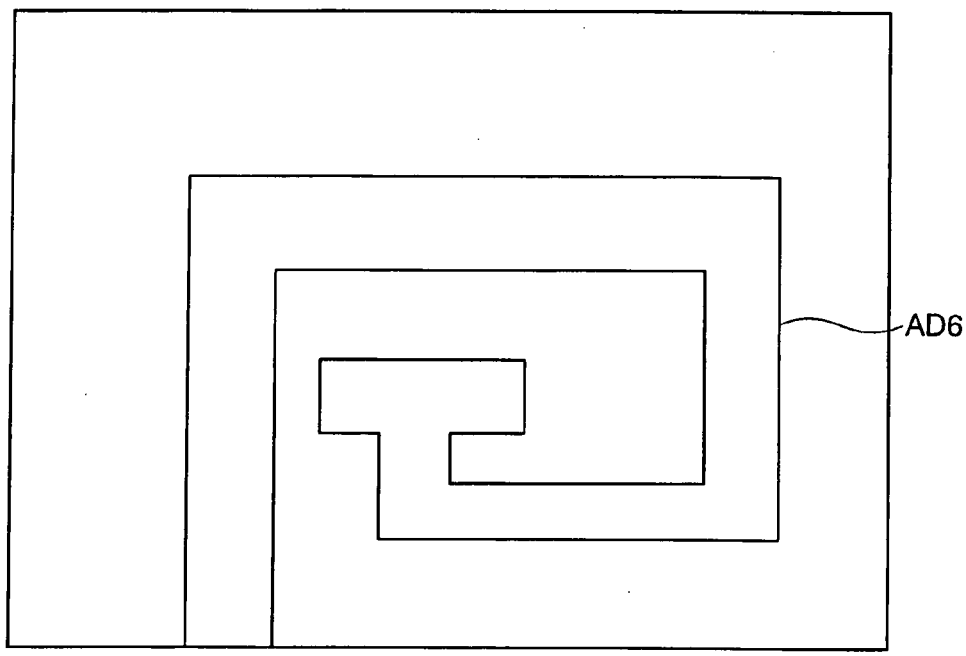
FIG. 22A is a diagram showing one example of the lattice animal arrangement obtained from the image including a single pattern only.

First, the schematic contour of the pattern to be inspected is represented by the lattice animal in a procedure similar to that of the first embodiment (FIG. 1, steps S1 to S5). As a result, one example of the lattice animal arrangement is obtained with respect to the single pattern. One example of the lattice animal arrangement thus obtained is shown in FIG. 22A. In the present embodiment, since only the pattern to be inspected is included in the image, it is not necessary to calculate the sphere of influence of the pattern any more. Therefore, the procedure for calculating the Voronoi diagram (FIG. 1, steps S6 to S8) can be omitted.

Figure 22B:
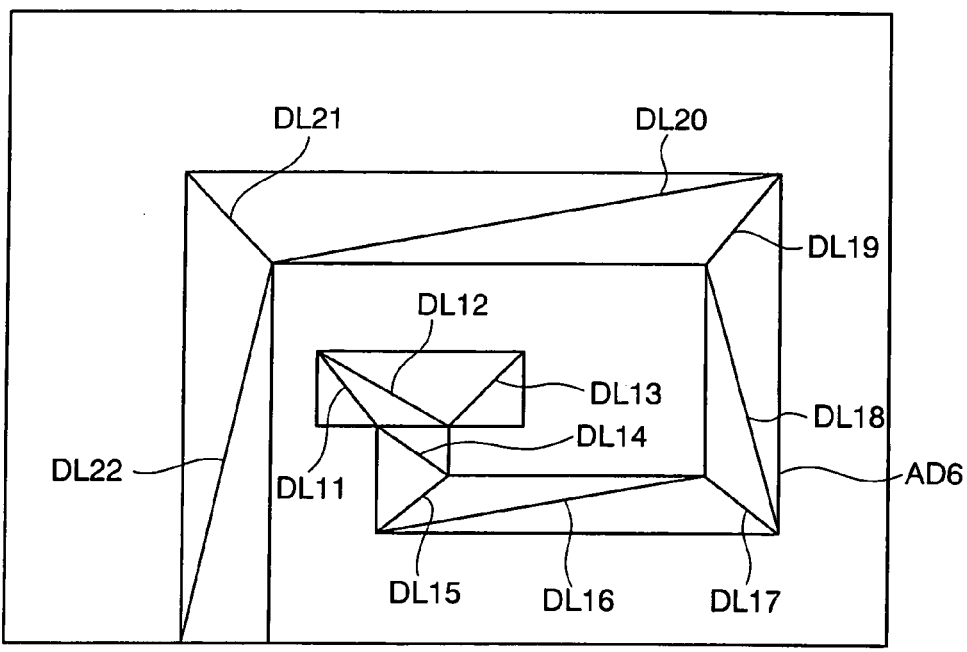
FIG. 22B is a diagram showing a result of triangulation of the lattice animal arrangement shown in FIG. 22A.

The diagonal lines are drawn with respect to the obtained lattice animal to perform the triangulation (FIG. 1, step S9). A lattice animal AD6 shown in FIG. 22A can be divided into the triangles, when twelve diagonal lines DL11 to DL22 are drawn as shown in FIG. 22B.

Figure 23A:
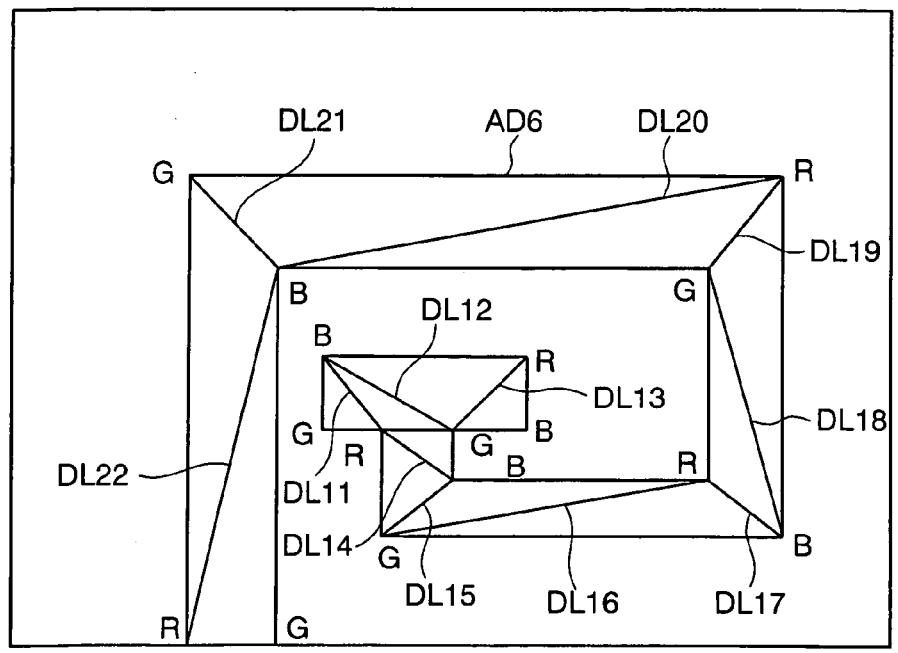
FIG. 23A shows a result of the point coloring performed with respect to the vertices of triangles obtained in FIG. 22B.
Figure 23B:
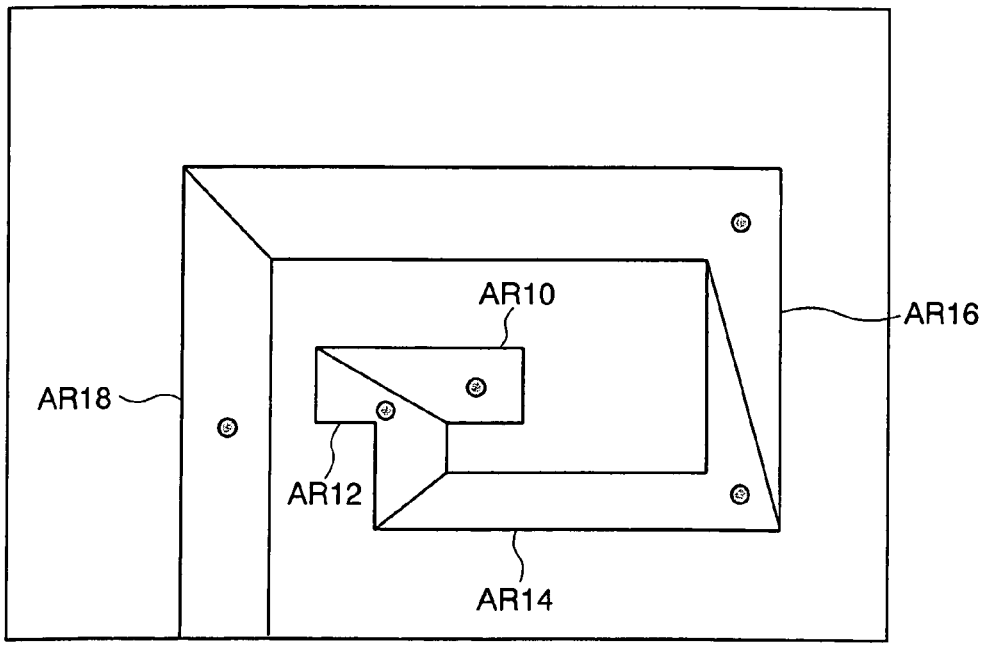
FIG. 23B is a diagram showing the result of kernel calculation performed with respect to the star-shaped polygon obtained from the triangles shown in FIG. 23A.

Subsequently, in the same manner as in the first embodiment, the vertices of each triangle are point-colored in three colors as shown in FIG. 23A (FIG. 1, step S10), and further the triangles sharing the vertex colored, for example, in R are integrated to perform the division by the star-shaped polygon (FIG. 1, step S11). Subsequently, the position of each kernel is calculated with respect to each star-shaped polygon in the same manner as in the first embodiment (FIG. 1, step S12). Accordingly, as shown in FIG. 23B, the start point of the edge searching and the edge searching region without any wrong detection were obtained.

Thereafter, although not especially shown, in the same manner as in the first embodiment, the edge is searched toward the outer periphery of each star-shaped polygon from each kernel (see FIG. 1, step S13).

As described above, according to the present embodiment, even with the pattern including the contour which cannot be regarded as the convex shape, when the image including the single pattern only is obtained, the data of the pattern contour can be acquired by a simpler procedure and for a shorter inspection time. It is to be noted that for the edge searching, with the use of the searching method of the pattern edge according to the embodiment of the present invention described later, the edge position can further precisely be detected.

(4) Fourth Embodiment

Figure 24:
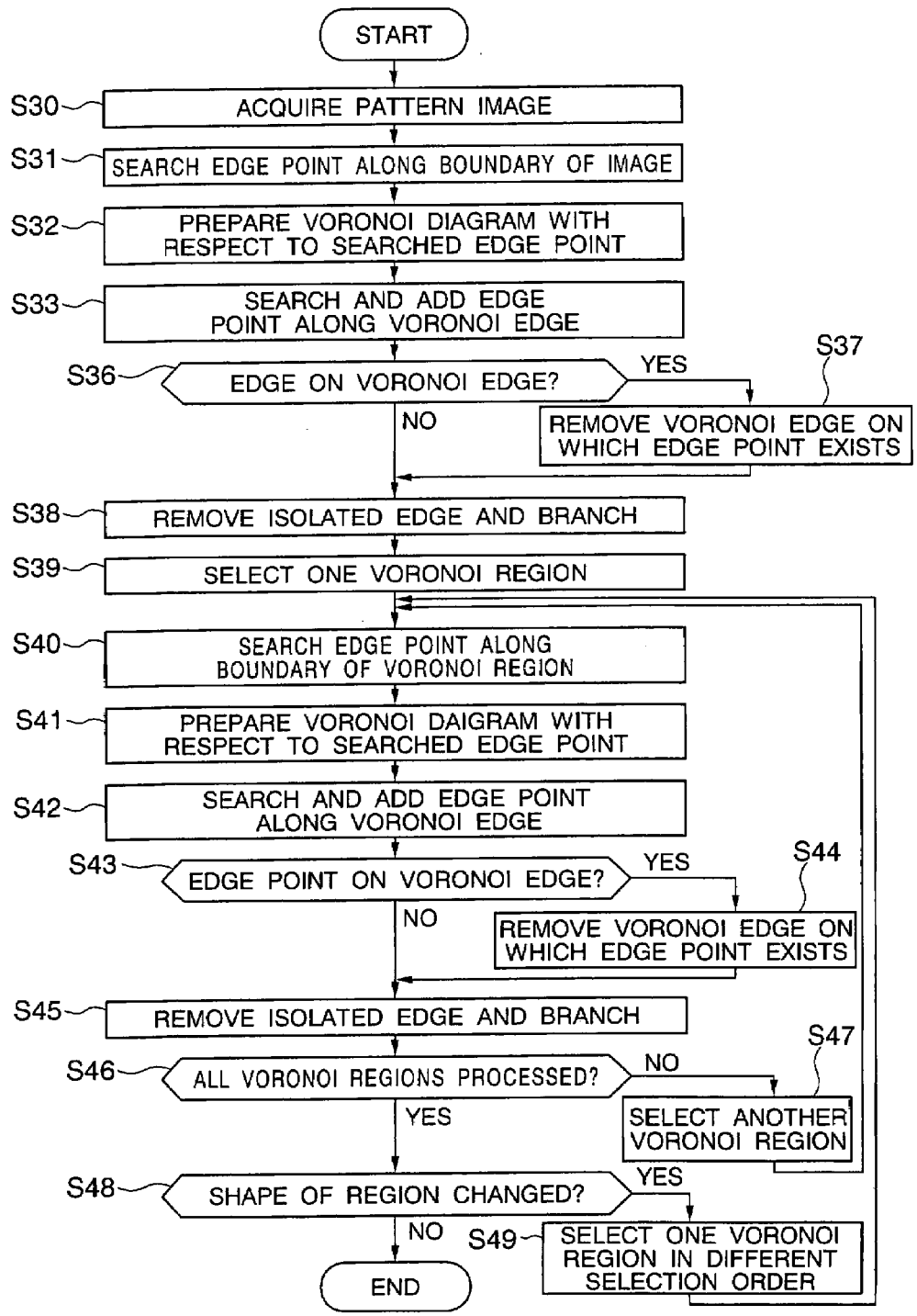
FIG. 24 is a flowchart showing a schematic procedure of an image processing method in a fourth embodiment of the present invention.

A fourth embodiment of the present invention will be described with reference to FIGS. 24 to 26. FIG. 24 is a flowchart showing a schematic procedure of the extracting method of the pattern contour including the image processing method of the present embodiment, and FIGS. 25A to 26E show examples of the image processed by the procedure shown in FIG. 24.

Figure 25A:
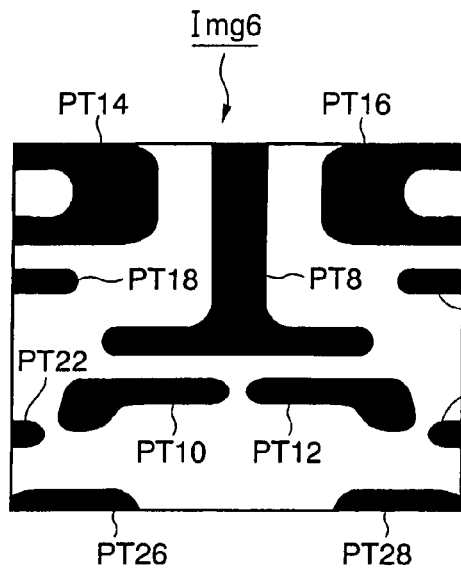
FIGS. 25A to 25D are diagrams showing specific examples of the image processed by the procedure shown in FIG. 24.

First, the gray scale image data of the pattern which is the object of the inspection is acquired, for example, by SEM (FIG. 24, step S30). One example of the acquired image data is shown in FIG. 25A. An image Img6 shown in the drawing includes eleven patterns in total including patterns PT8, PT14, PT16 having the contours which cannot be regarded as the convex shapes.

Figure 25B:
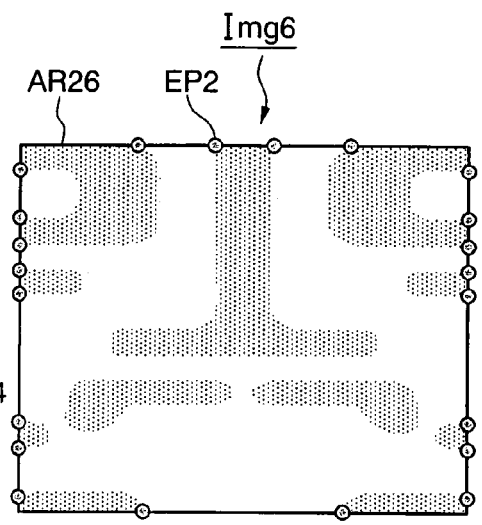

Next, as shown in FIG. 25B, a pattern edge EP2 is searched along a boundary AR26 of the inspection image Img6 (step S31). To search the pattern edge, the smoothing differential calculus was used to define the peak position after the smoothing differentiation as the pattern edge.

Figure 25C:
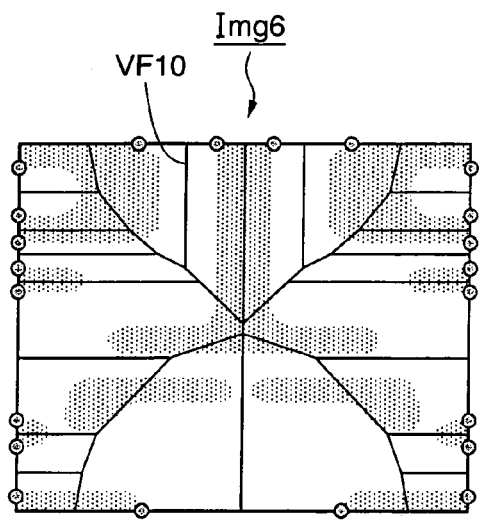

Next, a Voronoi diagram VF10 is prepared with respect to the edge point EP2 found on the boundary AR26 as shown in FIG. 25C (step S32).

Figure 25D:
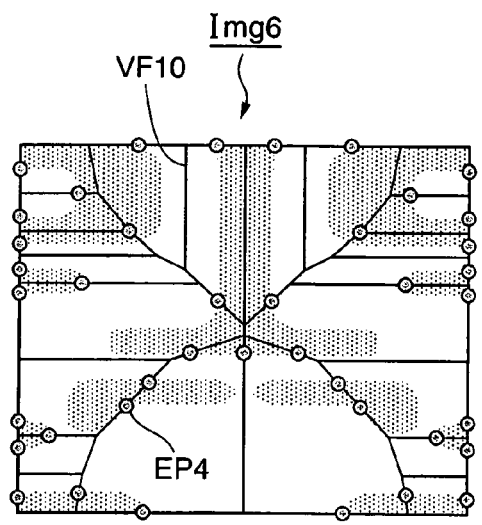

Next, as shown in FIG. 25D, the edge searching by the smoothing differentiation is again performed along each edge of the Voronoi diagram VF10 (step S33).

Figure 26A:
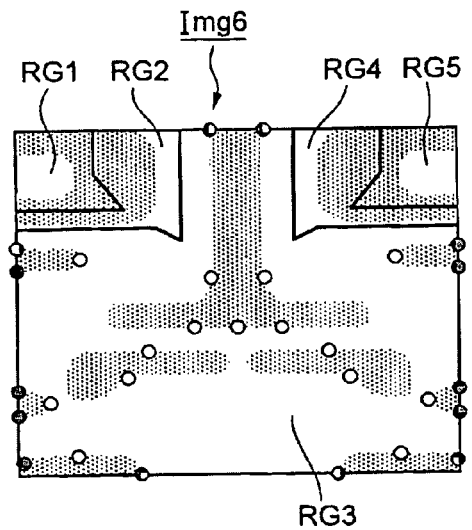
FIGS. 26A to 26E are diagrams showing the specific examples of the image processed by the procedure shown in FIG. 24.

Next, the edge including a pattern edge point EP4 is removed from the respective edges of the Voronoi diagram VF10 (steps S 36, S37), and further isolated edges and branches are removed (step S38). Accordingly, as shown in FIG. 26A, the whole gray scale image Img6 is divided into five regions RG1 to RG5.

Figure 26B:
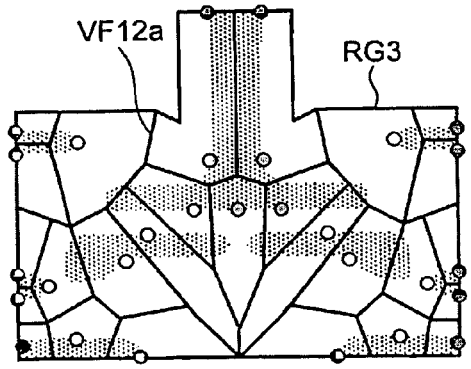

Next, with respect to the respective regions RG1 to RG5, in the same manner as in the steps S31 and S32, the edge point is searched along the boundary of the region (step S40), and the Voronoi diagram is prepared with respect to the searched edge point sequence again (step S41). FIG. 26B representatively shows a Voronoi diagram VF12a prepared again with respect to the lower region RG3.

Figure 26C:
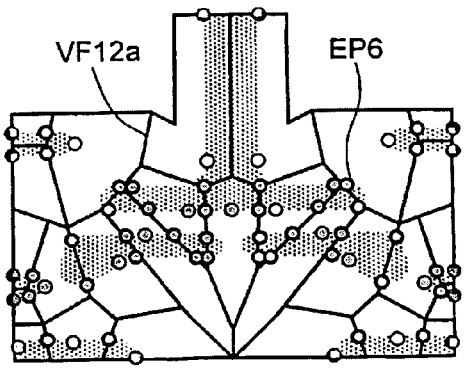

Next, the edge is searched along a Voronoi edge in the same manner as in the step S32 (step S42). An edge point EP6 obtained as a result of the edge searching is shown in FIG. 26C.

Figure 26D:
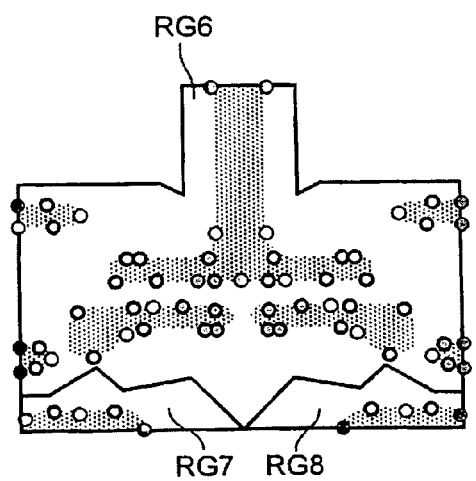

Next, the Voronoi edges, and the isolated edges and branches including the edge point EP6 are removed in the same manner as in the steps S36 to S38 (steps S43 to S45). As a result, as shown in FIG. 26D, the original region RG3 is further divided into three regions RG6 to RG8.

Figure 26E:
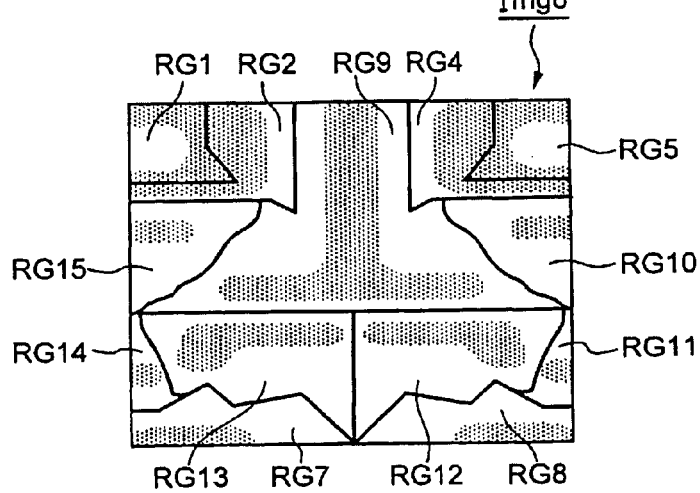

Furthermore, the above-described procedure is recursively performed with respect to all the divided regions, until the shape of each divided region becomes unchanged (steps S48, S49, S40 to S47). As a result, as shown in FIG. 26E, the pattern image Img6 was divided into a large number of regions RG1, RG2, RG4 and RG5, RG7 to RG15 so that each region finally includes one pattern edge.

As described above, according to the present embodiment, with the inspection image including a plurality of patterns including the patterns having the contours which cannot be regarded as the convex shape, the inspection image can be divided so as to include each pattern edge.

Finally, the searching method of the pattern edge in the first to third embodiments is used to search the edge for each region. Accordingly, all the pattern edges can be acquired as the chained arrangement data for each region. It is to be noted that with the use of the pattern edge searching method in ninth and tenth embodiments described later, the edge position can more precisely be calculated.

(5) Fifth Embodiment

Figure 27:
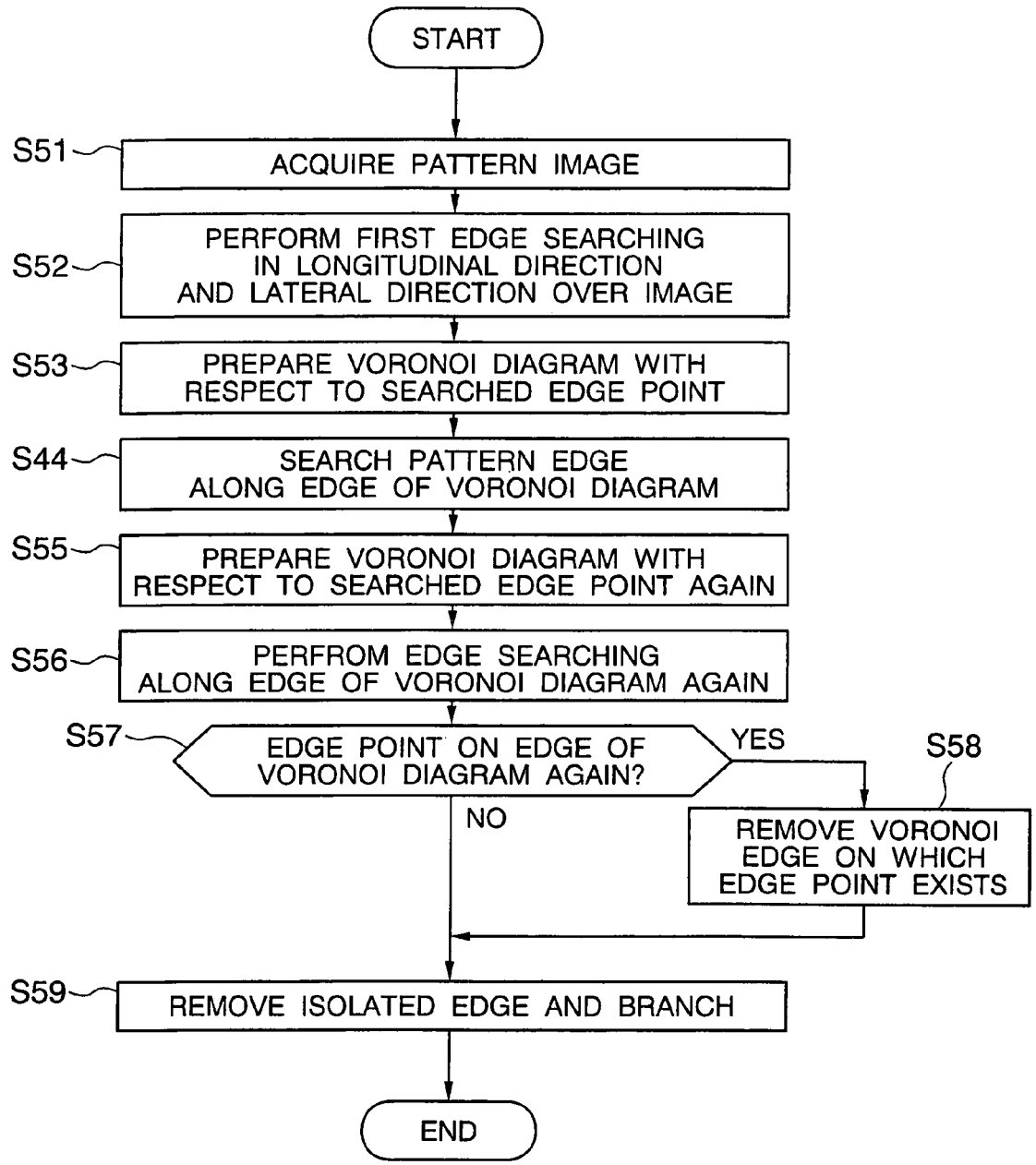
FIG. 27 is a flowchart showing the schematic procedure of the image processing method in a fifth embodiment of the present invention.

Next, a fifth embodiment of the present invention will be described with reference to FIGS. 27 to 29C. FIG. 27 is a flowchart showing the schematic procedure of the image processing method in the present embodiment. FIGS. 28A to 28D and FIGS. 29A to 29C are diagrams showing the examples of the image processed by the procedure shown in FIG. 27. According to the present embodiment, there is provided the extracting method of the pattern contour including the image processing method in a case in which the pattern edge intersecting with the boundary of the acquired gray scale image does not exist in the image.

Figure 28A:
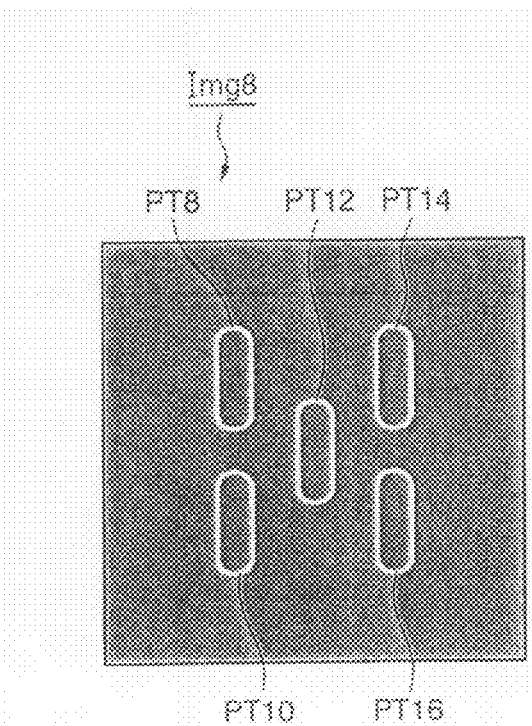
FIGS. 28A to 28D are diagrams showing the specific examples of the image processed by the procedure shown in FIG. 27.
Figure 28B:
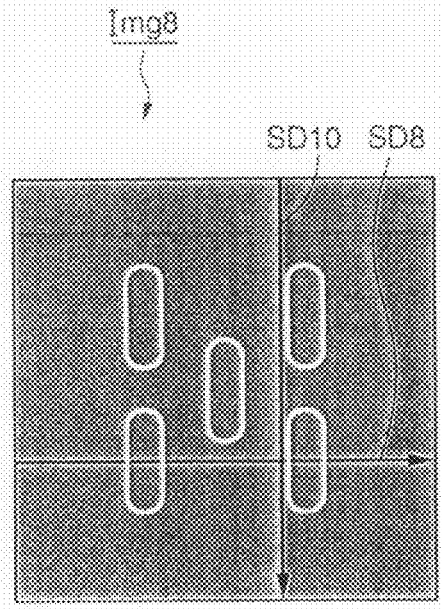

First, after acquiring an image Img8 of the pattern as shown in FIG. 28A (FIG. 27, step S51), as shown in FIG. 28B, first edge searching is performed in a longitudinal direction SD10 over the whole image Img8 and in a lateral direction SD8 over the whole image Img8 (step S52). In the present embodiment, each edge direction is set in a position where a length and width of the image Img8 are divided at a golden ratio, but it is possible appropriately change the position and number of the direction.

Figure 28C:
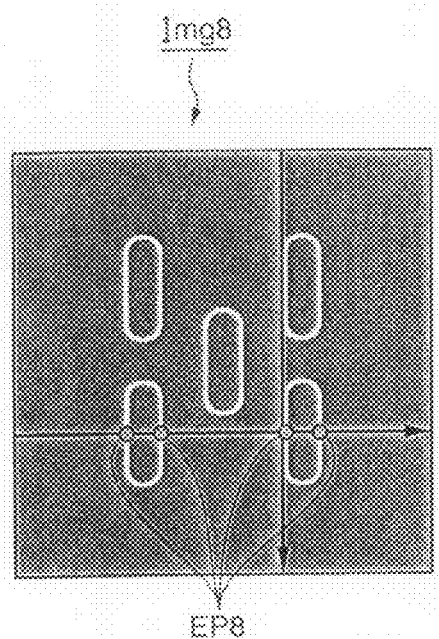
Figure 28D:
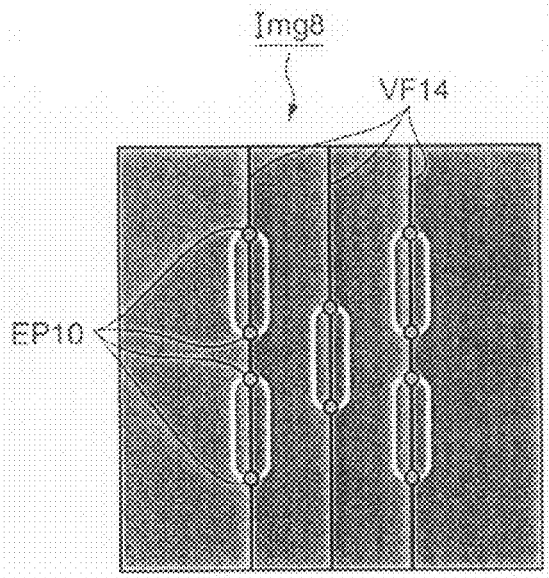

As a result of the edge searching, the position coordinate of pattern edges EP8 was obtained as shown in FIG. 28C.

Next, the Voronoi diagram VF is prepared with respect to the searched edge point (step S53). For the prepared Voronoi diagram, as in VF14 shown in FIG. 28D, substantially parallel straight lines are obtained.

Next, the edge is searched along the Voronoi edge of the prepared Voronoi diagram (step S54), and further the Voronoi diagram is prepared with respect to obtained edge points EP10 (step S55). As a result, a Voronoi diagram VF16 shown in FIG. 29A was obtained.

Figures 29A, 29B:
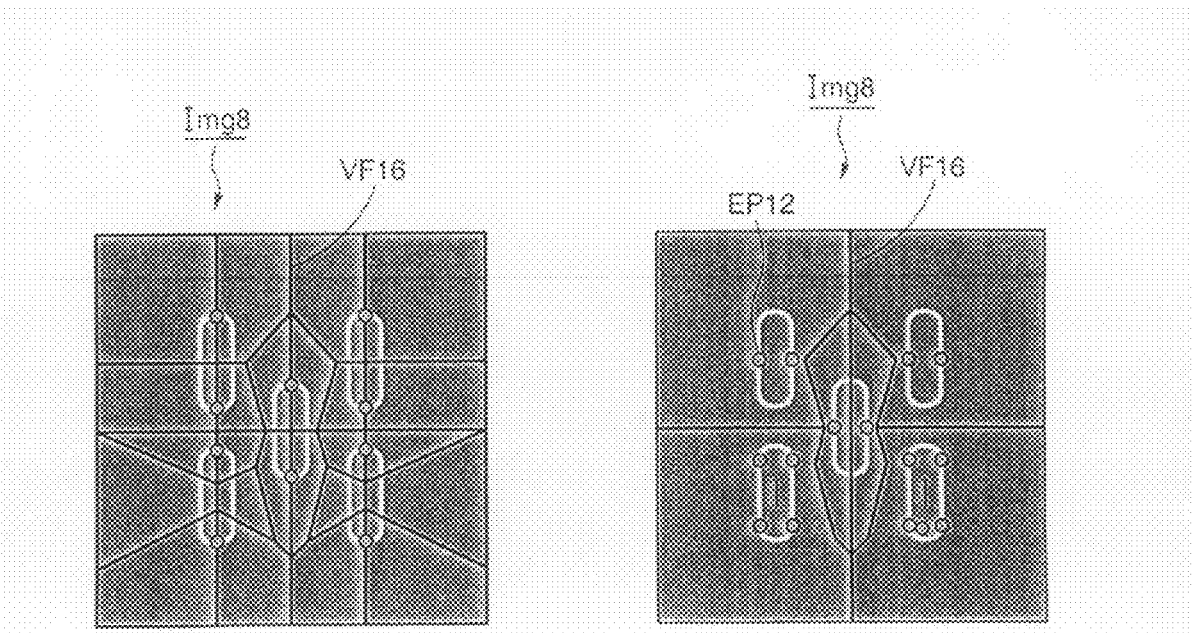
FIGS. 29A to 29C are diagrams showing the specific examples of the image processed by the procedure shown in FIG. 27.
Figure 29C:
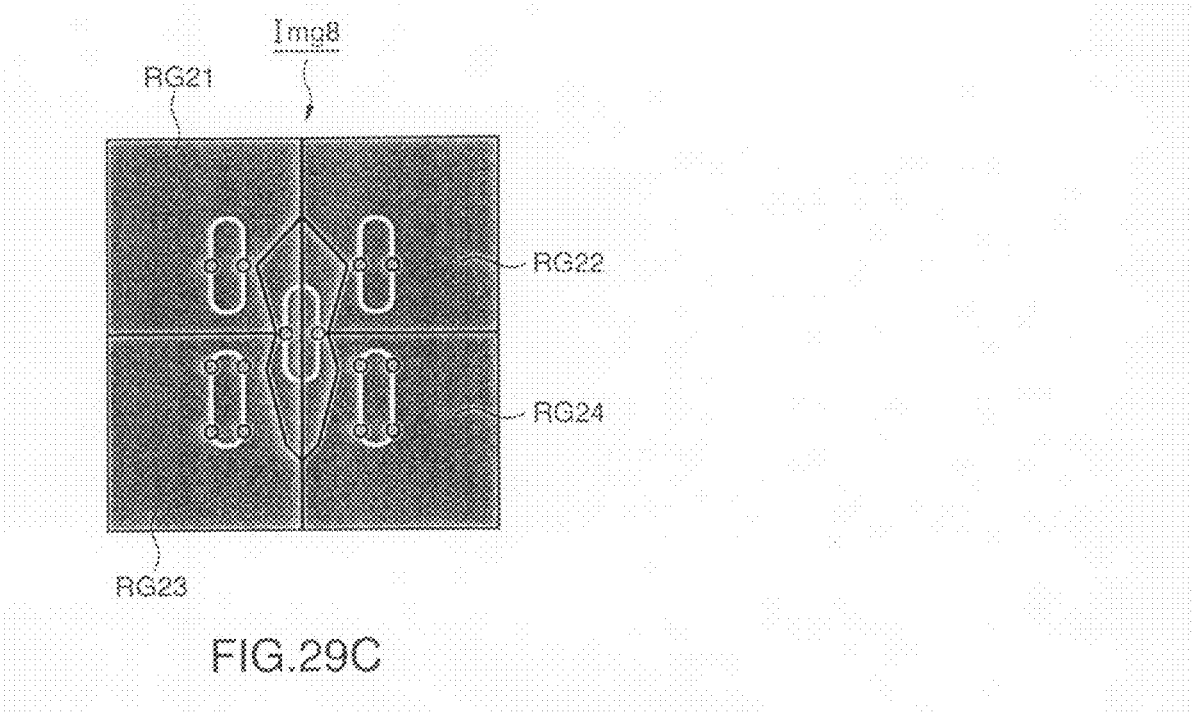

Next, as shown in FIG. 29B, the edge searching is performed along the edges of the Voronoi diagram VF16 again (step S56), the Voronoi edges including searched edge points EP12 are deleted (steps S57, S58), and further the isolated edge and branch are removed (step S59). As a result, as shown in FIG. 29C, the image Img8 is divided into sub-regions RG21 to RG24 each including one curve constituted of the sequence of edge points.

Thereafter, the searching method of the pattern edge in the second embodiment is used to perform the edge searching for each region. Accordingly, all the pattern edges can be acquired as the chained arrangement data for each region. It is to be noted that the searching method of the pattern edge in the ninth and tenth embodiments described later can be used to more precisely calculate the position of the edge.

(6) Sixth Embodiment

Next, a sixth embodiment of the present invention will be described. According to the present embodiment, there is provided the extracting method of the pattern contour including another image processing method in a case in which the pattern edge intersecting with the boundary does not exist in the acquired image.

Figure 30A:
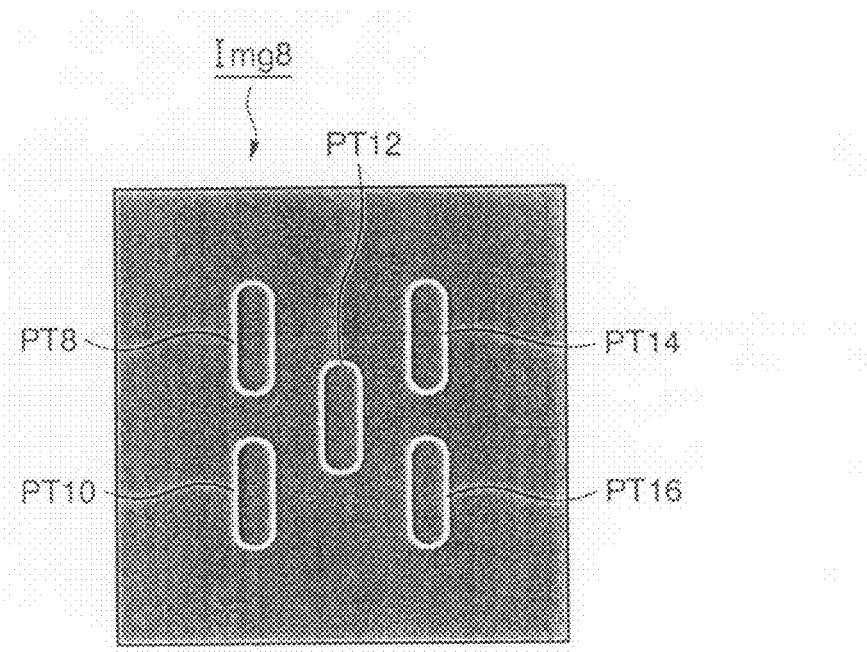
FIGS. 30A and 30B are diagrams showing the specific examples of the image according to a sixth embodiment of the present invention.
Figure 30B:
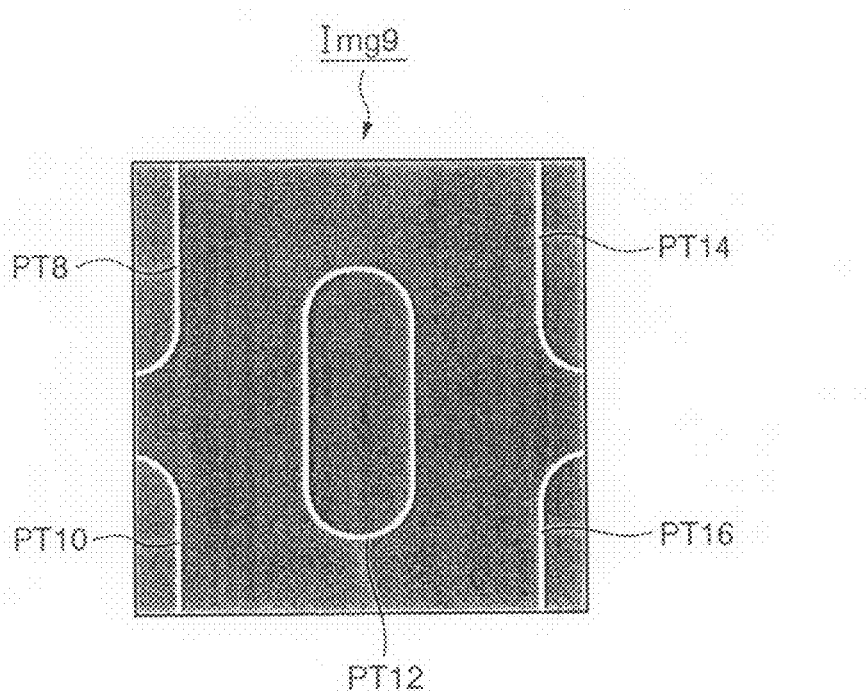

For example, the pattern edge intersecting with the boundary of the image Img8 does not exist as shown in FIG. 30A. In this case, an optical microscope used in acquiring the image or SEM whose magnification is set to be higher is used to acquire the image again. Then, as shown in FIG. 30B, an image Img9 is obtained whose pattern edge intersects with the boundary. Therefore, thereafter, the image processing in the first to fourth embodiments is used to divide the region in such a manner that each region includes the single pattern only. Moreover, by the edge searching method in the first to third embodiments or in the ninth or tenth embodiment described later, the edge position may be detected.

(7) Seventh Embodiment

Figure 31:
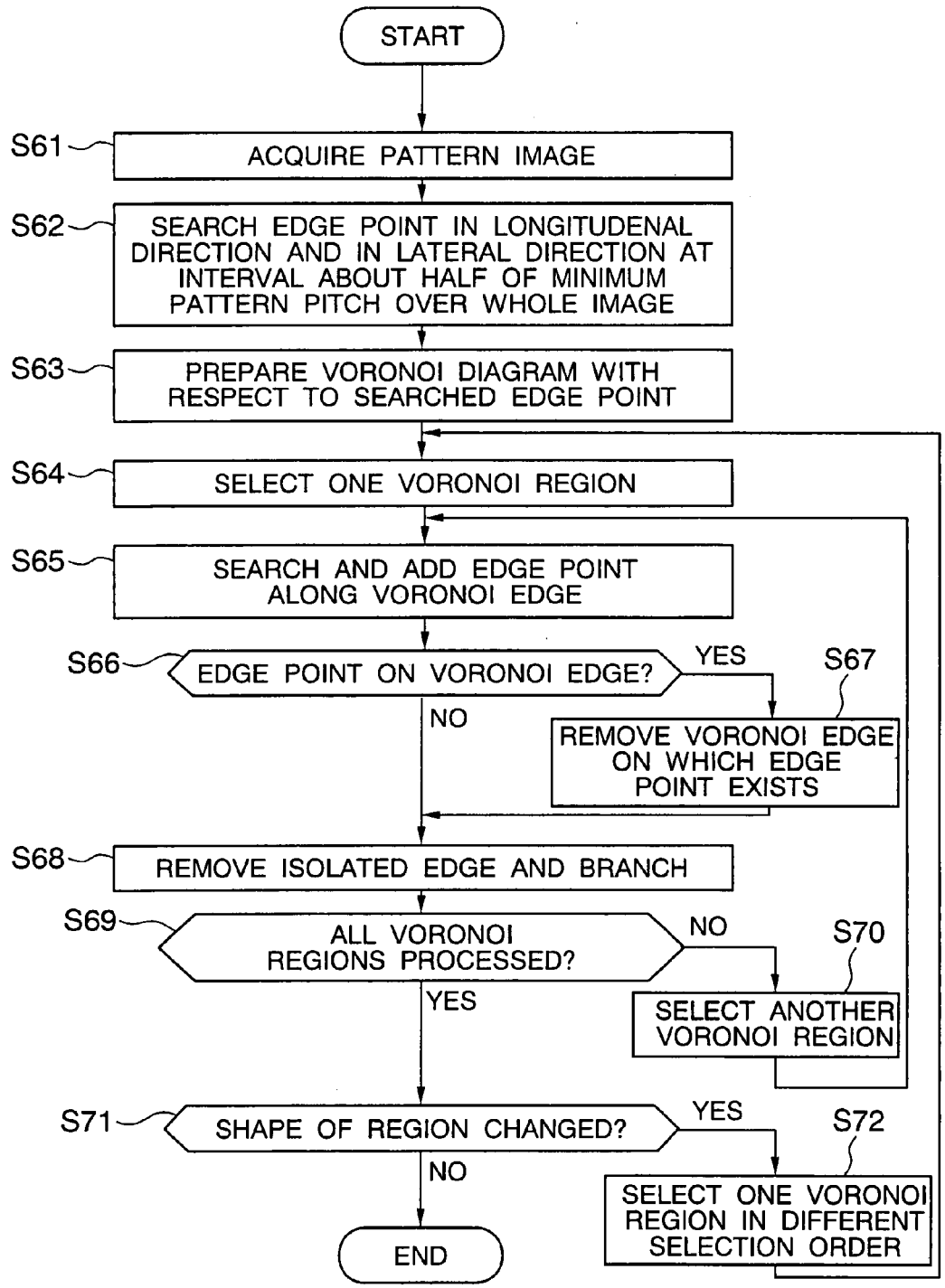
FIG. 31 is a flowchart showing the schematic procedure of the image processing method in a seventh embodiment of the present invention.

FIG. 31 is a flowchart showing the schematic procedure of the image processing method in a seventh embodiment, and FIGS. 32A to 32E show the examples of the image processed by the procedure shown in FIG. 31.

Figure 32A:
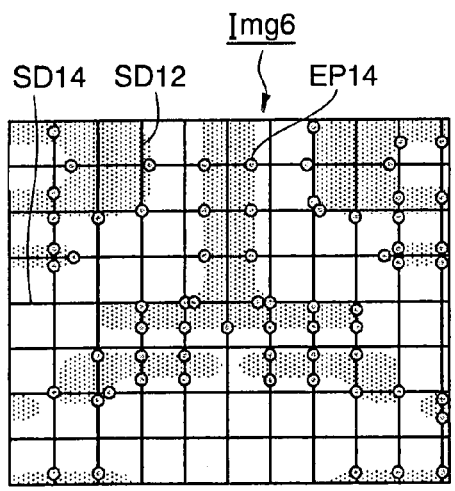
FIGS. 32A to 32E are diagrams showing some examples of the image processed by the procedure shown in FIG. 31.
Figure 32B:
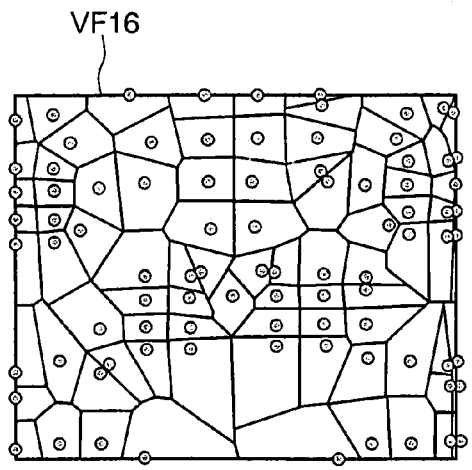
Figure 32C:
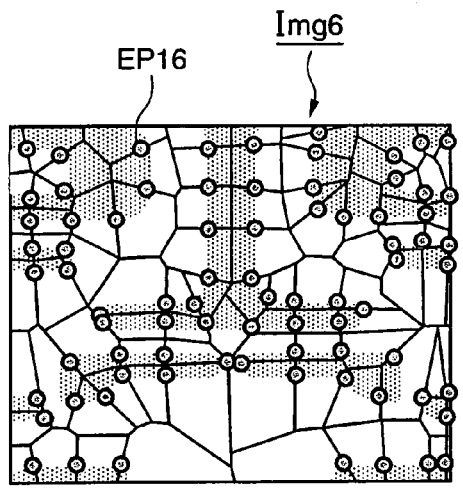
Figure 32D:
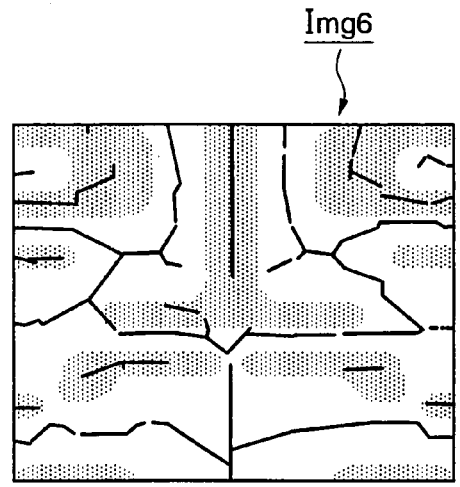

According to the present embodiment, a step of searching the pattern edge in the longitudinal and lateral directions at an interval which is about half of a minimum pattern pitch beforehand in the whole acquired image is added to the fourth embodiment. That is, as shown in FIG. 32A, the pattern edge is searched in a longitudinal direction SD12 and lateral direction SD14 at an interval which is about half of the minimum pattern pitch in the whole gray scale image Img6 (FIG. 31, step S62).

Thereafter, in the same manner as in the fourth embodiment, the procedures of: the generation of the Voronoi diagram VF16 (FIG. 32B) (FIG. 31, step S63); the edge searching along the Voronoi edge (FIGS. 32C, 31, steps S64 and S65); and the integration of the Voronoi regions and the removing of the branches (FIGS. 32D, 31, steps S66 to S68) are recursively repeated (steps S69 to S72, S63 to S68).

Figure 32E:
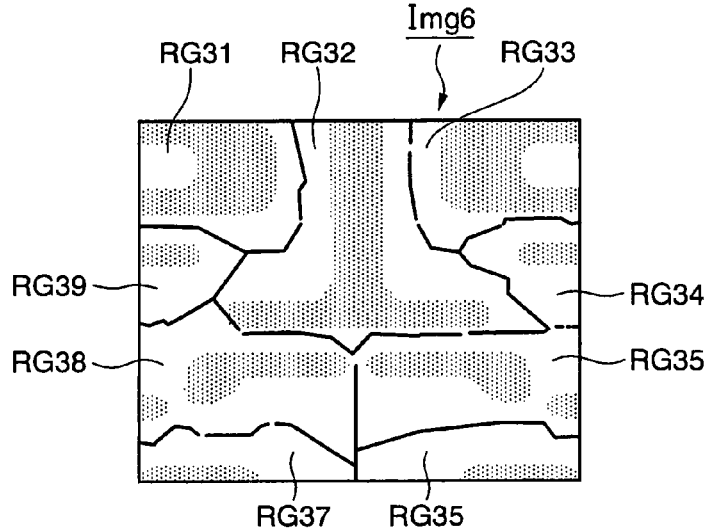

As described above, according to the present embodiment, since a large number of point sequences belonging to the pattern edge are obtained beforehand in step S62, the procedure for recursion can largely be omitted. For example, in comparison of FIG. 31 with FIG. 24, the steps S33 to S38, S40 and S41 of FIG. 24 are not necessary. Even by this simple procedure, as shown in FIG. 32E, the image Img6 can be divided into nine regions RG31 to RG39 so that the single pattern only is included in each region.

After the image processing by the above-described procedure, when the searching method of the pattern edge in the first or third embodiment or in the ninth or tenth embodiment described later is used to search the edge for each region, all the pattern edges can be acquired as the chained arrangement data for each result.

(8) Eighth Embodiment

According to an eighth embodiment, there is provided a method of applying the result of the division into the regions by the first to seventh embodiments to pattern matching.

Figure 33:
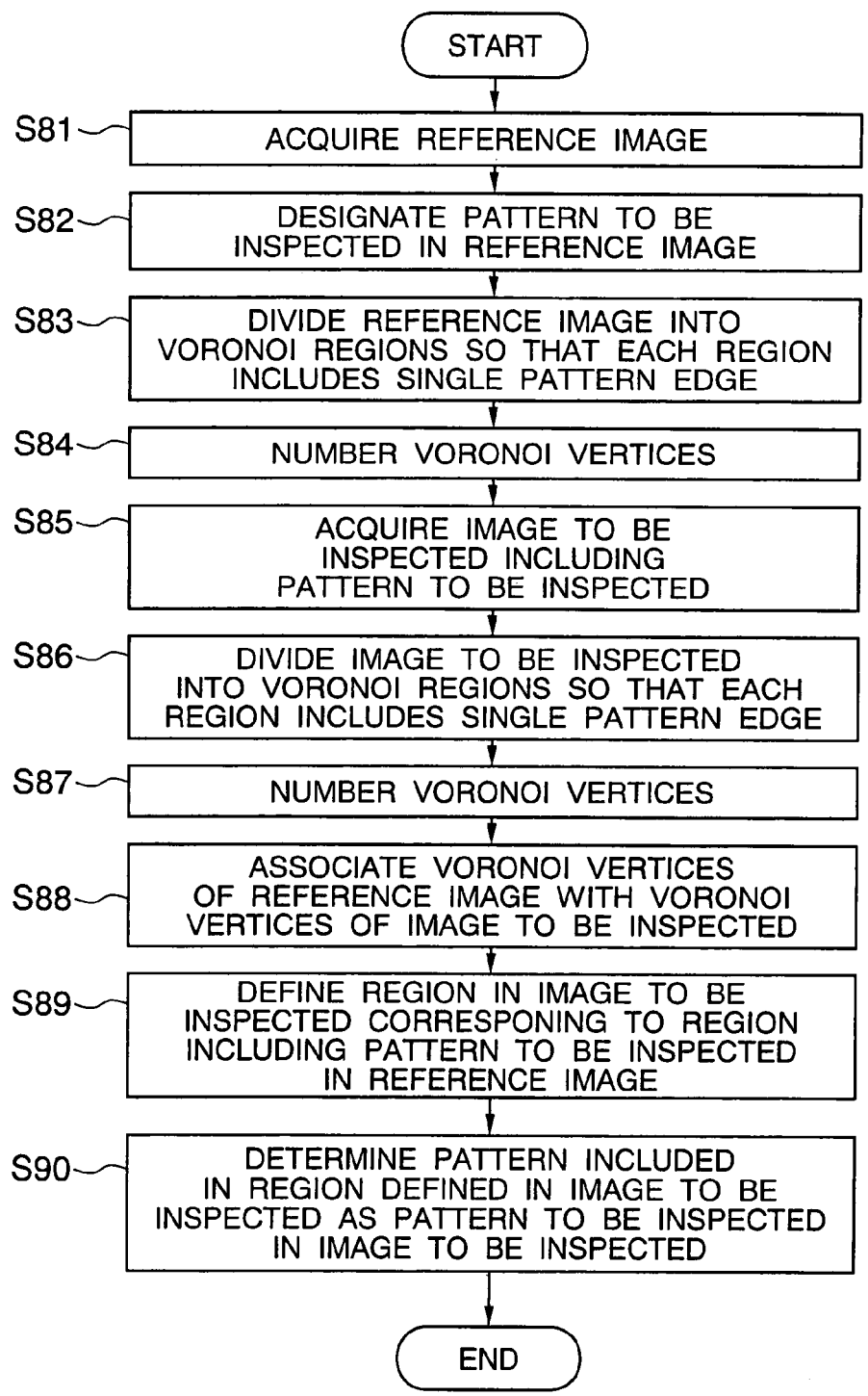
FIG. 33 is a flowchart showing the schematic procedure of the image processing method in an eighth embodiment of the present invention.

FIG. 33 is a flowchart showing the schematic procedure of the image processing method in the eighth embodiment. FIGS. 34A to 34F are explanatory views specifically showing the image processing method shown in FIG. 33.

First, a reference image is acquired as a reference of pattern material from CAD data with respect to the pattern of the inspection object (FIG. 33, step S81). One example of the reference image is shown in FIG. 34A. In the drawing, a reference image Rimg10 includes six hole patterns PT30, PT32, PT34, PT36, PT38, PT40. In these patterns, the pattern PT30 in a circled position in FIG. 34A is designated as the inspection object pattern (FIG. 33, step S82).

Next, with respect to the whole reference image Rimg10, as shown in FIG. 34B, in the same manner as in the fifth embodiment, a Voronoi diagram VF18 is prepared so that each region includes the single pattern (FIG. 33, step S83), and the respective vertices are numbered with ①to ⑩ (FIG. 33, step S84).

Next, the inspection image including the hole pattern PT38 which is the inspection object is acquired (FIG. 33, step S85). The example Img10 of the inspection image is shown in FIG. 34C.

Next, also with respect to the inspection image Img10, in the same manner as in the reference image Rimg10, the Voronoi diagram is prepared so that each region includes the single pattern only (FIG. 33, step S86), and the respective vertices are numbered with ①to ⑩ (FIG. 33, step S87). The result is shown in FIG. 34D. It is to be noted that in the present embodiment the way of the numbering of the reference image Rimg10 is not especially associated with that of the inspection image Img10.

Next, there are extracted the Voronoi diagram VF18 of the reference image Rimg10 and a Voronoi diagram VF20 of the object image Img10 only, and rotary movement or translational movement is relatively performed so that the position of the edge of the Voronoi diagram VF18 may be closest to that of the Voronoi diagram VF20 of the object image, thereby associating the Voronoi vertices with one another (step S88).

Thereafter, as shown in FIG. 34E, a region RG42 corresponding to a Voronoi region RG40 (dotted area) including the inspection object pattern PT30 in the reference image Rimg10 is defined in the inspection image Img10 (step S89).

Finally, as shown in FIG. 34F, the pattern included in the region RG42 defined in the inspection image Img10 is determined as the inspection object pattern PT30 in the inspection image (step S90).

In the example shown in FIGS. 34A to 34F, the Voronoi diagrams were matched with one another so as to minimize a residual of the positions of the edges. However, when the number of patterns included in the image increases or becomes complicated, the calculation requires much time in this method. In this case, when only connectivity of the Voronoi regions is noticed, the pattern matching can be performed more simply.

FIGS. 35A to 35E are explanatory views of this simple matching method. First, as shown in FIGS. 35A and 35B, the Voronoi diagrams of Rimg10 and Img10 shown in FIGS. 34B and 34D are rewritten to graphs VF19 and VF21 in which the length of each edge is neglected. Here, the inspection object pattern PT30 designated beforehand exists in a square whose vertices are points ②, ③, ⑦, and ⑤ in a reference image RImg11.

Next, the graph VF21 of FIG. 35B corresponding to the inspection image Img10 is rotated/translated so as to agree with the graph VF19 of FIG. 35A. In the present embodiment, when the graph VF21 of FIG. 35B is rotated by about 90° in a clockwise direction, a graph VF22 shown in FIG. 35C is acquired.

Next, in the graph VF22, the vertices to define a part corresponding to the region to be inspected in the graph VF19 in the reference image of FIG. 35A are acquired. As a result, as shown in FIG. 35D, a region surrounded with vertices ③, ⑨, ⑤, and ② is obtained.

As described above, the pattern in the region surrounded with the vertices ③, ⑨, ⑤, and ② in the original Voronoi diagram VF20 shown in FIG. 35E can be identified as the inspection object pattern.

According to the image processing method of the present embodiment, it is also possible to automatically find a specific part from the image. This respect will be described in more detail with reference to FIGS. 36A to 36F.

Figure 36A:
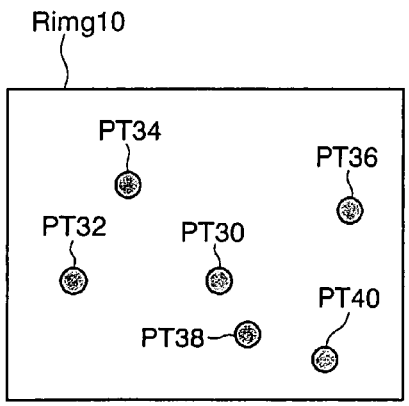
FIGS. 36A to 36F are explanatory views of a method of automatically finding a specific part from the image.
Figure 36B:
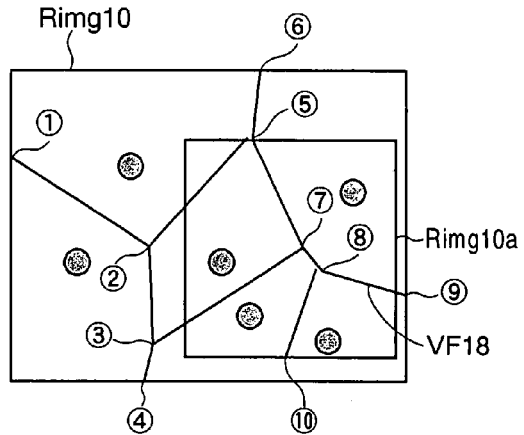
Figure 36C:
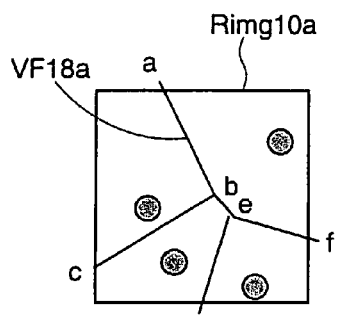
Figure 36D:
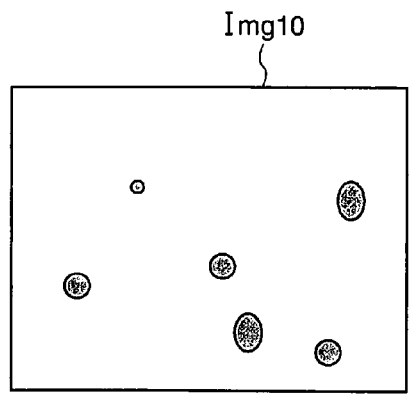

A partial region Rimg10a is cut out beforehand from the reference image Rimg10 shown in FIG. 36A as shown in FIG. 36B, and thereafter the Voronoi diagram is prepared with respect to the whole reference image Rimg10 together with the cut-out region Rimg10a. FIG. 36C shows a Voronoi diagram VF18a prepared with respect to the cut-out region Rimg10a.

Figure 36E:
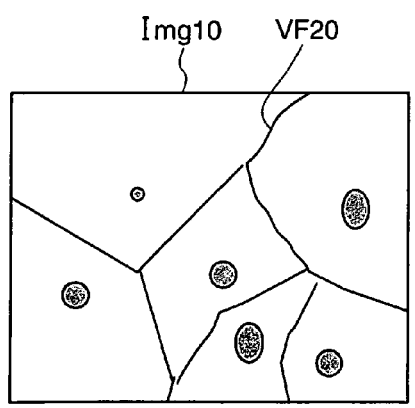

Subsequently, with respect to the image to be inspected Img10 (FIG. 36D), the Voronoi diagram VF20 is also prepared (FIG. 36E).

Figure 36F:
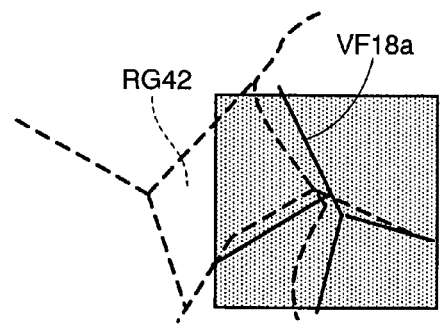

Next, a part whose geometric position most agrees with that of the Voronoi diagram VF18a shown in FIG. 36C is searched in the Voronoi diagram VF20 of the image to be inspected Img10. As shown in FIG. 36F, a rectangular region RG42 circumscribed with the Voronoi diagram VF18a can be defined as the region which includes the pattern to be inspected in the image to be inspected Img10.

According to the present embodiment, it is possible to execute a pattern matching in which irregular arrangement information of a pattern is used as a template. Therefore, when a plurality of the same patterns exist in the inspection object image, one specific pattern can be designated with high accuracy. Furthermore, it is also possible to find any defect of the pattern in the image to be inspected by comparing the Voronoi diagram of the reference image after the matching with the Voronoi diagram of the image to be inspected and by checking the edges and vertices which do not match each other.

(9) Ninth Embodiment

Next, a ninth embodiment of the present invention will be described with reference to FIG. 37 and FIGS. 38A to 38C. According to the present embodiment, there is also provided a method of preferably detecting the edge of the pattern which has a complicated contour shape.

Figure 37:
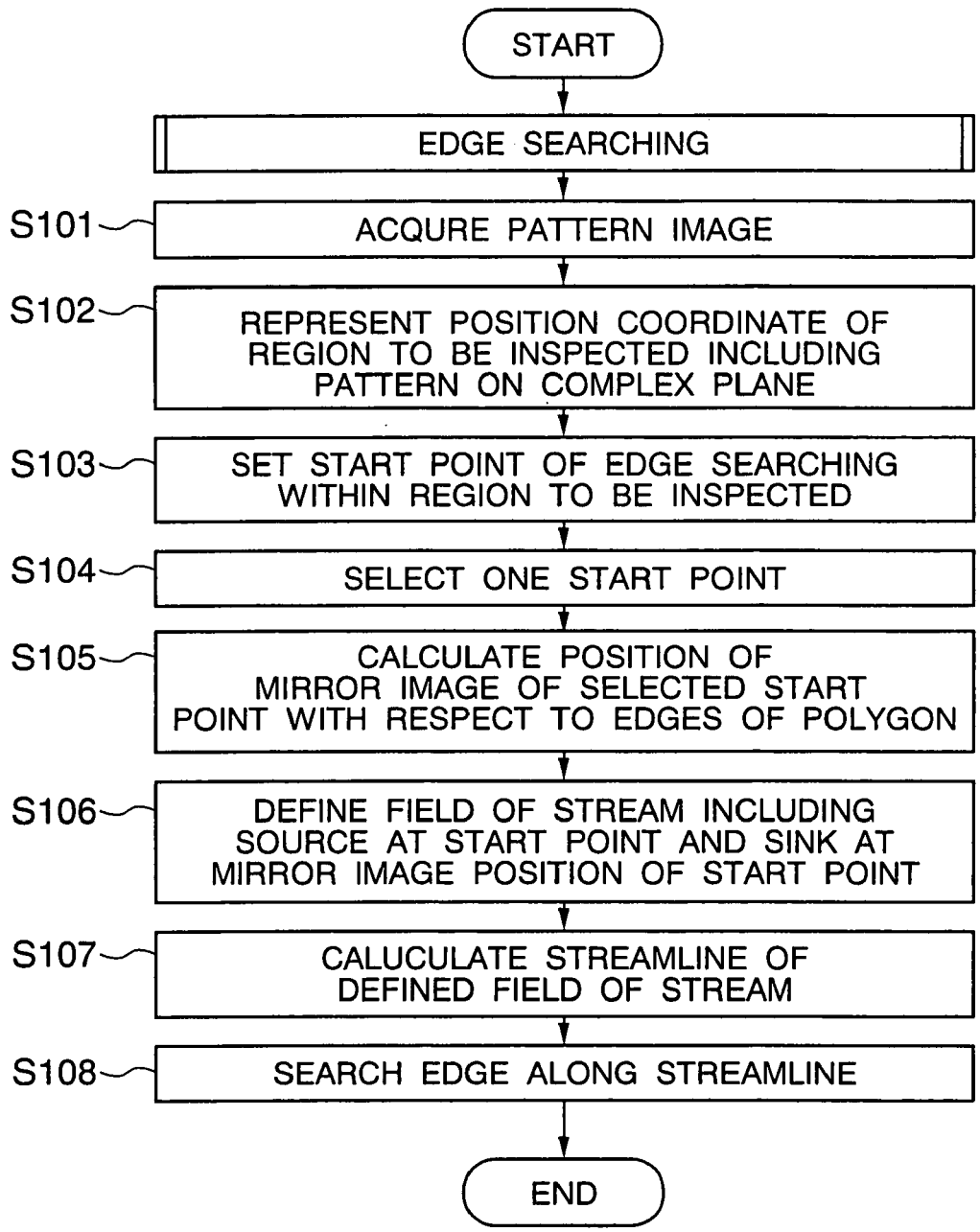
FIG. 37 is a flowchart showing the schematic procedure of an edge searching method in a ninth embodiment of the present invention.
Figure 38A:
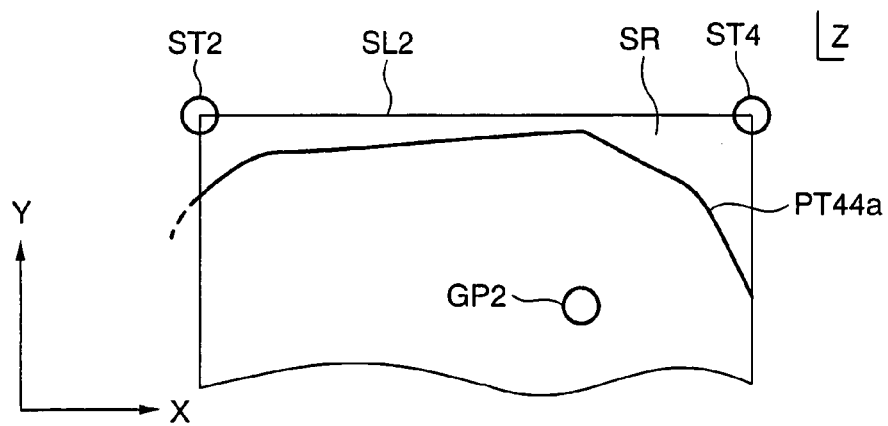
FIGS. 38A to 38C are diagrams showing in more detail the edge searching method shown in FIG. 37.
Figure 38B:
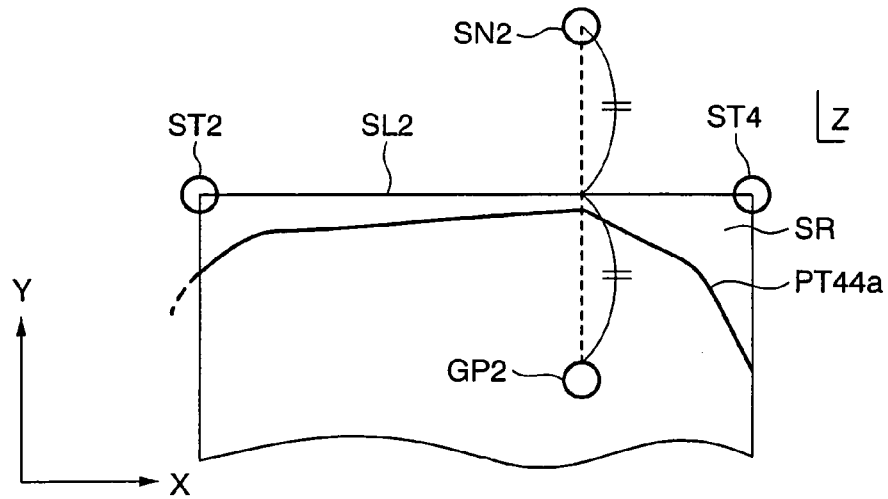
Figure 38C:
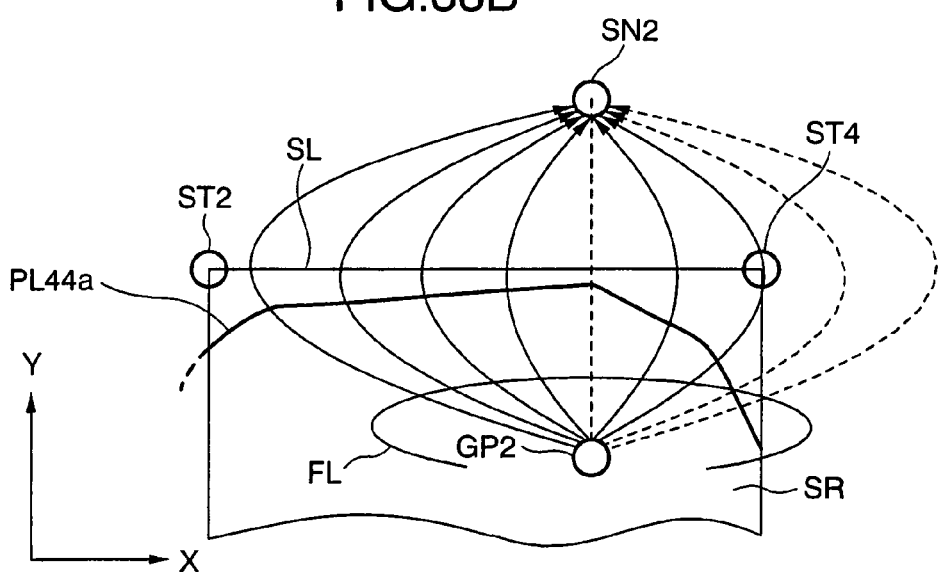

FIG. 37 is a flowchart showing the schematic procedure of the edge searching method in the present embodiment, and FIGS. 38A to 38C are more specific explanatory views of the edge searching method shown in FIG. 37.

First, the image of the pattern to be inspected is acquired (FIG. 37, step S101). For explanation of the present embodiment, the pattern PT44 shown in FIG. 46 is used again.

A partial enlarged view of the image of the pattern to be inspected PT44 is schematically shown in FIG. 38A. Here, it is assumed that the coordinates of vertices ST2 and ST4 of the edge SL2 of the polygon indicating the schematic edge position of the pattern PT44 is already given by the method described, for example, in the above-described embodiment.

Next, the position coordinates of a region to be inspected SR including a pattern PT44a which is a part of the pattern PT44 is represented on a complex plane in which the x-axis thereof is a real axis and the y-axis thereof is an imaginary axis (FIG. 37, step S102).

Subsequently, on the complex plane, a start point is set, for example, at the position of a point GP2 shown in FIG. 38A (FIG. 37, steps S103 and S104). This start point GP2 is a simulated-source point in hydrodynamics.

Next, a point SN2 at the position of the mirror image of the source point GP2 with respect to the edge SL2 is calculated, and the point is set on the complex plane as shown in FIG. 38B (FIG. 37, step S105). The calculated point SN2 is a simulated-sink point in the hydrodynamics.

Next, assuming that the point GP2 is the source point and the point SN2 is the sink point, an ideal fluid field is defined on the complex plane (FIG. 37, step S106). For this field of stream, a solution is analytically given, and a function form is described in detail in page 278 of "Conformal Maps" authored by Akira Watanabe (published by Asakura Shoten, 1984). A complex potential W1 representing the stream field in this case is a complex function in the form of the following equation:

$$W1 = \log\{(e^z - 1)/(e^z + 1)\} \quad \text{Equation (3)}$$

Next, a contour line with respect to the real part of the equation (3), that is, a streamline is calculated (FIG. 37, step S107). A calculation result is, for example, a curve group FL shown in FIG. 38C.

Thereafter, by executing the edge searching, for example, based on the threshold value method in the direction along each curve of the curve group FL, the positions of the pattern edge are extracted (FIG. 37, step S108).

In the present embodiment, for the edge searching, the threshold value method along the searching direction is used, but the present invention is not limited to this method. For example, a difference filter, peak searching method, and the like may also be used.

Moreover, in the present embodiment, the extracting searching direction is determined based on the stream field of a two-dimensional fluid, but the edge searching direction may also be determined based on a two-dimensional electric field in which positive/negative point charges are arranged, instead of concepts of the source and sink points.

Furthermore, the image to be inspected acquired by scanning type probe microscopes such as the optical microscope can also appropriately be used with respect to the inspection image.

(10) Tenth Embodiment

Figure 39:
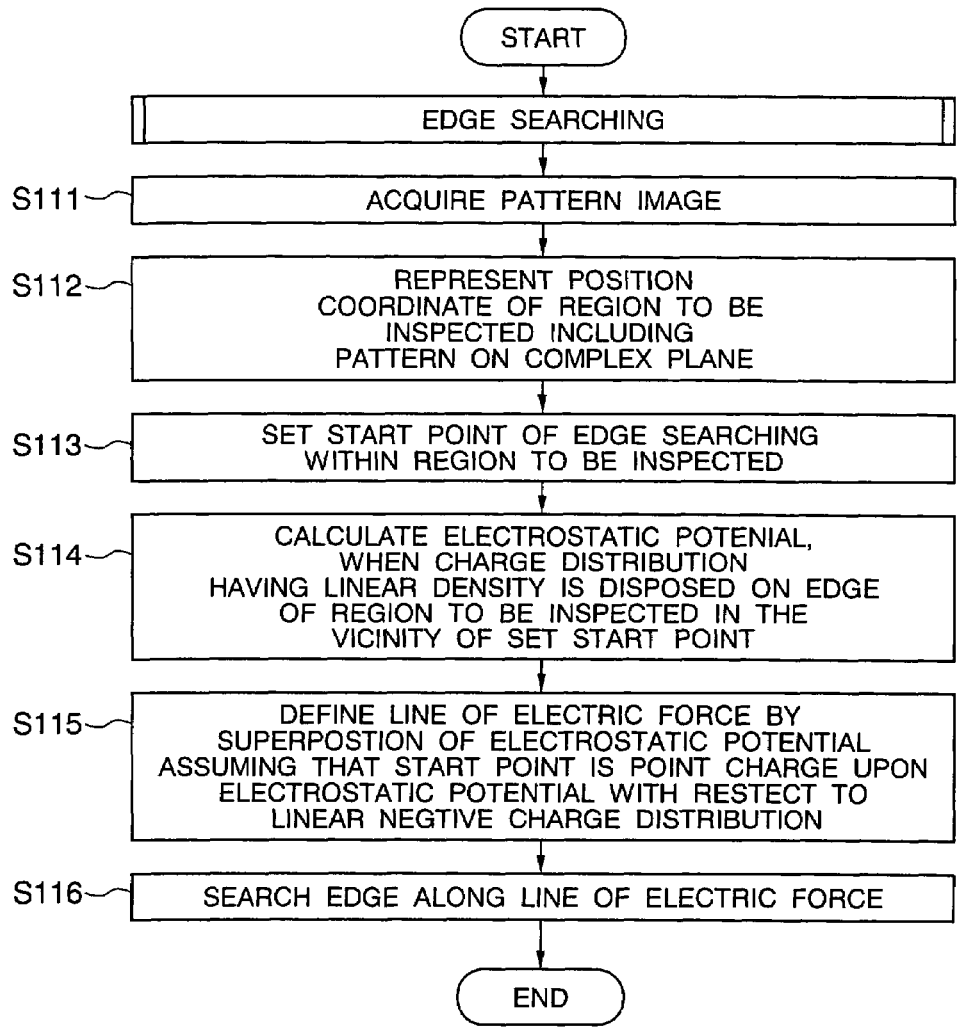
FIG. 39 is a flowchart showing the schematic procedure of the edge searching method in a tenth embodiment of the present invention.
Figure 40A:
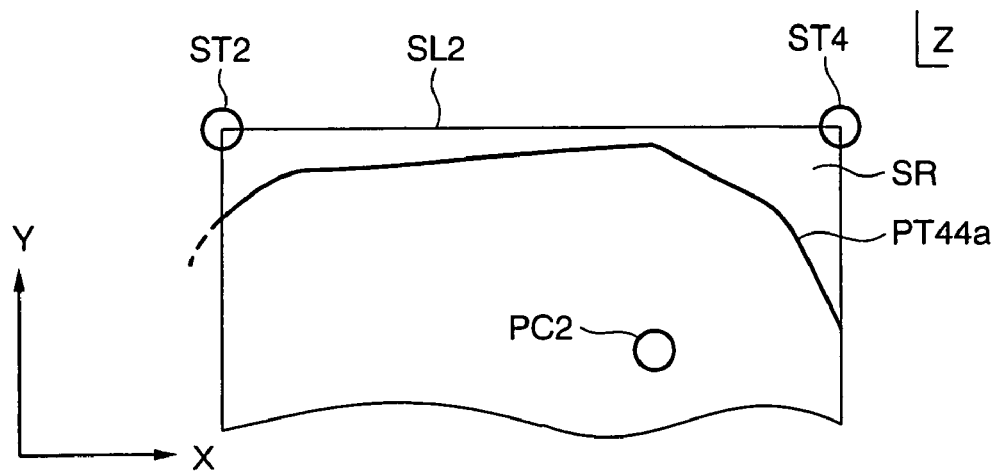
FIGS. 40A and 40B are diagrams showing in more detail the edge searching method shown in FIG. 39.
Figure 40B:
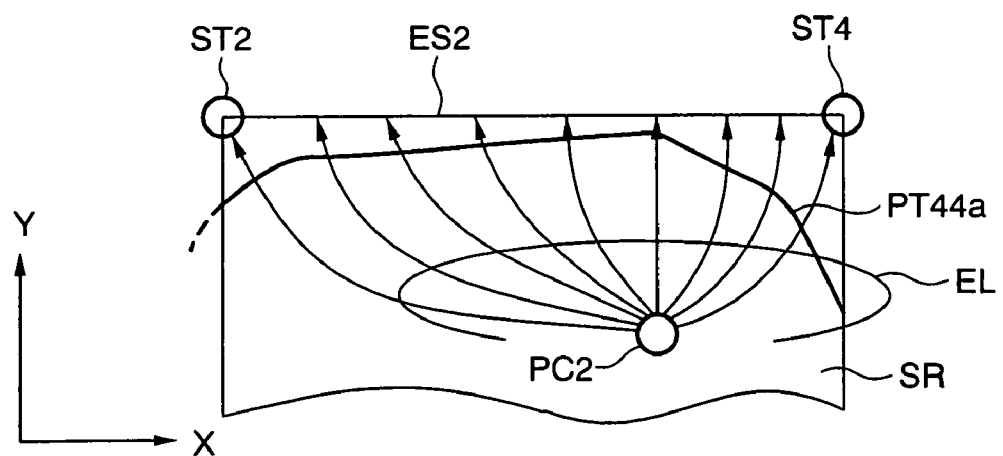
Figure 46:
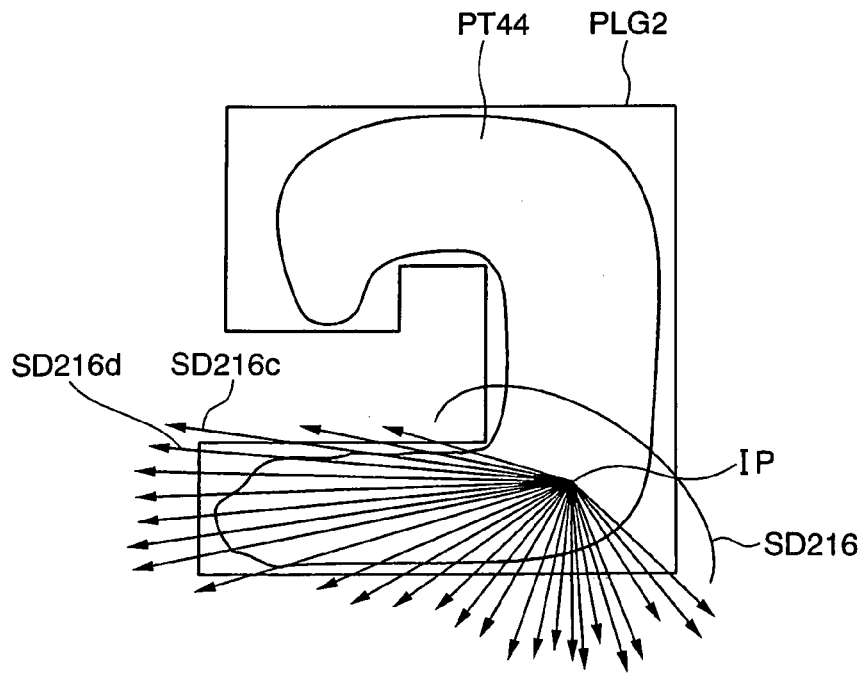
FIG. 46 is an explanatory view of the problem of a pattern edge searching method according to the related art.

Next, a tenth embodiment of the present invention will be described with reference to FIGS. 39 and 40A, 40B. FIG. 39 is a flowchart showing the schematic procedure of the edge searching method in the present embodiment, and FIGS. 40A and 40B are diagrams more specifically showing the edge searching method shown in FIG. 39. As shown in FIG. 40A, also in the present embodiment, the pattern PT44 shown in FIG. 46 is assumed as the pattern to be inspected. It is also assumed that the coordinates of the vertices ST2 and ST4 of the edge SL2 of the polygon representing the schematic edge position of the pattern PT44 are already given.

In the same manner as the ninth embodiment, first, after acquiring the image of the pattern to be inspected (FIG. 39, step S111), the position coordinate of the region to be inspected SR including the pattern PT44a which is a part of the pattern PT44 is transformed into those on the complex plane (FIG. 39, step S112).

Next, one searching start point PC2 is selected in the region to be inspected SR (FIG. 39, step S113). In the present embodiment, a positive point charge is simulated by this start point PC2, a charge distribution having a linear density on a line segment of the start point PC2 is disposed in an simulated manner, and an electrostatic potential at this time is calculated (FIG. 39, step S114).

The electrostatic potential at this time is superposition of an electrostatic potential W2 supplied by the point charge upon an electrostatic potential W3 with respect to a linear negative charge distribution. A line of electric force obtained as a result is defined (FIG. 39, step S115). Examples of these lines of electric force are shown in a curve group EL of FIG. 40B.

Then, the edge searching is performed, for example, based on the threshold value method in the direction along each curve of the curve group EL to extract the position of the pattern edge (FIG. 39, step S116).

Also in the present embodiment, in addition to the threshold value method along the searching direction, the difference filter, peak searching method, and the like can be used in searching the edge.

Moreover, in the present embodiment, the edge searching direction has been determined based on the two-dimensional electric field in which the positive/negative charges are disposed. However, the direction may also be determined based on the stream field of the two-dimensional fluid in which the source/sink is disposed, for example, instead of the point charge.

(11) Eleventh Embodiment

Next, an eleventh embodiment of the present invention will be described with reference to FIG. 41. According to the present embodiment, there is provided a scanning method of a probe using the edge searching method in the ninth and tenth embodiments. The method will be described hereinafter using an electron beam as the probe. For the specific constitution of a probe inspection apparatus, refer to a twelfth embodiment described later (FIG. 42).

Figure 41:
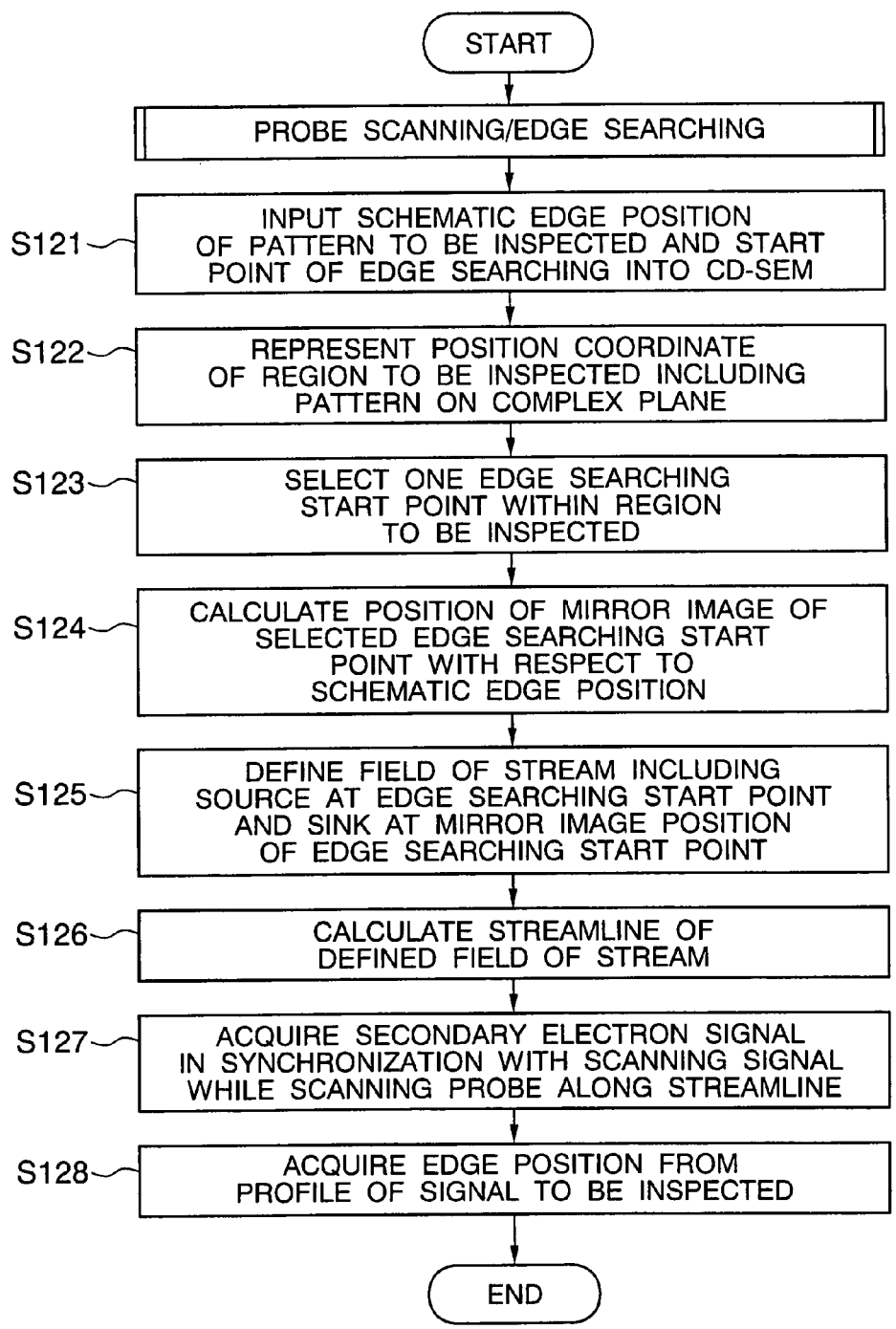
FIG. 41 is a flowchart showing the schematic procedure of a probe scanning method and the edge searching method in an eleventh embodiment of the present invention.
Figure 42:
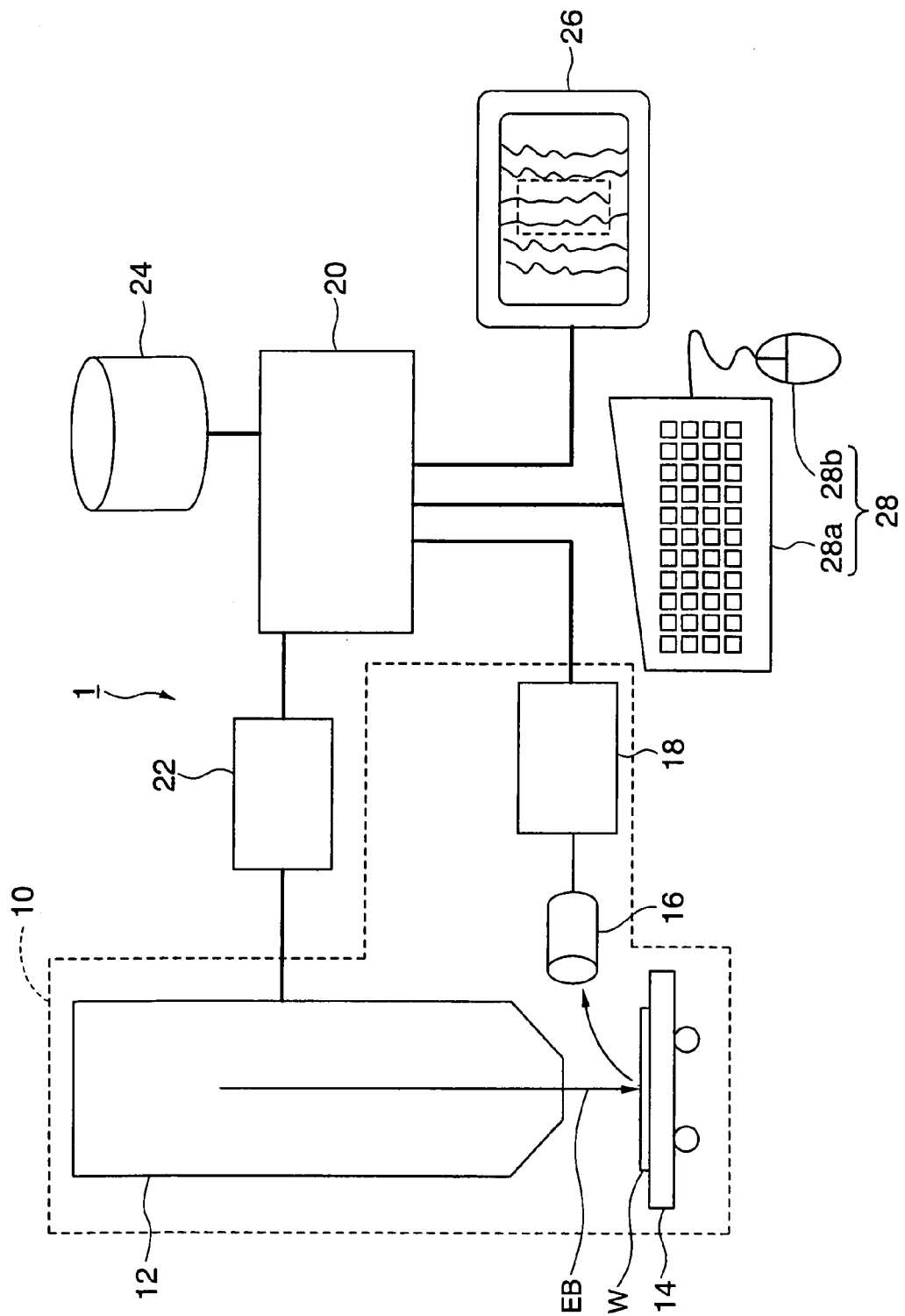
FIG. 42 is a block diagram showing a schematic constitution of a pattern inspection apparatus according to a twelfth embodiment of the present invention.
Figure 43:
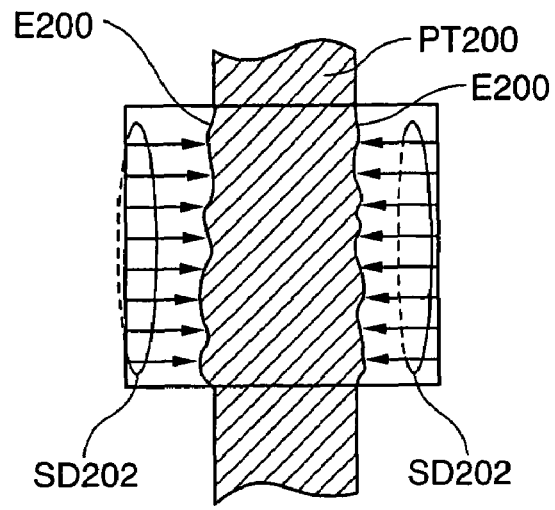
FIG. 43 is a diagram showing one example of a linear pattern and showing an extracting method of a pattern contour according to a related art.
Figure 44:
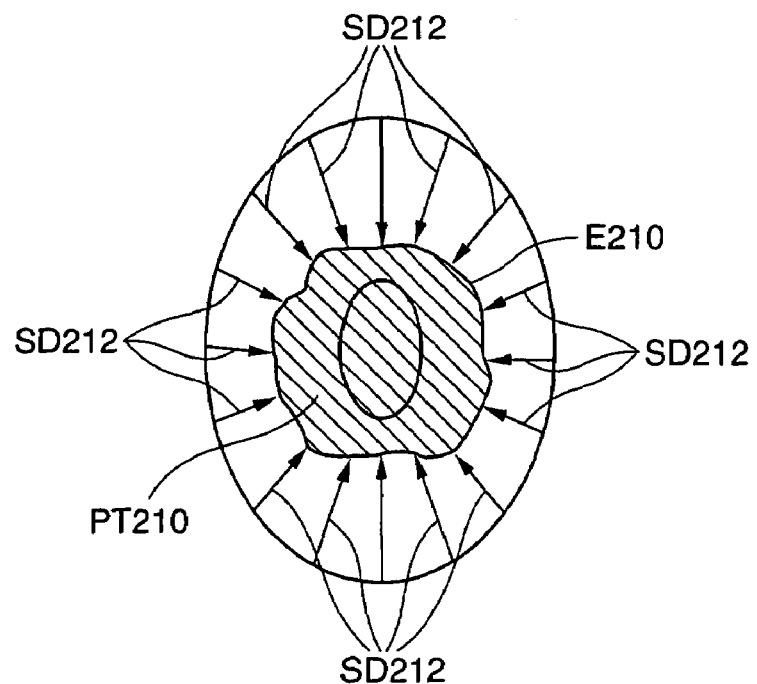
FIG. 44 is a diagram showing one example of a hole pattern and showing the extracting method of the pattern contour according to the related art.

FIG. 41 is a flowchart showing the schematic procedure of the probe scanning method and edge searching method in the present embodiment. As shown in the drawing, first, a control system of CD-SEM (see FIG. 42) is allowed to read the data of the vertex coordinate of the polygon indicating the schematic edge position of pattern to be inspected and the data of the coordinate of the start point of the edge searching (step S121).

Next, the position coordinate of the region to be inspected including the pattern to be inspected is transformed into that on the complex plane in which the x-axis thereof is a real axis and the y-axis thereof is an imaginary axis (step S122).

Subsequently, the source point and sink point are set on the complex plane in the same manner as in the ninth embodiment to define the ideal fluid field (steps S123 to S125).

Next, the streamline of the ideal fluid field is calculated, and the coordinate positions are stored in the storage device (see FIG. 42) connected to the control system (step S126). The calculation result of the streamline is the same as that of the curve group FL of FIG. 38C.

Subsequently, the scanning signal of the probe is generated based on the streamline coordinate stored in the storage device, and the probe is scanned to acquire the secondary electron signal in synchronization with the scanning signal (step S127).

Furthermore, the edge position is defined from the profile of the acquired secondary electron signals, for example, by the threshold value method, and the position information of the pattern edge is extracted (step S128).

In the present embodiment, the probe microscope is described, but the present invention is never limited to this apparatus. The present invention can be applied to all inspection apparatuses for scanning the probe to acquire the image, such as an STM, an AFM, and a laser scanning microscope.

(12) Twelfth Embodiment

Next, a twelfth embodiment of the present invention will be described with reference to FIG. 42. According to the present embodiment, there is provided a pattern inspection apparatus to implement the first through eleventh embodiments.

FIG. 42 is a block diagram showing the schematic constitution of the pattern inspection apparatus according to the present embodiment together with an apparatus connected to the inspection apparatus. A pattern inspection apparatus 1 shown in the drawing comprises an electronic optical system controller 22, a computer 20, a memory 24, a display 26, and an input device 28.

An apparatus 10 also shown in FIG. 42 constitutes a probe inspection apparatus in the present embodiment, and includes a stage 14 on which a substrate W is mounted, an electronic optical system 12, a secondary electron detector 16, and a signal processor 18. The electronic optical system 12 generates an electron beam EB to irradiate the substrate W on which a certain fine pattern is formed as the inspection object with the electron beam EB. The secondary electron detector 16 detects secondary electrons/reflected electrons/backward scattered electrons generated from the surface of the substrate W by irradiation with the electron beam EB. The signal processor 18 converts an analog signal constituted of the secondary/reflected/backward scattered electrons detected by the secondary electron detector 16 into a digital signal, amplifies the signal, and supplies the signal as the image data of the pattern to be inspected to the computer 20.

In the memory 24, program is stored in the form of a recipe file to execute various operation processes for the above-described embodiments. These operation processes include: difference processing to extract horizontal and vertical components of the pattern edge; processing to perform the matching of the lattice animal; geometric calculation to calculate the Voronoi diagram; processing to compare the Voronoi diagrams with each other; processing to judge whether or not the point including the arbitrary coordinate exists on the edge or vertex of the Voronoi diagram; processing to calculate the position of the pattern edge from the gray scale value of the image; processing to calculate the complex or electrostatic potential based on the coordinate data of the polygon indicating the schematic position of the pattern edge; and processing to calculate the coordinate data of the edge searching direction from the calculated complex or electrostatic potential.

The memory 24 also stores various data such as the image data of the inspection object pattern supplied from the signal processor 18 via the computer 20, the animal table of the information of the lattice animal stored in the form of the table, and the coordinate data of the polygon indicating the schematic position of the pattern edge.

The computer 20 in the present embodiment controls the whole apparatus and extracts the recipe file, the image data of the pattern, and the data of the lattice animal from the memory 24 to execute the above-described image processing, the extraction of the pattern contour, and the searching of the pattern edge. The computer 20 in the present embodiment is connected to the electronic optical system 12 of the apparatus 10 via the electronic optical system controller 22 to supply the control signal to the electronic optical system controller 22 and to scan the electron beam EB on the upper surface of the substrate W. When the scanning method of the probe in the eleventh embodiment is executed, the control signal includes a scanning signal generated based on the coordinate data of the edge searching direction calculated from the complex or electrostatic potential.

The display 26 is connected to the computer 20 to display the image to be inspected and reference image and further to appropriately display these processing situations.

The input 28 includes a keyboard 28*a* and mouse 28*b*, and is connected to the computer 20 to supply various input signals by an operator's operation.

(13) Thirteenth Embodiment

When a semiconductor device is manufactured using at least one of the image processing method, the extracting method of a pattern contour, and the scanning method of a probe in the above-described first to eleventh embodiments, the fine pattern can more exactly and quickly be evaluated. As a result, it is possible to manufacture the semiconductor device with a higher yield and for a short turn around time (TAT).

(14) Fourteenth Embodiment

A series of procedures in the extracting method of a pattern contour, the image processing method, the searching method of a pattern edge, and the scanning method of a probe described in the first to eleventh embodiments may also be incorporated in the program, and read and executed by a computer which can process the image data. Accordingly, the series of procedures in the extracting method of a pattern contour, the image processing method, the searching method of a pattern edge, and the scanning method of a probe according to the present invention can be realized using a general-purpose computer which can process the image. The series of procedures of the extracting method of a pattern contour, the image processing method, the searching method of a pattern edge, and the scanning method of a probe according to the present invention may also be stored as the program to be executed by a computer in recording media such as a flexible disk and a CD-ROM, and read and executed by the computer. The recording media are not limited to portable media such as a magnetic disk and optical disk, and fixed type recording media such as a hard disk drive and memory may also be used. The program incorporating the series of procedures of the extracting method of a pattern contour, the image processing method, the searching method of a pattern edge, and the scanning method of a probe may also be distributed via communication (including radio communication) lines such as the Internet. Furthermore, the program incorporating the series of procedures of the extracting method of a pattern contour, the image processing method, the searching method of a pattern edge, and the scanning method of a probe may also be encrypted, modulated, or compressed, and distributed via wire communication lines such as the internet or radio communication lines.

The embodiments of the present invention have been described above, but the present invention is not limited to the embodiments, and can appropriately be modified or altered without departing from the scope and spirit thereof.

What is claimed is:

1. An image processing method comprising:
  acquiring an image of a pattern to be inspected;
  extracting a part of a point sequence which belongs to a contour of the pattern;
  preparing a Voronoi diagram with respect to the extracted partial point sequence;
  searching a point which belongs to an edge of the pattern along an edge of the prepared Voronoi diagram to incorporate the searched point into the partial point sequence; and
  removing the edge of the Voronoi diagram intersecting with the contour of the pattern to define a sub-region in the image.

2. The image processing method according to claim 1, further comprising:
  recursively repeating said preparing the Voronoi diagram, said incorporating the searched point into the partial point sequence, and defining the sub-region in the image, with respect to at least a part of the image.

3. The image processing method according to claim 1, wherein said extracting a part of the point sequence belonging to the contour of the pattern includes: searching the edge of the pattern along an outer periphery of a whole region of the image or a pre-defined boundary of a region to be inspected in the image.

4. The image processing method according to claim 1, wherein said extracting a part of the point sequence belonging to the contour of the pattern includes: searching the edge of the pattern along a continuous line which divides a whole region of the image or a pre-defined region to be inspected in the image into two regions.

5. The image processing method according to claim 1, wherein said extracting a part of the point sequence belonging to the contour of the pattern includes: preparing a lattice having a lattice constant equal to a minimum linear width of the pattern included in a whole region of the image or a pre-defined region to be inspected in the image; and searching the contour of the pattern along the prepared lattice.

6. The image processing method according to claim 1, further comprising: comparing a geometric shape or connectivity of the Voronoi diagram or a part of the Voronoi diagram with that of another Voronoi diagram or a part of another Voronoi diagram to define a partial region of the image.

7. A computer-readable memory containing a program which allows a computer to implement an image processing method comprising:
  acquiring an image of a pattern to be inspected;
  extracting a part of a point sequence which belongs to a contour of the pattern;
  preparing a Voronoi diagram with respect to the extracted partial point sequence;
  searching a point which belongs to an edge of the pattern along an edge of the prepared Voronoi diagram to incorporate the searched point into the partial point sequence; and
  removing the edge of the Voronoi diagram intersecting with the contour of the pattern to define a sub-region in the image.

8. A manufacturing method of a semiconductor device, comprising an image processing method including:
  acquiring an image of a pattern to be inspected;
  extracting a part of a point sequence which belongs to a contour of the pattern;
  preparing a Voronoi diagram with respect to the extracted partial point sequence;
  searching a point which belongs to an edge of the pattern along an edge of the prepared Voronoi diagram to incorporate the searched point into the partial point sequence; and
  removing the edge of the Voronoi diagram intersecting with the contour of the pattern to define a sub-region in the image.

9. A pattern inspection apparatus comprising:
  a point sequence extractor which receives data of an image of a pattern to be inspected and which extracts a part of a point sequence belonging to a contour of the pattern;
  an image processor which prepares a Voronoi diagram with respect to the extracted partial point sequence and which searches a point belonging to the edge of the pattern along an edge of the prepared Voronoi diagram to incorporate the searched point into the partial point sequence and which removes an edge of the Voronoi diagram intersecting with the contour of the pattern to define a sub-region in the image; and
  an edge searcher which searches the edge of the pattern for each sub-region.

* * * * *